US009157510B2

(12) United States Patent
Kojima et al.

(10) Patent No.: US 9,157,510 B2
(45) Date of Patent: Oct. 13, 2015

(54) GEARBOX OF SADDLE-RIDDEN VEHICLE

(71) Applicant: HONDA MOTOR CO., LTD., Tokyo (JP)

(72) Inventors: Hiroyuki Kojima, Wako (JP); Yoshiaki Tsukada, Wako (JP); Yoshiaki Nedachi, Wako (JP); Kazuhiko Nakamura, Wako (JP); Takashi Ozeki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 14/026,316

(22) Filed: Sep. 13, 2013

(65) Prior Publication Data

US 2014/0090498 A1 Apr. 3, 2014

(30) Foreign Application Priority Data

Sep. 28, 2012 (JP) ................................. 2012-218764

(51) Int. Cl.
| | | |
|---|---|---|
| *F16H 63/14* | (2006.01) | |
| *F16H 3/093* | (2006.01) | |
| *F16H 61/688* | (2006.01) | |
| *F16H 59/68* | (2006.01) | |

(52) U.S. Cl.
CPC .............. *F16H 3/093* (2013.01); *F16H 61/688* (2013.01); *F16H 63/14* (2013.01); *F16H 2059/6807* (2013.01); *Y10T 74/19233* (2015.01)

(58) Field of Classification Search
CPC ....... F16H 3/093; F16H 61/688; F16H 63/14; F16H 2059/6807; F16H 59/68; F16H 63/18; F16H 59/70; F16H 59/0204; F16H 61/68; F16H 61/2807

USPC ............. 74/335, 337.5, 331, 337, 343, 473.1, 74/473.16, 473.2, 473.21–473.24, 473.26, 74/473.36–473.38

See application file for complete search history.

(56) References Cited

U.S. PATENT DOCUMENTS

| | | | | |
|---|---|---|---|---|
| 5,624,014 | A * | 4/1997 | Crasset ..................... | 192/33 R |
| 7,121,373 | B2 * | 10/2006 | Kawakubo et al. ........... | 180/227 |
| 7,631,570 | B2 * | 12/2009 | Mizuno et al. ................ | 74/331 |
| 7,730,800 | B2 * | 6/2010 | Sorani et al. .................. | 74/331 |
| 8,015,891 | B2 * | 9/2011 | Ogasawara ..................... | 74/335 |
| 8,166,840 | B2 * | 5/2012 | Nedachi et al. ................ | 74/330 |
| 8,689,658 | B2 * | 4/2014 | Ogasawara et al. ........ | 74/473.36 |
| 8,892,321 | B2 * | 11/2014 | Nedachi et al. ................ | 701/67 |
| 2009/0078072 | A1 * | 3/2009 | Tsukada et al. ................ | 74/335 |
| 2009/0084208 | A1 * | 4/2009 | Hayakawa et al. ............. | 74/325 |
| 2009/0222182 | A1 * | 9/2009 | Tomoda et al. ................ | 701/67 |
| 2010/0242655 | A1 * | 9/2010 | Ieda et al. ..................... | 74/473.1 |
| 2011/0314961 | A1 * | 12/2011 | Tanaka et al. ............... | 74/665 E |
| 2012/0239264 | A1 * | 9/2012 | Kojima et al. ................. | 701/53 |

FOREIGN PATENT DOCUMENTS

JP 05-157163 A 6/1993

* cited by examiner

*Primary Examiner* — Ha D Ho
*Assistant Examiner* — Jude Agendia
(74) *Attorney, Agent, or Firm* — Squire Patton Boggs (US) LLP

(57) ABSTRACT

A gearbox includes a transmission mechanism and a clutch system including plural clutches. The gearbox has a gear change mechanism that is interlocked with a change pedal shaft to which rotational force by operation of a shift pedal is transmitted and arbitrarily selects a transmission gear of the transmission mechanism to perform gear shift. An ECU can electronically control connection/disconnection of the clutch system according to a shift position of the gear change mechanism.

18 Claims, 33 Drawing Sheets

GEARBOX OF SADDLE-RIDDEN VEHICLE

BACKGROUND

1. Field

The present invention relates to a gearbox of a saddle-ridden vehicle.

2. Description of the Related Art

As a gearbox of a saddle-ridden vehicle, there is a gearbox in which a control measure that has detected an indication of intention of gear shift from a gear selector operation based on manual operation by a driver causes electromagnetic actuation of a clutch actuator to disconnect a clutch and electrically drives a motor that shifts a change drum to perform gear shift to the selected shift stage, such a configuration is shown, for example, in Patent Document 1 (Japanese Patent Laid-Open No. 5-157163).

However, in such an electrically-driven gearbox, the clutch actuation time and the gear shift operation time depend greatly on the performance of the actuator and the motor. Therefore, depending on the performance of them, when shift operation is carried out in vehicle driving, the clutch connection/disconnection time is long and the time until the completion of gear shift actuation is long, so that interruption of the driving force occurs. In addition, the driver is often made to feel that the time until gear shift completion is longer compared with a manual operation vehicle.

In particular, for the saddle-ridden vehicle for sports driving, a light-weight, small-size gearbox capable of rapid gear shift operation without such driving force interruption is desired.

SUMMARY

Embodiments of the present invention are made in consideration of such a problem, and an object thereof is to provide a gearbox of a saddle-ridden vehicle that is capable of rapid gear shift operation without interruption of the driving force and is allowed to have light weight and small size.

In one embodiment of the invention, there is provided a gearbox of a saddle-ridden vehicle. The gearbox has a transmission mechanism mounted on a saddle-ridden vehicle. Driving force generated by a power source is input to the transmission mechanism. The transmission mechanism performs gear shift by a plurality of transmission gears on power train shafts divided for odd stages and even stages and outputs the driving force. The gearbox further has a clutch mechanism having a plurality of clutches that allow mutually independent connection/disconnection operation and are each assigned to a respective one of the power train shafts. The gearbox includes a gear change mechanism that is interlocked with a change pedal shaft to which rotational force by operation of a shift pedal is transmitted and arbitrarily selects a transmission gear of the transmission mechanism to perform gear shift, and a control device that electronically controls connection/disconnection of the clutch mechanism according to the shift position of the gear change mechanism.

In another embodiment, the gear change mechanism can have a shift drum that is rotated by foot operation of a driver and exclusively sets one of the transmission gears to a dog-in state to link the driving force, and a gear position sensor that detects the rotation angle of the shift drum to detect the shift stage of the selected transmission gear. The control device receives a gear shift instruction by the driver based on a detection result of the gear position sensor and carries out control to connect/disconnect the plurality of clutches.

In another embodiment, the gear change mechanism has an intermittent feed mechanism that converts swing motion by the shift pedal to rotational motion of the shift drum. A shift spindle rotation sensor is located at the swing center of the intermittent feed mechanism and can detect the rotation angle of an interlocking shaft that interlocks the shift pedal with the shift drum. The control device receives a gear shift instruction by the driver based on a detection result of the gear position sensor and carries out control to connect/disconnect the plurality of clutches.

In another embodiment, a stopper retaining part that has a circular disc shape and has concave parts and convex parts alternately disposed at predetermined angles is made in the shift drum. The gear change mechanism has a stopper portion that is biased against the stopper retaining part and stops rotation of the shift drum at a position at which the stopper portion gets into one of the concave parts to keep the shift drum at a predetermined shift stage. The control device starts connection/disconnection control of the clutch mechanism if an angle detected by the gear position sensor surpasses an angle from the concave part to the top of the next convex part and further surpasses a predetermined angle.

In another embodiment, the intermittent feed mechanism is configured by a ratchet mechanism. The predetermined angle is set to an angle that is equal to or larger than an angle at which the ratchet mechanism is reset and is equal to or smaller than an angle at which the shift pedal reaches a stopper position.

In another embodiment, the control device detects a predetermined angle surpassing an angle to the next convex part in both forward rotation and reverse rotation of the shift drum to start connection/disconnection control of the clutch mechanism.

In another embodiment, an angle at which the control device starts connection/disconnection of the clutch mechanism is set to the same predetermined angle in both forward rotation and reverse rotation of the shift drum.

In another embodiment, the saddle-ridden vehicle includes a clutch operation element allowing the clutch mechanism to carry out connection/disconnection control in accordance with intention of the driver. The control device receives an operation signal from the clutch operation element to output a clutch connection/disconnection instruction to the clutch mechanism.

In another embodiment, the clutch operation element is configured by an electronic system based on a switch measure operable by a single finger.

According to certain embodiments, the gear change mechanism configuring the gearbox of a saddle-ridden vehicle is provided as a mechanism driven by only manual operation (foot operation) based on shift pedal operation of the driver. Furthermore, the clutch mechanism is configured by the plural clutches assigned to the transmission gears of the odd stages and the even stages and connection/disconnection of them is electronically controlled according to the shift position of the gear change mechanism. Thus, while interruption of driving force in the clutch mechanism can be eliminated, gear shift of the gear change mechanism is made to depend on the operation of the driver and thereby the driver is kept from feeling delay in the time until gear shift completion. In addition, the electronic drive system of the gear change mechanism can be reduced and size reduction and weight reduction of the gearbox can be achieved.

In some embodiments, the gear shift instruction by the driver is detected and the connection/disconnection control of the clutch mechanism is carried out based on the detection result of the gear position sensor that detects the rotation angle of the shift drum of the gear change mechanism. Thus, the connection/disconnection timing of the clutch can be detected by utilizing the gear position sensor. Accordingly, without adding another sensor to detect the gear shift instruction by the driver, suppression of increase in the number of sensors and simplification of the circuit configuration and algorithm of the control device can be achieved.

In certain embodiments, the shift spindle rotation sensor that detects the rotation angle of the interlocking shaft of the intermittent feed mechanism of the gear change mechanism is provided, and the gear shift instruction by the driver is detected to control the clutch mechanism based on the detection result of this sensor. Due to this feature, gear shift intention of the driver can be surely detected and enhancement of the gear shift accuracy can be achieved.

In certain embodiments, connection/disconnection control of the clutch mechanism is started if the angle detected by the gear position sensor surpasses the angle from the concave part of the stopper retaining part to the next convex part and surpasses the predetermined angle. Thus, it is recognized that gear shift operation is carried out and the clutch mechanism is controlled at the completion timing of the gear shift operation by the driver. Therefore, sure clutch control based on the gear shift operation can be carried out with high accuracy.

In certain embodiments, the predetermined angle at which connection/disconnection control of the clutch mechanism is started is set between the angle at which the ratchet mechanism is reset and the angle at which the shift pedal reaches the stopper position. Thereby, connection/disconnection control of the clutch mechanism is carried out in the state in which sure gear shift operation of the gearbox has been carried out. Thus, sure clutch control can be carried out in association with gear shift operation.

In some embodiments, irrespective of whether the rotation of the shift drum is forward rotation or reverse rotation, the predetermined angle surpassing the angle to the next convex part is detected and connection/disconnection control of the clutch mechanism is started. Due to this feature, sure clutch control based on gear shift operation can be carried out with high accuracy in both shift-up and shift-down.

In some embodiments, the predetermined angle is set to the same angle irrespective of whether the rotation of the shift drum is forward rotation or reverse rotation. Due to this feature, there is no difference in the start timing of connection/disconnection of the clutch mechanism and the driver is not given an uncomfortable feeling of connection/disconnection of the clutch mechanism in shift-up or shift-down.

In certain embodiments, the clutch operation element enabling connection/disconnection control of the clutch mechanism in accordance with driver's intention is provided and the control device receives an operation signal of this clutch operation element to output the clutch connection/disconnection instruction so that the connection/disconnection control of the clutch mechanism can be carried out in accordance with driver's intention instead of automatic control by the control device. Therefore, the clutch mechanism allowing clutch operation from automatic clutch operation to manual clutch operation can be configured through addition of the clutch operation element and small-scale change in the control device. Thus, the saddle-ridden vehicle permitting plural kinds of operation with the single vehicle can be provided at low cost.

In certain embodiments, by employing an electronic switch measure as the clutch operation element, the operation load can be reduced compared with conventional mechanical switch measures. Thus, operation with a simple switch measure is allowed and reduction of the burden of driving operation can be achieved.

DETAILED DESCRIPTION

Gearboxes of a saddle-ridden vehicle according to embodiment examples of the present invention will be described below with reference to FIGS. 1 to 33.

First, a saddle-ridden vehicle 10 to which a gearbox according to the present embodiment is applied will be described with reference to FIGS. 1 to 33.

Figure 1:
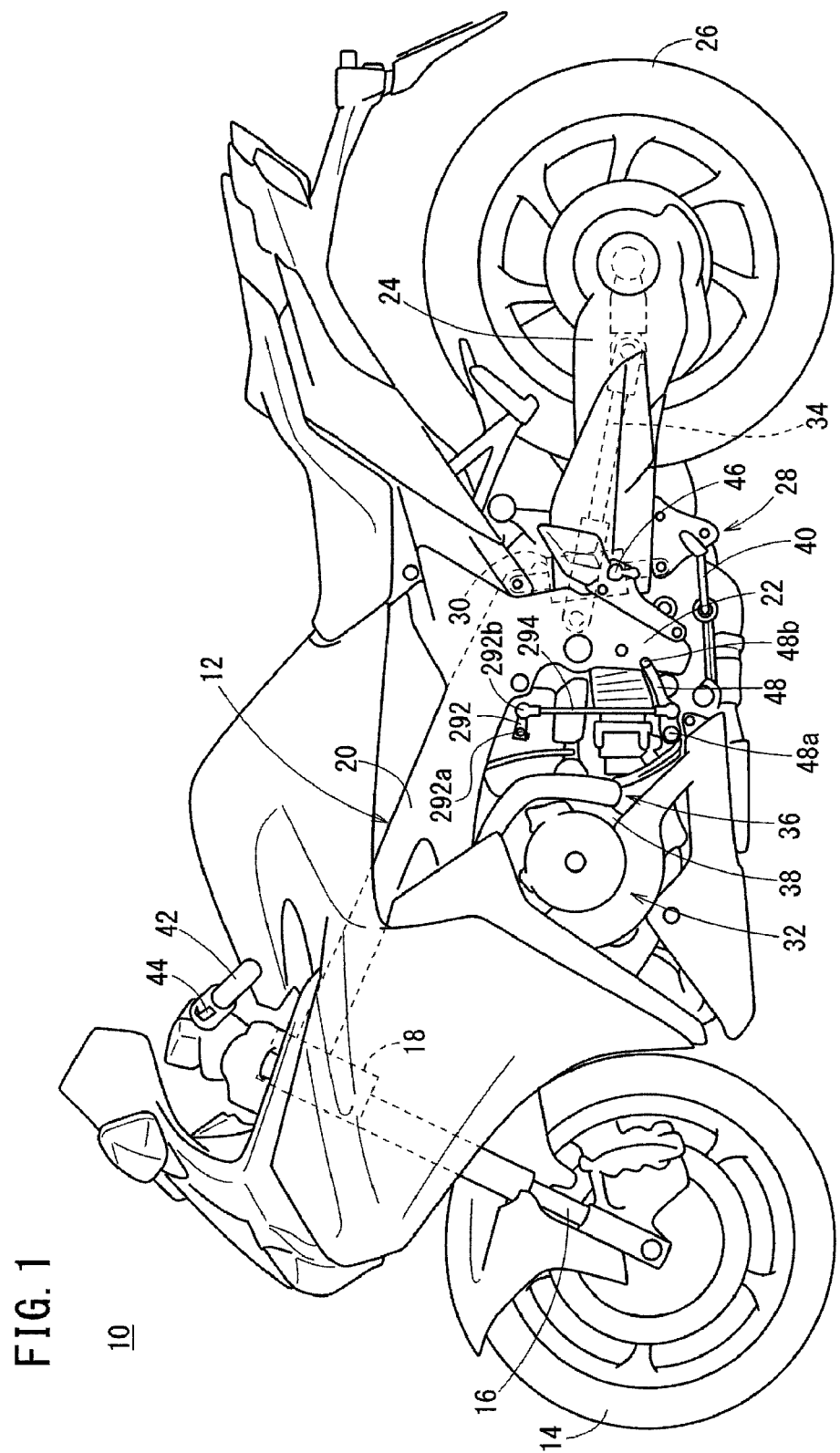
FIG. 1 is a side view showing one example of a saddle-ridden vehicle on which a gearbox according to embodiments of the present invention is mounted.

As shown in FIG. 1, a vehicle body frame 12 of the saddle-ridden vehicle 10 that is a saddle-ridden vehicle has a head pipe 18 that steerably supports a front fork 16 rotatably supporting a front wheel 14, a pair of left and right main frames 20 extending from this head pipe 18 rearward and downward, and a pair of left and right pivot plates 22 that are provided continuously with rear parts of both the main frames 20 and extend downward. A rear wheel 26 is rotatably supported on a rear part of a swing arm 24 whose front end is swingably supported by a pivot plate 22. In addition, a link 28 is provided between a lower part of the pivot plate 22 and a front part of the swing arm 24, and a cushion unit 30 is provided between an upper part of the pivot plate 22 and the link 28.

A power unit 32 is suspended on a main frame 20 and the pivot plate 22 and rotational power output from this power unit 32 is transmitted to the rear wheel 26 via a drive shaft 34 extending forward and rearward.

A side stand 40 is attached to an engine main body 38 of an engine 36 (power source) included in the power unit 32 or the vehicle body frame 12. In this embodiment, the side stand 40 is attached to a lower part of the left pivot plate 22 in the vehicle body frame 12. Therefore, the saddle-ridden vehicle 10 is inclined to the left when being parked with the side stand 40 made upright.

A pair of left and right handles 42 are each attached to an upper end part of the front fork 16. A grip part of the right handle 42 (not shown) is made as a throttle grip and a front brake lever is disposed in front of it. A clutch-OFF switch 44 (clutch operation element) to disconnect a clutch is disposed in front of a grip part of the left handle 42.

Left and right steps 46 for a driver are each attached to a rear part of a respective one of the left and right pivot plats 22 with the intermediary of a step holder. In particular, in front of the left step 46, a shift pedal 48 with which gear shift operation (shift operation) by manual operation (foot operation) is carried out is disposed.

Figure 2:
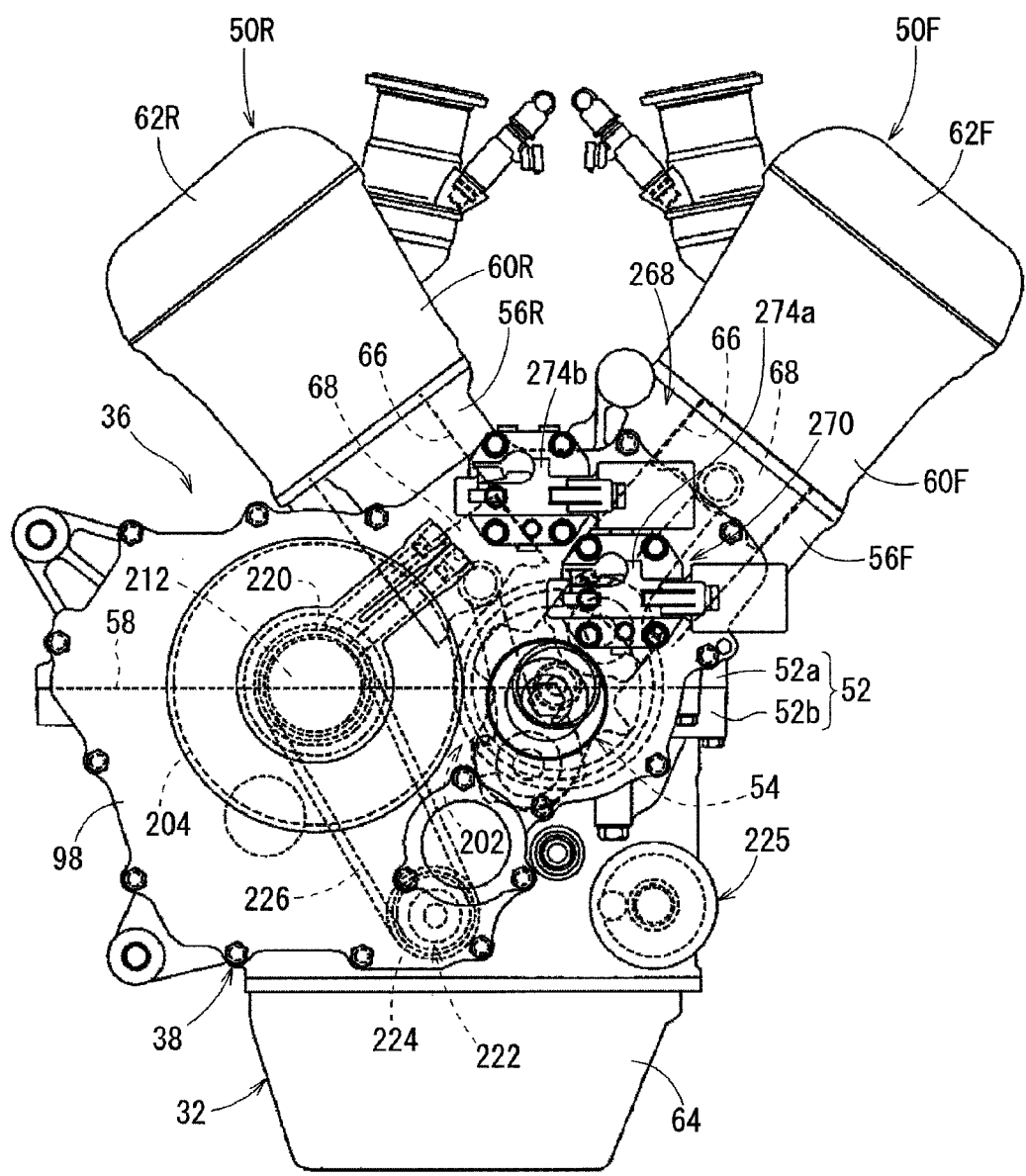
FIG. 2 is a side view showing one example of an engine mounted on the saddle-ridden vehicle.

As shown in FIG. 2, the engine main body 38 of the engine 36 is configured as a V-shape water-cooled engine. It has a front bank 50F located forward in the state in which the engine main body 38 is mounted on the saddle-ridden vehicle 10 and a rear bank 50R located more rearward than this front bank 50F. A crankshaft 54 along a left-right direction of the saddle-ridden vehicle 10 is rotatably supported by a crankcase 52 common to both the banks 50F and 50R.

The crankcase 52 is configured by coupling of an upper case half body 52a and a lower case half body 52b. Front and rear cylinder blocks 56F and 56R are formed monolithically with the upper case half body 52a in such a manner as to form a V-character. An axis line of the crankshaft 54 is disposed on a coupling plane 58 of the upper case half body 52a and the lower case half body 52b.

The front bank 50F is configured by the front cylinder block 56F, a front cylinder head 60F coupled to the front cylinder block 56F, and a front head cover 62F coupled to the front cylinder head 60F. The rear bank 50R is configured by the rear cylinder block 56R, a rear cylinder head 60R coupled to the rear cylinder block 56R, and a rear head cover 62R coupled to the rear cylinder head 60R. An oil pan 64 is coupled to a lower part of the crankcase 52.

Two cylinder bores 66 arranged along the axis line of the crankshaft 54 are formed in the front cylinder block 56F, and the front cylinder block 56F is so coupled to the crankcase 52 that axis lines of the cylinder bores 66 are inclined forward in the state in which the engine main body 38 is suspended on the vehicle body frame 12. Furthermore, two cylinder bores 66 arranged along the axis line of the crankshaft 54 are formed in the rear cylinder block 56R, and the rear cylinder block 56R is so coupled to the crankcase 52 that axis lines of the respective cylinder bores 66 are inclined rearward in the state in which the engine main body 38 is suspended on the vehicle body frame 12. Moreover, pistons 68 slidably fitted in both the cylinder bores 66 of the front bank 50F and pistons 68 slidably fitted in both the cylinder bores 66 of the rear bank 50R are connected to the crankshaft 54 in common.

Figure 3:
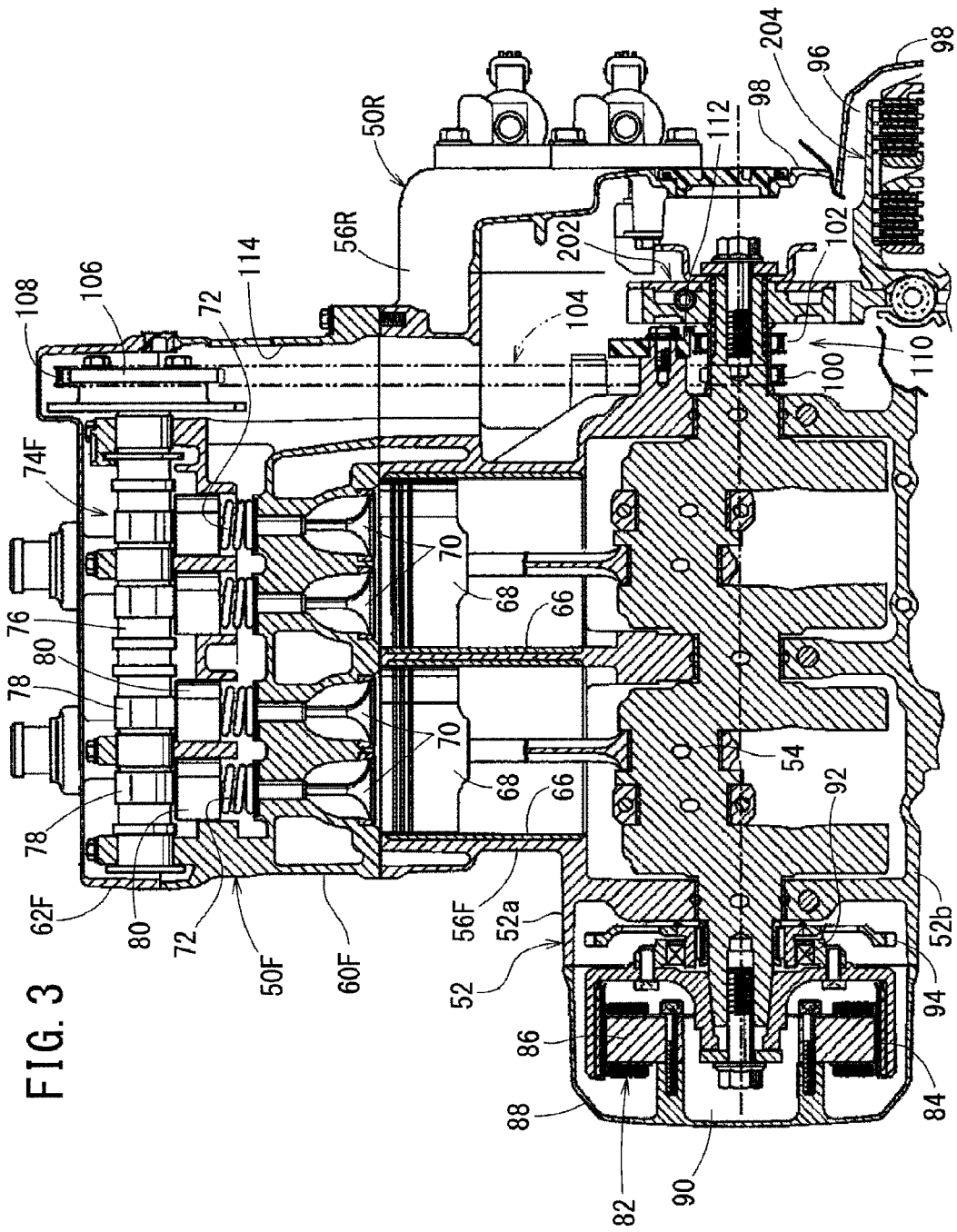
FIG. 3 is a sectional view showing various kinds of members such as a crankshaft set in a crankcase of the engine.

As shown in FIG. 3, in the front cylinder head 60F, a pair of intake valves 70 are disposed for each of the cylinder bores 66 in such a manner as to be biased toward a valve-closing direction by a pair of valve springs 72 and be capable of open/close actuation. In addition, a pair of exhaust valves (not shown) are disposed for each of the cylinder bores 66 in such a manner as to be biased toward the valve-closing direction by valve springs and be capable of open/close actuation. These intake valves 70 and exhaust valves are open/close-driven by a front-bank valve actuator 74F.

The front-bank valve actuator 74F includes a camshaft 76 that is rotatably supported by the front cylinder head 60F with an axis line parallel to the crankshaft 54 and is disposed above the intake valves 70. Intake valve lifters 80 are set between plural (four, in this embodiment) intake cams 78 provided on this camshaft 76 and the intake valves 70 and are slidably fitted in the front cylinder head 60F. A rocker arm is provided, and has, at one end, a roller in rolling contact with plural (four, in this embodiment) exhaust cams (not shown) provided on the camshaft 76. In addition, to the other end of the rocker arm, a tappet screw abutting against upper ends of stems of the respective exhaust valves is so screwed that its advance/retreat position can be adjusted. The rocker arm is swingably supported by a rocker shaft that has an axis line parallel to the camshaft 76 and is fixedly disposed on the front cylinder head 60F.

In the rear cylinder head 60R, a pair of intake valves 70 and a pair of exhaust valves are so disposed for each of the cylinder bores 66 as to be biased toward the valve-closing direction by valve springs and be capable of open/close actuation. These intake valves 70 and exhaust valves are open/close-driven by a rear-bank valve actuator (not shown).

An electric generator 82 is coupled to a left end part of the crankshaft 54 in the state in which the engine main body 38 is mounted on the vehicle body frame 12. This electric generator 82 is composed of a rotor 84 fixed to the crankshaft 54 and a stator 86 fixedly disposed in the rotor 84 and is housed in a generator housing chamber 90 composed of the crankcase 52 and a generator cover 88 coupled to a left side surface of this crankcase 52. The stator 86 is fixed to the generator cover 88.

In addition, a gear 94 is coupled to the rotor via a one-direction clutch 92 enabling power transmission toward the rotor 84 and power from a starter motor (not shown) is transmitted to this gear 94.

To a right side surface of the crankcase 52 in the state in which the engine main body 38 is mounted on the vehicle body frame 12, a clutch cover 98 that forms a clutch chamber 96 with the crankcase 52 is coupled. In the clutch chamber 96, drive sprockets 100 and 102 are fixedly provided on the crankshaft 54. One drive sprocket 100 serves as part of a front-bank timing transmission mechanism 104 that transmits rotational power of the crankshaft 54 to the camshaft 76 in the front-bank valve actuator 74F at a reduction ratio of 1/2. In the front-bank timing transmission mechanism 104, an endless cam chain 108 is wound on the drive sprocket 100 and a driven sprocket 106 provided on the camshaft 76. The other drive sprocket 102 serves as part of a rear-bank timing transmission mechanism 110 that transmits the rotational power of the crankshaft 54 to intake and exhaust camshafts in the rear-bank valve actuator (not shown) at a reduction ratio of 1/2. In this rear-bank timing transmission mechanism 110, an endless cam chain 112 is wound on the drive sprocket 102 and driven sprockets (not shown) provided on the intake and exhaust camshafts, respectively.

A cam chain chamber 114 in which the cam chain 108 is made to travel is formed in the front cylinder block 56F and the front cylinder head 60F. A cam chain chamber (not shown) in which the cam chain 112 is made to travel is formed in the rear cylinder block 56R and the rear cylinder head 60R.

Figure 4:
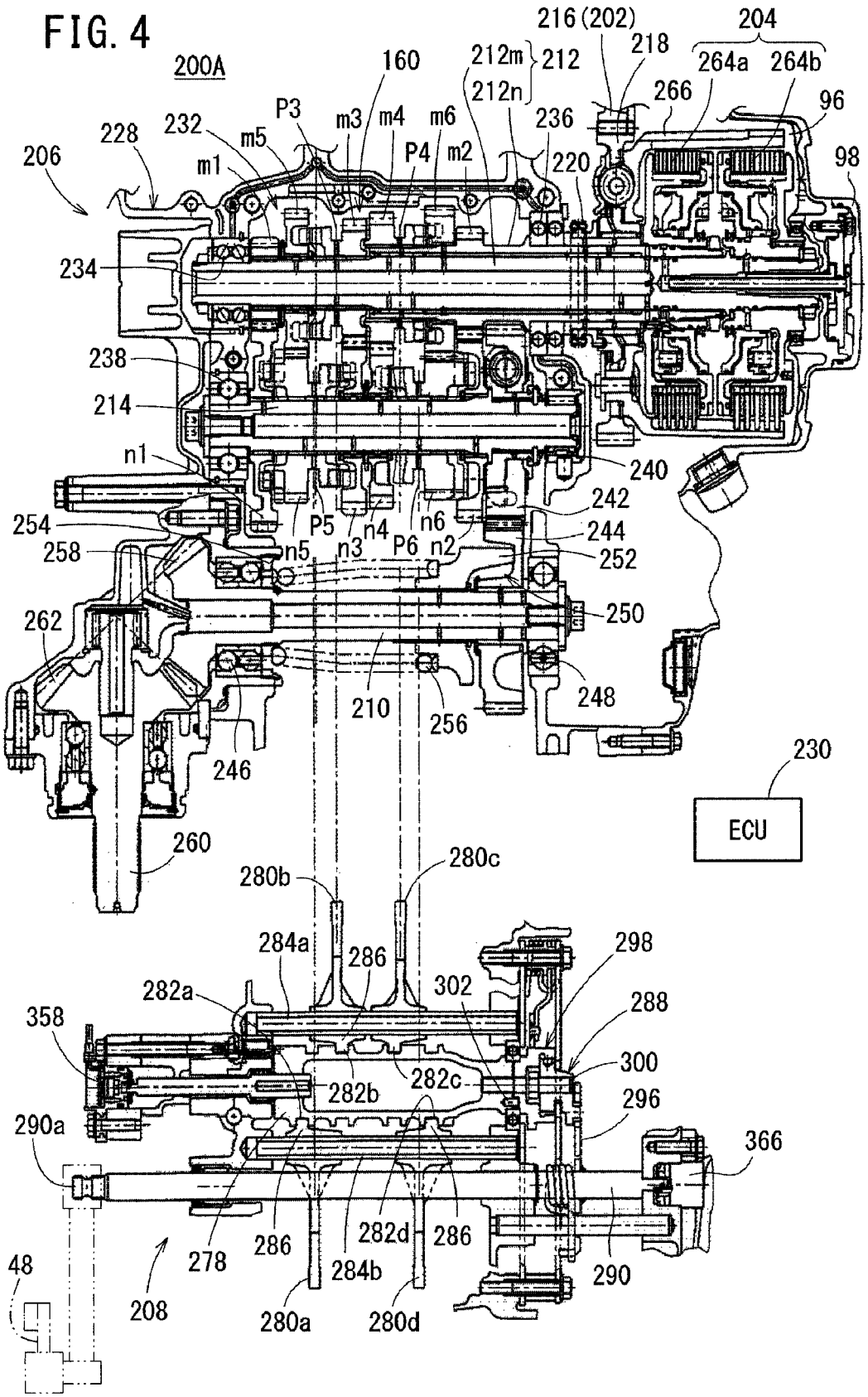
FIG. 4 is a configuration diagram showing a gearbox according to a first embodiment (first gearbox).

As shown in FIG. 4, a gearbox according to a first embodiment (hereinafter, referred to as first gearbox 200A) is set on a power transmission path between the crankshaft 54 and the drive shaft 34. The first gearbox 200A includes a primary reduction mechanism 202 (see FIG. 3), a clutch system 204 (clutch mechanism), a gear transmission mechanism 206 (transmission mechanism), and a drive train shaft 210 in that order from the side of the crankshaft 54. The primary reduction mechanism 202 and the clutch system 204 are housed in the clutch chamber 96 and the gear transmission mechanism 206 is housed in the crankcase 52.

As shown in FIG. 4, the gear transmission mechanism 206 has a main shaft 212 and a countershaft 214 (output shaft) each disposed in parallel to the crankshaft 54 (see FIG. 3). The drive train shaft 210 is also disposed in parallel to the crankshaft 54. The crankshaft 54, the main shaft 212, and the countershaft 214 are disposed at positions corresponding to the coupling plane 58 of the upper case half body 52a (see FIG. 2) and the lower case half body 52b, and the drive train shaft 210 is disposed in front of and below the countershaft 214. A crank-side drive gear 216 of the primary reduction mechanism 202 is fixed to an end of the crankshaft 54 on the side of the cam chain chamber 114 (see FIG. 3) and meshes with a main-side driven gear 218 of the main shaft 212. The main-side driven gear 218 is provided on the main shaft 212 rotatably relative to the main shaft 212 as described later and is connected to the clutch system 204. Due to actuation of this clutch system 204, power transmission between the crankshaft 54 and the main shaft 212 can be broken. A drive sprocket 220 is engaged with the main-side driven gear 218 and rotates integrally with the main-side driven gear 218 irrespective of whether the clutch system 204 is in the on-state or off-state. As shown in FIG. 2, the drive sprocket 220 transmits rotation of the main shaft 212 to a driven sprocket 224 fixed to a pump shaft of an oil pump 222 via a drive chain 226 to drive the oil pump 222.

As shown in FIG. 4, drive gears m1 to m6 (a plural-gear group provided on first and second input shafts) for six speeds are provided on the main shaft 212, and driven gears n1 to n6 (gear group meshing with the gear group, gears of the output shaft) for six speeds are provided on the countershaft 214. The respective drive gears m1 to m6 and driven gears n1 to n6 mesh with each other between the corresponding shift stages and configure transmission gear pairs corresponding to the respective shift stages.

A mission case 228 is monolithically continuous with a rear part of the crankcase 52 (see FIG. 3) and the first gearbox 200A includes, in the mission case 228, the clutch system 204 that connects and disconnects input from the crankshaft 54 (see FIG. 3) and a gearshift system 208 (gear change mechanism) that performs gear shift. The saddle-ridden vehicle 10 has an ECU (Engine Control Unit) 230 acting as a control device to control the clutch system 204 and the gearshift system 208, and the first gearbox 200A including the clutch system 204, the gearshift system 208, and the ECU 230 as its main constituent elements is configured. In FIG. 4, wiring to the ECU 230 is omitted in order to avoid complicated diagrammatic representation.

The first gearbox 200A has the above-described main shaft 212 with an inner-outer dual structure having an inner shaft 212m (one power train shaft) and an outer shaft 212n (an other power train shaft). The countershaft 214 and the drive train shaft 210 are disposed in parallel to this main shaft 212. The above-described transmission gear groups m1 to m6 and n1 to n6 are disposed astride the main shaft 212 and the countershaft 214. The clutch system 204 is coaxially disposed at a right end part of the main shaft 212. A hydraulic supply system (see FIG. 5) supplies hydraulic pressure for actuation to this clutch system 204. The assembly including the main shaft 212, the countershaft 214, the transmission gear groups m1 to m6 and n1 to n6, and the drive train shaft 210 is treated as a transmission 232.

In the main shaft 212, a right part of the inner shaft 212*m* laterally extending is relatively rotatably inserted in the outer shaft 212*n* as shown in FIG. 4. This inner shaft 212*m* is rotatably supported by the outer shaft 212*n* with the intermediary of a bearing. The drive gears m1 to m6 for six speeds in the transmission gear groups are disposed on outer circumferences of the inner shaft 212*m* and the outer shaft 212*n* in a distributed manner. The driven gears n1 to n6 for six speeds in the transmission gear groups are disposed on an outer circumference of the countershaft 214. The respective drive gears m1 to m6 and driven gears n1 to n6 mesh with each other between the corresponding shift stages and configure the transmission gear pairs corresponding to the respective shift stages. The respective transmission gear pairs have a smaller reduction ratio (serve as higher-speed gear) in the order from the first to the sixth.

A left end part of the inner shaft 212*m* reaches a left wall of the mission case 228 and is rotatably supported on this left wall with the intermediary of a ball bearing 234. A right part of the inner shaft 212*m* penetrates a right wall of the mission case 228 to face the inside of the clutch chamber 96, and a laterally intermediate part of this inner shaft 212*m* is rotatably supported on the right wall of the mission case 228 with the intermediary of a laterally intermediate part of the outer shaft 212*n* penetrating the right wall likewise and a ball bearing 236. The clutch chamber 96 is configured by the clutch cover 98 covering the clutch system 204 from the outside.

The outer shaft 212*n* is shorter than the inner shaft 212*m* and its left end part terminates at a laterally intermediate part of the mission case 228. The drive gears m2, m4, and m6 corresponding to even shift stages (second, fourth, sixth) are supported at sites on the outer shaft 212*n* located more leftward than the right wall of the mission case 228. The drive gears m1, m3, and m5 corresponding to odd shift stages (first, third, fifth) are supported at sites on the inner shaft 212*m* located more leftward than the left end of the outer shaft 212*n* (an end part of an outside input shaft).

Left and right end parts of the countershaft 214 are rotatably supported on the left and right walls of the mission case 228 with the intermediary of bearings 238 and 240. A gear 242 is coupled to the right end part of the countershaft 214 and always meshes with a gear 244 of the drive train shaft 210. The drive train shaft 210 is rotatably supported on the left and right walls of the mission case 228 with the intermediary of bearings 246 and 248. A torque damper 250 is disposed for the drive train shaft 210. The torque damper 250 is a component that alleviates torque variation when it is applied, and has a cylindrical member 252 axially movably spline-coupled to the drive train shaft 210. A spring retaining member 254 is fixed to the drive train shaft 210. A coil spring 256 is provided between the cylindrical member 252 and the spring retaining member 254 and the cylindrical member 252 is biased toward the gear 244.

A drive bevel gear 258 is monolithically provided at a left end part of the drive train shaft 210 and meshes with a driven bevel gear 262 provided monolithically with a front end of a shaft portion 260. The shaft portion 260 is coupled to the drive shaft 34 (FIG. 1) extending along a front-rear direction of the vehicle body. This transmits rotation of the drive train shaft 210 to the drive shaft 34.

At sites on the countershaft 214 located inside the mission case 228, the driven gears n1 to n6 corresponding to the respective shift stages in the transmission gear groups are supported in the same order as that of the respective drive gears m1 to m6. An in-shaft oil path to supply oil from the oil pump 222 is formed inside each of the inner shaft 212*m* and the countershaft 214 and the oil is accordingly supplied to the respective transmission gear groups via these in-shaft oil paths.

The clutch system 204 is coaxially disposed at the right end part of the main shaft 212. The clutch system 204 is set between the crankshaft 54 (see FIG. 3) of the engine 36 and the main shaft 212 and adjusts the connection state of the crankshaft 54 and the main shaft 212.

This clutch system 204 has hydraulic odd-stage disc clutch and even-stage disc clutch (hereinafter, referred to simply as first clutch 264*a* and second clutch 264*b*) disposed coaxially with and adjacent to each other (clutch mechanism). These first clutch 264*a* and second clutch 264*b* are coaxially provided at right ends of the inner shaft 212*m* and the outer shaft 212*n*. The first clutch 264*a* is provided for the inner shaft 212*m* and the second clutch 264*b* is provided for the outer shaft 212*n*.

The main-side driven gear 218 meshing with the crank-side drive gear 216 of the crankshaft 54 is coaxially provided for a clutch outer 266 shared by the first clutch 264*a* and the second clutch 264*b*, and rotational driving force from the crankshaft 54 is input to the clutch outer 266 via these crank-side drive gear 216 and main-side driven gear 218. The rotational power input to the clutch outer 266 is individually transmitted to the inner shaft 212*m* and the outer shaft 212*n* according to the connection states of the first clutch 264*a* and the second clutch 264*b*.

Figure 5:
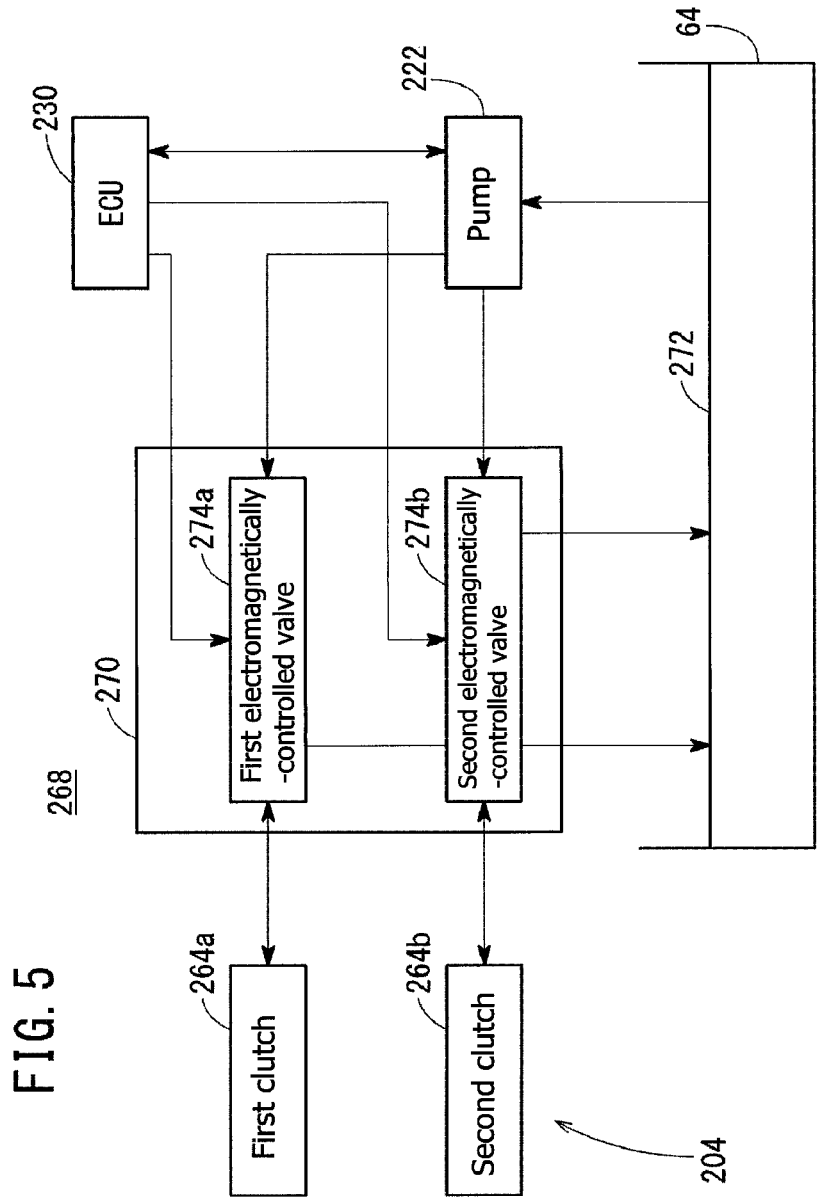
FIG. 5 is a block diagram showing a configuration of a hydraulic supply system.

The connection states of the first clutch 264*a* and the second clutch 264*b* are individually controlled depending on whether hydraulic supply from a hydraulic supply system 268 shown in FIGS. 2 and 5 is present or absent.

As shown in FIGS. 2 and 5, the hydraulic supply system 268 has a clutch control device 270 and the above-described oil pump 222 that pumps up oil 272 (see FIG. 5) in the oil pan 64 and supplies it to the clutch system 204. The clutch control device 270 has a first electromagnetically-controlled valve 274*a* and a second electromagnetically-controlled valve 274*b*.

As shown in FIG. 2, the first electromagnetically-controlled valve 274*a* and the second electromagnetically-controlled valve 274*b* are disposed at positions different in the front-rear direction and an upward-downward direction. In addition, the second electromagnetically-controlled valve 274*b* is disposed more upward than the first electromagnetically-controlled valve 274*a* and more upward than the crankshaft 54, and at least part of, in this embodiment most part of, the first electromagnetically-controlled valve 274*a* disposed below is disposed more forward than the crankshaft 54.

As shown in FIG. 5, the first electromagnetically-controlled valve 274*a* draws and supplies the oil 272 from the oil pump 222 from and to the first clutch 264*a* based on an instruction (first clutch capacity output value Sc1) from the ECU 230. By the supply of the oil 272 to the first clutch 264*a*, the inner shaft 212*m* of the main shaft 212 is connected to the crankshaft 54. By the removal of the oil 272 from the first clutch 264*a*, this connection is broken. The oil 272 removed from the first clutch 264*a* is returned to the oil pan 64.

The second electromagnetically-controlled valve 274*b* draws and supplies the oil 272 from the oil pump 222 from and to the second clutch 264*b* based on an instruction (second clutch capacity output value Sc2) from the ECU 230. By the supply of the oil 272 to the second clutch 264*b*, the outer shaft 212*n* of the main shaft 212 is connected to the crankshaft 54. By the removal of the oil 272 from the second clutch 264*b*, this connection is broken. The oil 272 removed from the second clutch 264*b* is returned to the oil pan 64.

Normally, one of the first clutch 264a and the second clutch 264b is set to the connected state and the other is set to the disconnected state. Furthermore, power transfer in the transmission 232 is carried out by using any transmission gear pair coupled to one of the inner shaft 212m and the outer shaft 212n, and the transmission gear pair to be used next is selected in advance among the transmission gear pairs coupled to the other of the inner shaft 212m and the outer shaft 212n. From this state, one clutch in the connected state, of the first clutch 264a and the second clutch 264b, is set to the disconnected state and the other clutch in the disconnected state thus far is set to the connected state. This switches the power transfer of the transmission 232 to power transfer carried out by using the transmission gear pair selected in advance. Thereby, shift-up or shift-down of the transmission 232 is made.

Specifically, the first clutch 264a is connected at the first, third, and fifth and the second clutch 264b is connected at the second, fourth, and sixth. That is, in the clutch system 204, the first clutch 264a and the second clutch 264b are alternately connected and disconnected on each one shift stage basis from the first to the sixth to perform gear shift. In particular, in the process of shift-up or shift-down, both the first clutch 264a and the second clutch 264b are connected as described later.

As shown in FIG. 4, the transmission 232 is a constant mesh type in which the drive gears m1 to m6 and the driven gears n1 to n6 corresponding to the respective shift stages always mesh with each other. The respective gears m1 to m6 and n1 to n6 are roughly classified into the following three gears: fixed gear that is rotatable integrally with its support shaft (main shaft 212, countershaft 214); free gear that is rotatable relative to the support shaft and is axially immovable; and slide gear that is rotatable integrally with the support shaft and is axially movable. Specifically, the drive gears m1 and m2 are set as fixed gears, the drive gears m3 and m4 are set as slide gears, and the drive gears m5 and m6 are set as free gears. The driven gears n1 to n4 are set as free gears and the driven gears n5 and n6 are set as slide gears. Hereinafter, the drive gears m3 and m4 and the driven gears n5 and n6 will be referred to as the slide gear, and the drive gears m5 and m6 and the driven gears n1 to n4 will be referred to as the free gear. Each slide gear is spline-fitted to its support shaft.

An axially-protruding dog is made on a side surface of the slide gear m3 (gear provided on an inside input shaft) and this dog can be coupled to a dog hole of the free gear m5. For the slide gear n5, a dog is made on each of both sides in the axial direction. One of the dogs can be coupled to a dog hole of the free gear n1 and the other can be coupled to a dog hole of the free gear n3.

A dog is made for the slide gear m4 (gear provided at the end part of the outside input shaft) and this dog can be coupled to a dog hole of the free gear m6. Furthermore, a dog axially protruding toward the opposite side to the dog is made for the slide gear m4 and this dog can be coupled to a dog hole made in the slide gear m3.

For the slide gear n6, a dog is made on each of both sides. One of the dogs can be coupled to a dog hole of the free gear n2 and the other can be coupled to a dog hole of the free gear n4.

The respective dogs and the respective dog holes are so engaged with each other that the corresponding slide gear and free gear are incapable of rotating relative to each other when these gears get close to each other, and this engagement is broken when the slide gear and the free gear get separated from each other. Furthermore, any of the respective slide gears and the corresponding free gear are so engaged with each other via the dog as to be incapable of relative rotation, and thereby the free gear is fixed to the support shaft. This enables power transmission with selective use of the transmission gear pair of any of the first to the sixth between the main shaft 212 and the countershaft 214. In the state in which all engagements between the respective slide gears and free gears are broken, the power transmission between the main shaft 212 and the countershaft 214 is impossible and the neutral state is obtained.

The drive gear m4 provided at the left end of the outer shaft 212n and the drive gear m3 of the inner shaft 212m adjacent to the drive gear m4 are so slid that the drive gear m4 and the drive gear m3 come close to each other, and are integrally connected by coupling of the dog of the drive gear m4 to the dog hole of the drive gear m3. In this state, the outer shaft 212n and the inner shaft 212m are integrally connected via the drive gears m3 and m4 and the outer shaft 212n and the inner shaft 212m can integrally rotate in synchronization. When the drive gear m4 and the drive gear m3 are so slid as to get separated from each other, the coupling of the dog of the drive gear m4 to the dog hole of the drive gear m3 is broken, so that the connection between the outer shaft 212n and the inner shaft 212m is broken.

That is, the dog of the drive gear m4 and the dog hole of the drive gear m3 configure a dog clutch (synchronizing measure) capable of switching the connection state of the outer shaft 212n and the inner shaft 212m. This dog clutch is a measure to synchronize the rotation of the outer shaft 212n and that of the inner shaft 212m.

Next, the gearshift system 208 will be described. As shown in FIG. 4, the gearshift system 208 moves four shift forks (first shift fork 280a, second shift fork 280b, third shift fork 280c, and fourth shift fork 280d) in the axial direction by rotation of a cylindrical shift drum 278 disposed in parallel to the main shaft 212 and the countershaft 214, and switches the transmission gear pair (shift stage) used for power transmission between the main shaft 212 and the countershaft 214. In an outer circumferential surface of the shift drum 278, four cam grooves (first cam groove 282a, second cam groove 282b, third cam groove 282c, and fourth cam groove 282d) to which the first shift fork 280a to the fourth shift fork 280d are fitted are formed. The first cam groove 282a to the fourth cam groove 282d are formed along a circumferential direction of the shift drum 278.

The second shift fork 280b extends toward the main shaft 212 and is fitted into a recess P3 of the slide gear m3 and the third shift fork 280c is fitted into a recess P4 of the slide gear m4. The first shift fork 280a and the fourth shift fork 280d extend toward the countershaft 214. The first shift fork 280a is fitted into a recess P5 of the slide gear n5 and the fourth shift fork 280d is fitted into a recess P6 of the slide gear n6. Base end sides of the first shift fork 280a to the fourth shift fork 280d are each axially movably supported by a pair of shift fork rods (first shift fork rod 284a and second shift fork rod 284b). Sliding protrusions 286 engaged with the first cam groove 282a to the fourth cam groove 282d of the shift drum 278 are provided on the base end sides of the first shift fork 280a to the fourth shift fork 280d.

A right end of the shift drum 278 in FIG. 4 is coupled to a shift spindle 290 (interlocking shaft) via a ratchet mechanism 288 (intermittent feed mechanism) that controls the rotation amount of the shift drum 278.

A base end part of a shift lever 292 is fitted and fixed to a tip part 290a of the shift spindle 290 protruding from the mission case 228 as shown in FIG. 1. This shift lever 292 is linked to the shift pedal 48 via a shift rod 294.

Specifically, a boss part 292a as the base end part of the shift lever 292 is serration-fitted to the tip part 290a of the shift spindle 290. A slit is made in the boss part 292a and the shift lever 292 and the shift spindle 290 are fixed by tightening this slit by using a bolt. A tip side of the shift lever 292 extends rearward and an upper end part of the shift rod 294 is pivotally coupled to a tip part 292b (change pedal shaft) of the shift lever 292.

The shift pedal 48 is so provided that its base end part 48a is pivotally supported by a lower end part of the pivot plate 22 and the tip side obliquely extends toward the rear upper side. A tip part 48b of the shift pedal 48 is disposed at such a position that it can be operated by driver's left foot carried on the left step 46. A lower end part of the shift rod 294 is pivotally coupled to between the base end part 48a and the tip part 48b of this shift pedal 48, so that a shift link mechanism by the shift pedal 48, the shift rod 294, and the shift lever 292 is formed. By operation of the shift pedal 48, the shift spindle 290 and a shift arm 296 rotate by a certain angle via the shift rod 294 and the shift lever 292 as shown in FIG. 4.

Figure 6:
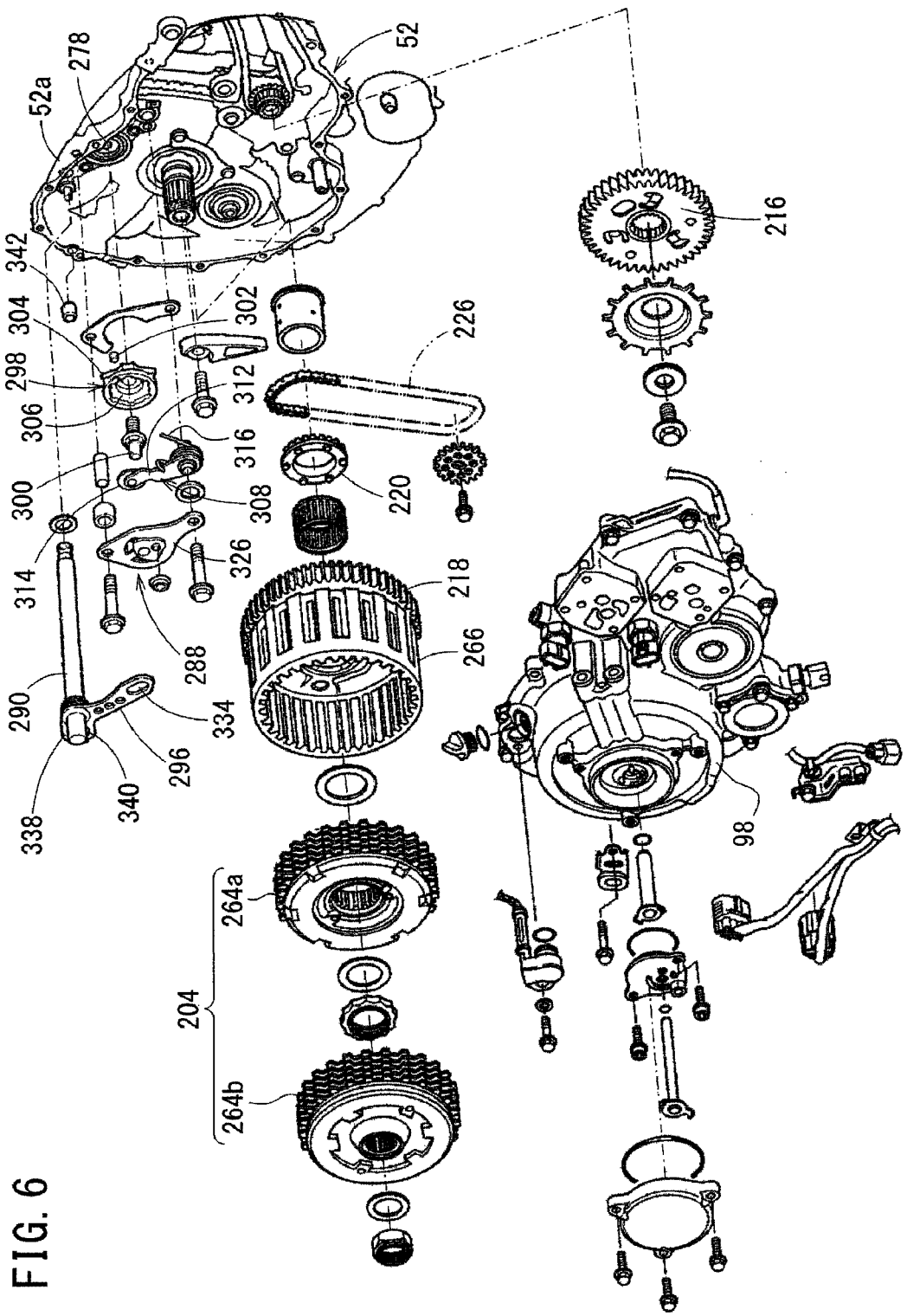
FIG. 6 is an exploded perspective view showing a gearshift system and a clutch system attached to the crankcase.
Figure 7:
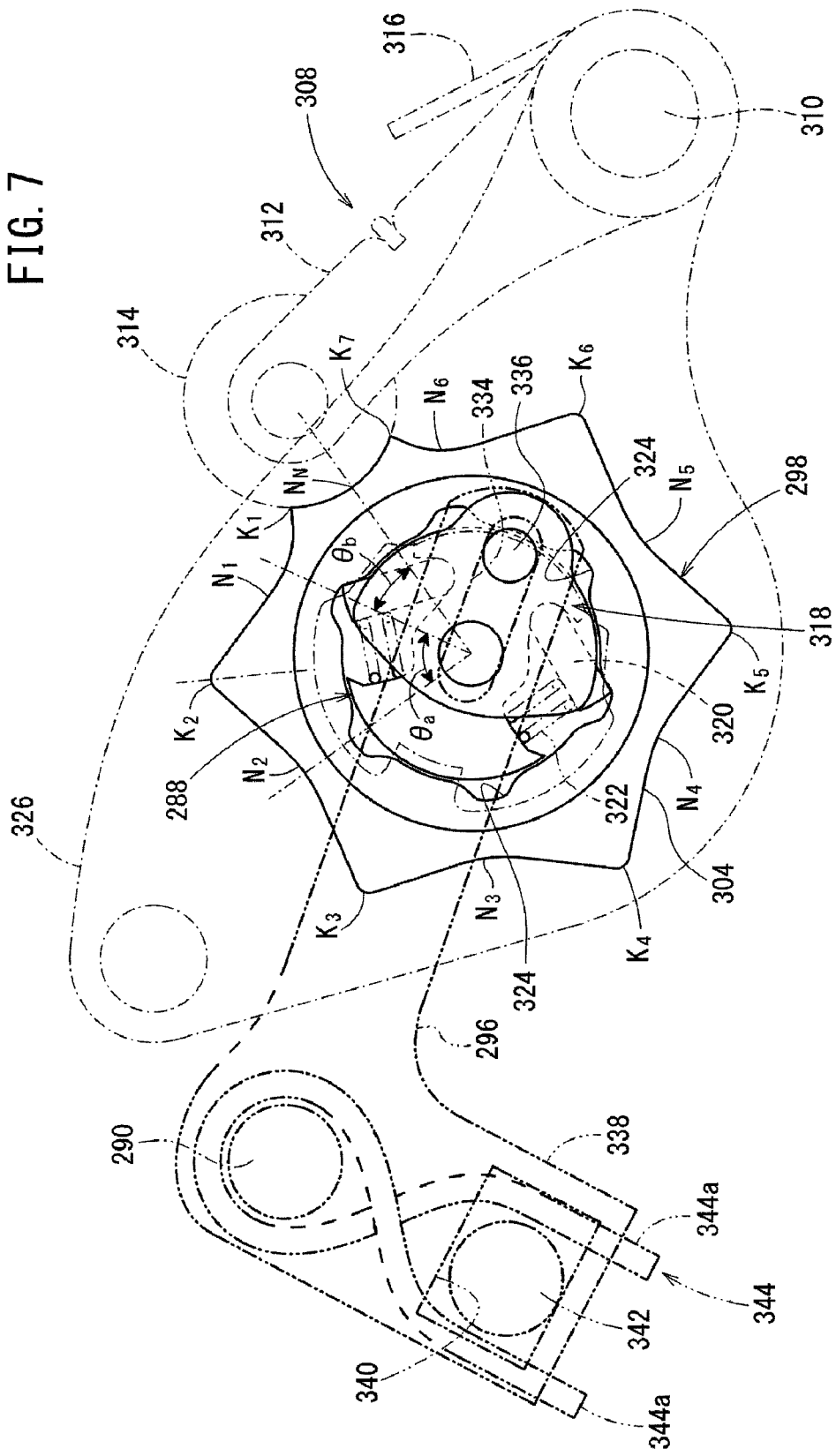
FIG. 7 is an explanatory diagram showing a state of a ratchet mechanism, a shift arm, and a stopper arm in plan view when a shift drum center is positioned to neutral.

As shown in FIGS. 4, 6, and 7, a shift drum center 298 that turns together with the shift drum 278 is fixed to one end of the shift drum 278 by a coaxial bolt 300 and a shift drum pin 302 attached at an eccentric position. As shown in FIG. 6, this shift drum center 298 has a petal-like protrusion part 304 (stopper retaining part) with plural notches formed along its outer circumference at a part opposed to the shift drum 278. Furthermore, the shift drum center 298 has a housing part 306 in which part of the ratchet mechanism 288 to be described later is housed at a part on the opposite side to the shift drum 278.

As shown in FIG. 7, a neutral notch $N_N$ for locating each of the above-described recesses P3 to P6 to the neutral position is formed in an outer circumference of the protrusion part 304. A first notch $N_1$ is formed adjacent to this neutral notch $N_N$ in the anticlockwise direction across a first convex part $K_1$ for example. A second notch $N_2$ is formed adjacent to the first notch $N_1$ across a second convex part $K_2$. A third notch $N_3$ is formed adjacent to the second notch $N_2$ across a third convex part $K_3$. A fourth notch $N_4$ is formed adjacent to the third notch $N_3$ across a fourth convex part $K_4$. A fifth notch $N_5$ is formed adjacent to the fourth notch $N_4$ across a fifth convex part $K_5$. A sixth notch $N_6$ is formed adjacent to the fifth notch $N_5$ across a sixth convex part $K_6$. The pitches of the first notch $N_1$ to the sixth notch $N_6$ (center angle $\theta_a$) are each substantially 60 degrees (59 degrees to 61 degrees). The respective pitches between the neutral notch $N_N$ and the first notch $N_1$ and between the neutral notch $N_N$ and the sixth notch $N_6$ (center angle $\theta_b$) are each substantially 30 degrees (29 degrees to 31 degrees).

A stopper arm 308 (stopper portion) is selectively engaged with the neutral notch $N_N$ and the first notch $N_1$ to the sixth notch $N_6$ made in the protrusion part 304 of the shift drum center 298. As shown in FIG. 6, this stopper arm 308 is composed of an arm 312 and a roller 314. A base end part of the arm 312 is pivotally supported on the upper case half body 52a (see FIG. 6) in the crankcase 52 by a support shaft 310 having an axis line parallel to an axis line of the shift drum 278 and the shift drum center 298. The roller 314 is rotatably supported by a tip of the arm 312 in such a manner as to be engaged with one of the neutral notch $N_N$ and the first notch $N_1$ to the sixth notch $N_6$.

Of these notches, the neutral notch $N_N$ is formed into an arc-like concave shape in order to stabilize the engagement state of the roller 314. The other notches, the first notch $N_1$ to the sixth notch $N_6$, are formed by a curve almost close to a straight line except for that the bottom of the notch is slightly bent. That is, in the case of the first notch $N_1$ for example, a curved surface almost close to an inclined surface is made from the bottom of the first notch $N_1$ to the top of the second convex part $K_2$.

As shown in FIGS. 6 and 7, a torsion spring 316 is set between the base end part of the arm 312 and the upper case half body 52a. The arm 312, i.e. the stopper arm 308, is biased toward the rotation center of the shift drum center 298 by spring force exerted by the torsion spring 316 in order to engage the roller 314 with one of the neutral notch $N_N$ and the first notch $N_1$ to the sixth notch $N_6$.

In shift from neutral to the first and shift from the first to neutral, the shift drum center 298 is rotationally driven by subsequently 30 degrees by the ratchet mechanism 288. In shift from the first to the second, from the second to the third, or the like, it is rotationally driven by subsequently 60 degrees by the ratchet mechanism 288.

Figure 8:
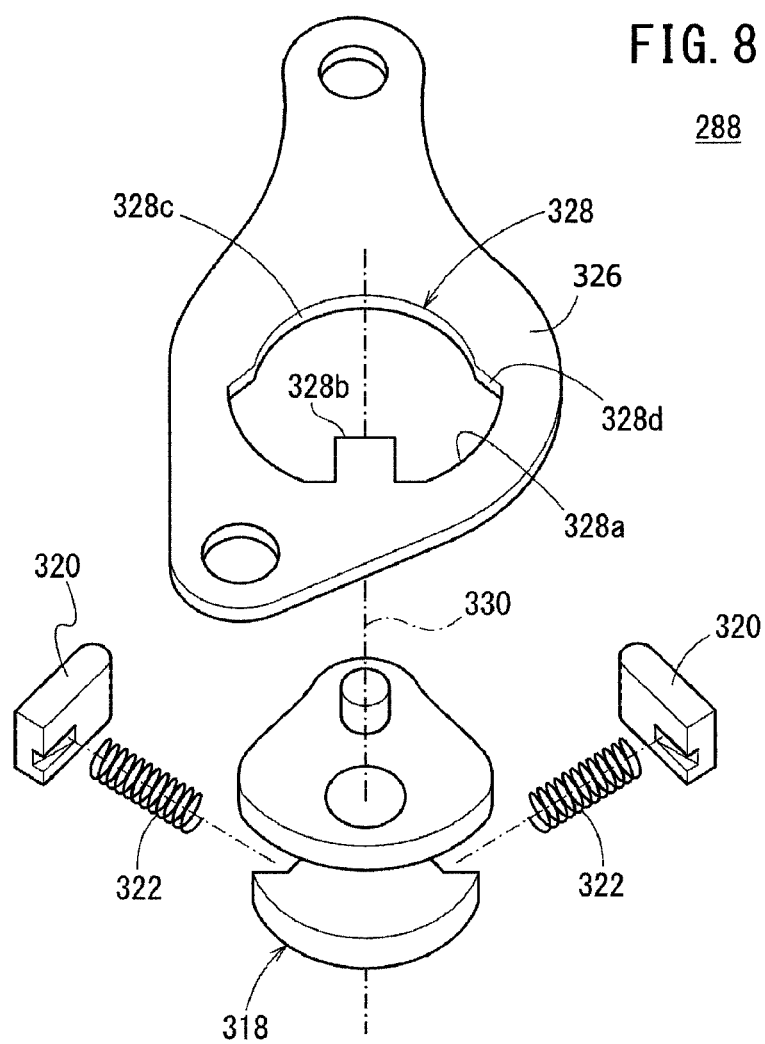
FIG. 8 is an exploded perspective view showing the ratchet mechanism.
Figure 9:
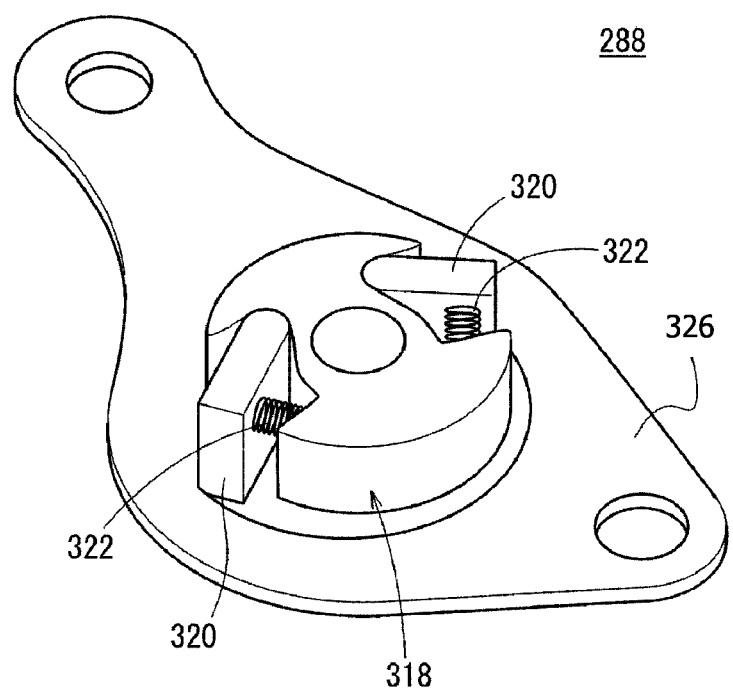
FIG. 9 is a perspective view showing the ratchet mechanism viewed from the backside.

The ratchet mechanism 288 has a drum shifter 318, a pair of ratchet pawls 320, and a pair of springs 322. The drum shifter 318 can rotate about an axis line coaxial with the shift drum center 298 and at least part thereof is disposed in the shift drum center 298. As shown in FIGS. 8 and 9, the ratchet pawls 320 are symmetrically mounted on the drum shifter 318 in such a manner as to stand and fall in a radial direction of the drum shifter 318. The springs 322 bias these ratchet pawls 320 in a standing direction. The ratchet mechanism 288 further has engagement recesses 324 and a fixed guide plate 326. The engagement recesses 324 are made in an inner circumference of the shift drum center 298 at equal intervals in the circumferential direction and the ratchet pawls 320 can be engaged with the engagement recesses 324. The guide plate 326 guides the stood/laid state of the ratchet pawls 320 depending on the rotation of the drum shifter 318.

The drum shifter 318 is so supposed as to be capable of rotating about an axis line of the bolt 300 (see FIG. 6), which connects the shift drum center 298 to one end of the shift drum 278 coaxially.

As shown in FIG. 8, the ratchet pawls 320 are biased in the standing direction by the springs 322. Tip parts thereof protrude from an outer circumference of the drum shifter 318 in the stood state and the tip parts exist at substantially the same positions as that of the outer circumference of the drum shifter 318 in the laid state.

In the inner circumference of the shift drum center 298, the plural (six, in this embodiment) engagement recesses 324 are made at equal intervals in the circumferential direction. In the state in which the stopper arm 308 is engaged with one of the first notch $N_1$ to the sixth notch $N_6$, the tip parts of the ratchet pawls 320 can be selectively engaged with two engagement recesses 324 opposed to each other among the respective engagement recesses 324.

As shown in FIG. 6, the guide plate 326 is fastened to the upper case half body 52a by a pair of bolts at such a position that the shift drum center 298 exists between the guide plate 326 and the upper case half body 52a. As shown in FIG. 8, a guide hole 328 corresponding to the drum shifter 318 is made in this guide plate 326.

This guide hole 328 is composed of a larger-diameter arc part 328a that has the center at a rotational axis line of the shift drum center 298 and the drum shifter 318, i.e. an axis line 330 of the bolt, and is formed with a diameter larger than the outer circumference of the drum shifter 318. A restricting protrusion 328b protrudes from a center part of this larger-diameter arc part 328a more inward than the outer circumference of the drum shifter 318. A smaller-diameter arc part 328c that has the center at the axis line 330 of the bolt is formed with a diameter smaller than the outer circumference of the drum shifter 318. Step parts 328d link both ends of the larger-diameter arc part 328a and both ends of the smaller-diameter arc part 328c. As shown in FIG. 7, the circumferential length of the larger-diameter arc part 328a is set to the length corresponding to that between two engagement recesses 324 with which the tip parts of the two ratchet pawls 320 are engaged.

In addition, when a ratchet pawl 320 engaged with an engagement recess 324 moves toward the smaller-diameter arc part 328c in association with the rotation of the drum shifter 318, a step part 328d abuts against this ratchet pawl 320 to press this ratchet pawl 320 into the laid state. The step parts 328d are disposed more outward than the inner circumference of the shift drum center 298.

As shown in FIGS. 6 and 7, to the shift spindle 290, the shift arm 296 that has a base end part fixed to the shift spindle 290 and extends toward the drum shifter 318 along a radial direction of the shift spindle 290 is fixed. This shift arm 296 extends long along the radial direction of the shift spindle 290 and an engagement pin 336 implanted to the drum shifter 318 at a position offset from a rotational axis line of the drum shifter 318 is engaged with an engagement hole 334 as an elongate hole made at a tip part of the shift arm 296.

Furthermore, as shown in FIG. 7, an arm 338 that forms a substantially L-shape with the shift arm 296 and extends along the radial direction of the shift spindle 290 is monolithically provided continuously with the base end part of the shift arm 296, and an elongate hole 340 is made at a tip part of this arm 338.

As shown in FIGS. 6 and 7, a pin 342 inserted in the elongate hole 340 is implanted to the upper case half body 52a in the crankcase 52 and a clamp spring 344 having at its both ends a pair of clamp arms 344a that sandwich the pin 342 from both sides is so disposed between the shift arm 296 and the arm 338 and the upper case half body 52a as to surround the shift spindle 290. This makes the shift arm 296 and the arm 338 be biased to such a neutral position that the pin 342 exists on a straight line coupling a circumferential center of the elongate hole 340 and an axis line of the shift spindle 290.

Figure 10:
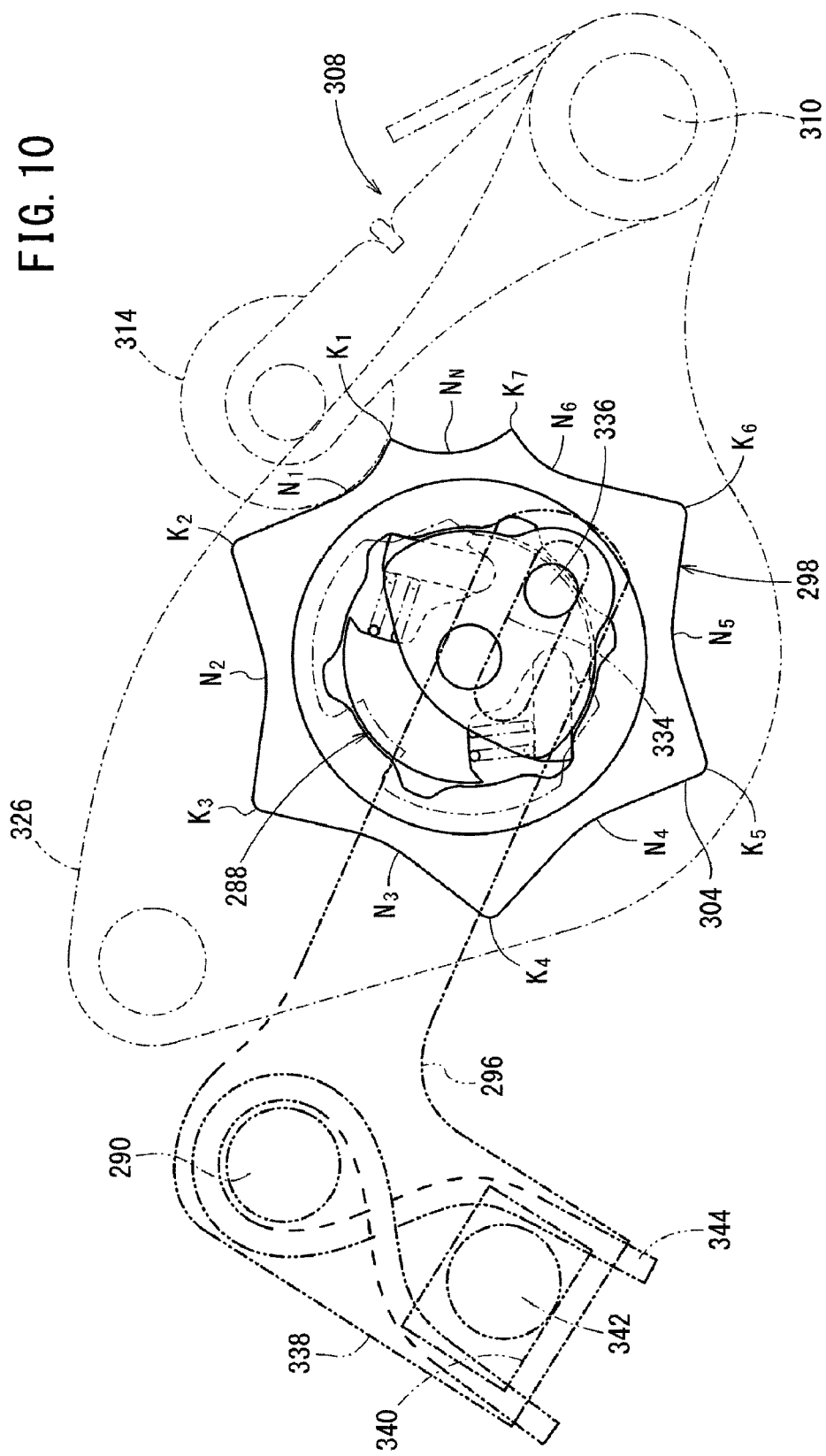
FIG. 10 is an explanatory diagram showing the state of the ratchet mechanism, the shift arm, and the stopper arm in plan view when the shift drum center is rotated from neutral toward the first.
Figure 11:
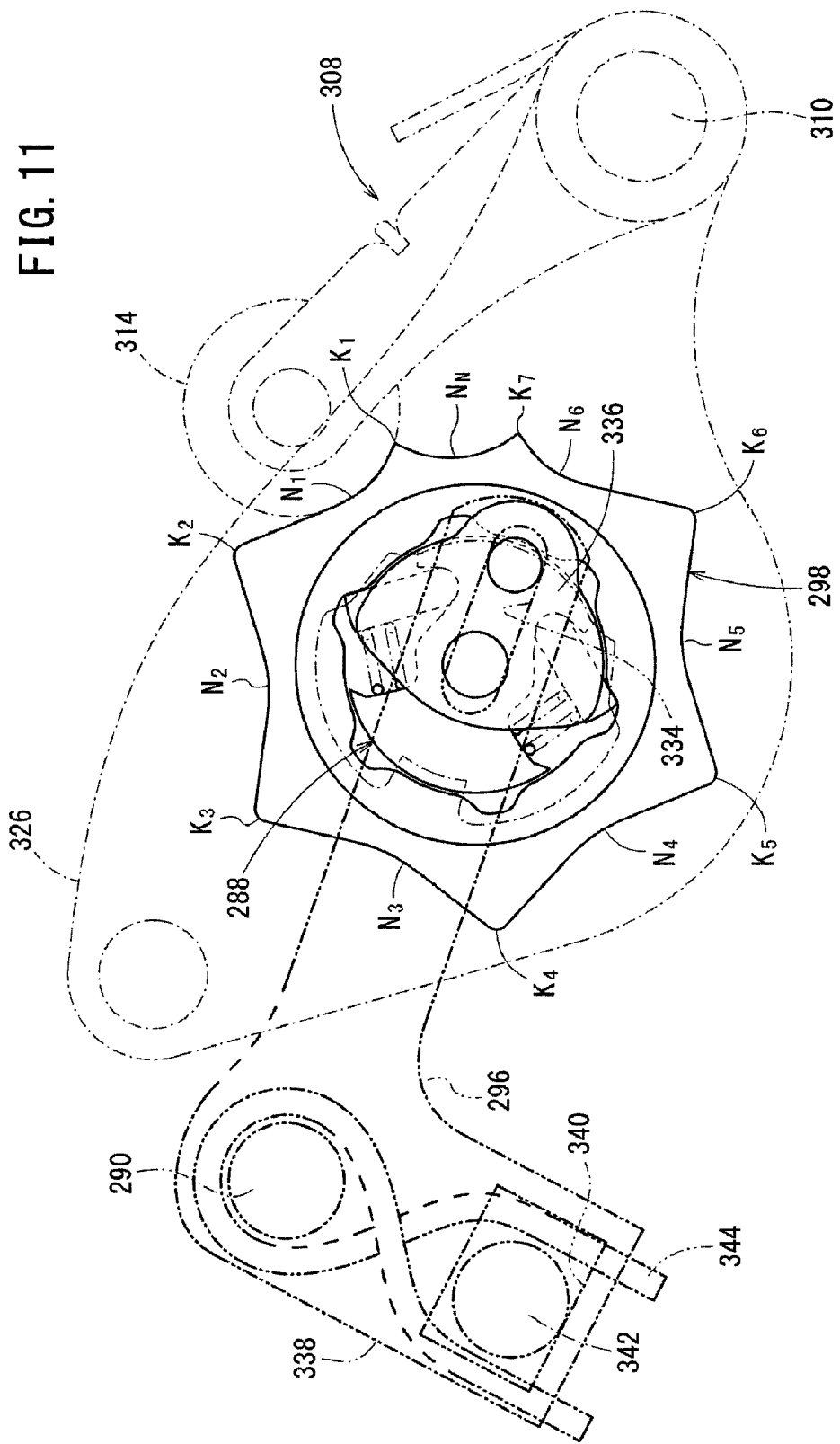
FIG. 11 is an explanatory diagram showing the state of the ratchet mechanism, the shift arm, and the stopper arm in plan view when the shift drum center is positioned to the first after the ratchet mechanism is reset.

Therefore, for example in shift from neutral to the first, from the state of FIG. 7, the shift drum center 298 rotates by rotational driving of the ratchet mechanism 288 in association with rotation of the shift spindle 290, and the roller 314 of the stopper arm 308 gets into the first notch $N_1$ as shown in FIG. 10. Thereafter, as shown in FIG. 11, the drum shifter 318 rotationally reverts to the original position due to biasing of the clamp spring 344 and thereby reset operation of the ratchet mechanism 288 is carried out. Thereafter, the roller 314 of the stopper arm 308 is located at the bottom of the first notch $N_1$ (stage resulting from rotation by substantially 30 degrees from the neutral position) and thereby the rotation of the shift drum center 298 stops.

Figure 12:
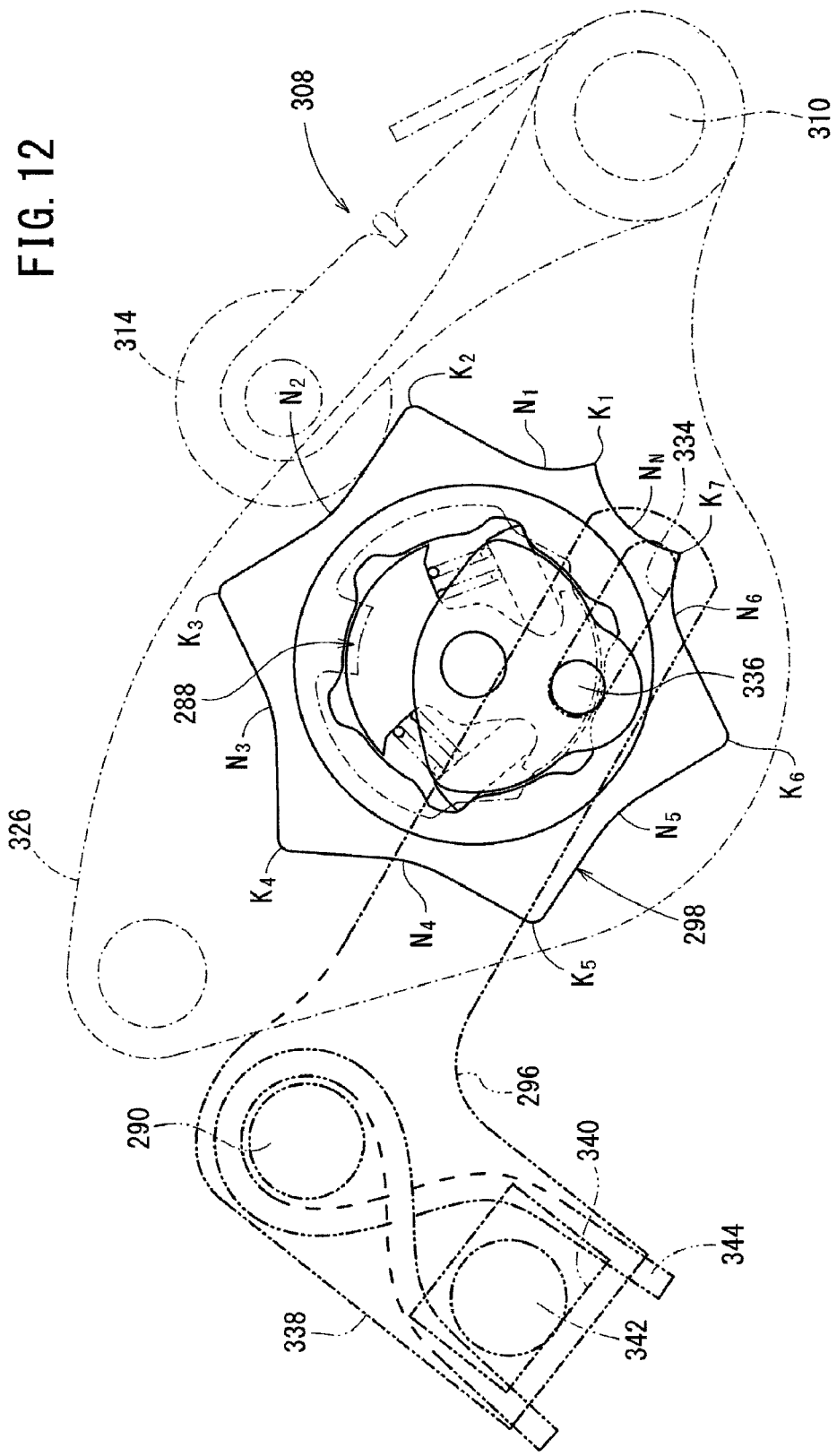
FIG. 12 is an explanatory diagram showing the state of the ratchet mechanism, the shift arm, and the stopper arm in plan view when the shift drum center is rotated from the first toward the second.
Figure 13:
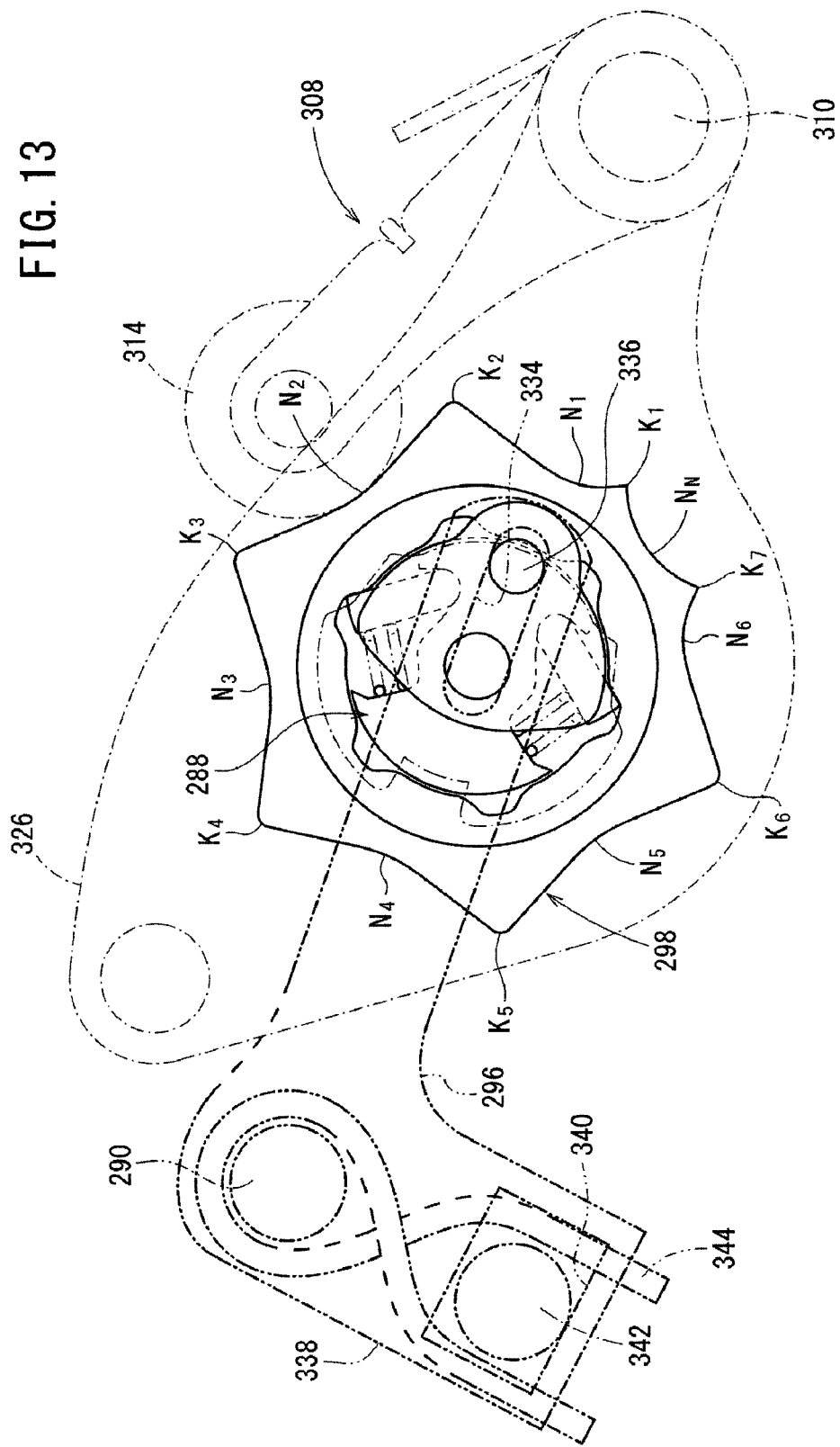
FIG. 13 is an explanatory diagram showing the state of the ratchet mechanism, the shift arm, and the stopper arm in plan view when the shift drum center is positioned to the second after the ratchet mechanism is reset.

This applies also to shift from the first to the second for example. Specifically, from the state of FIG. 11, the shift drum center 298 rotates by rotational driving of the ratchet mechanism 288 in association with rotation of the shift spindle 290, and the roller 314 of the stopper arm 308 gets into the second notch $N_2$ as shown in FIG. 12. Thereafter, as shown in FIG. 13, the drum shifter 318 rotationally reverts to the original position due to biasing of the clamp spring 344, and thereby reset operation of the ratchet mechanism 288 is carried out. Thereafter, the roller 314 of the stopper arm 308 is located at the bottom of the second notch $N_2$ (stage resulting from rotation by substantially 60 degrees from the bottom of the first notch $N_1$) and thereby the rotation of the shift drum center 298 stops. This applies also to shift from the second to the fourth, shift from the fourth to the fifth, and so forth. Furthermore, this applies also to shift-down operation from the second to the first and so forth.

Figure 14:
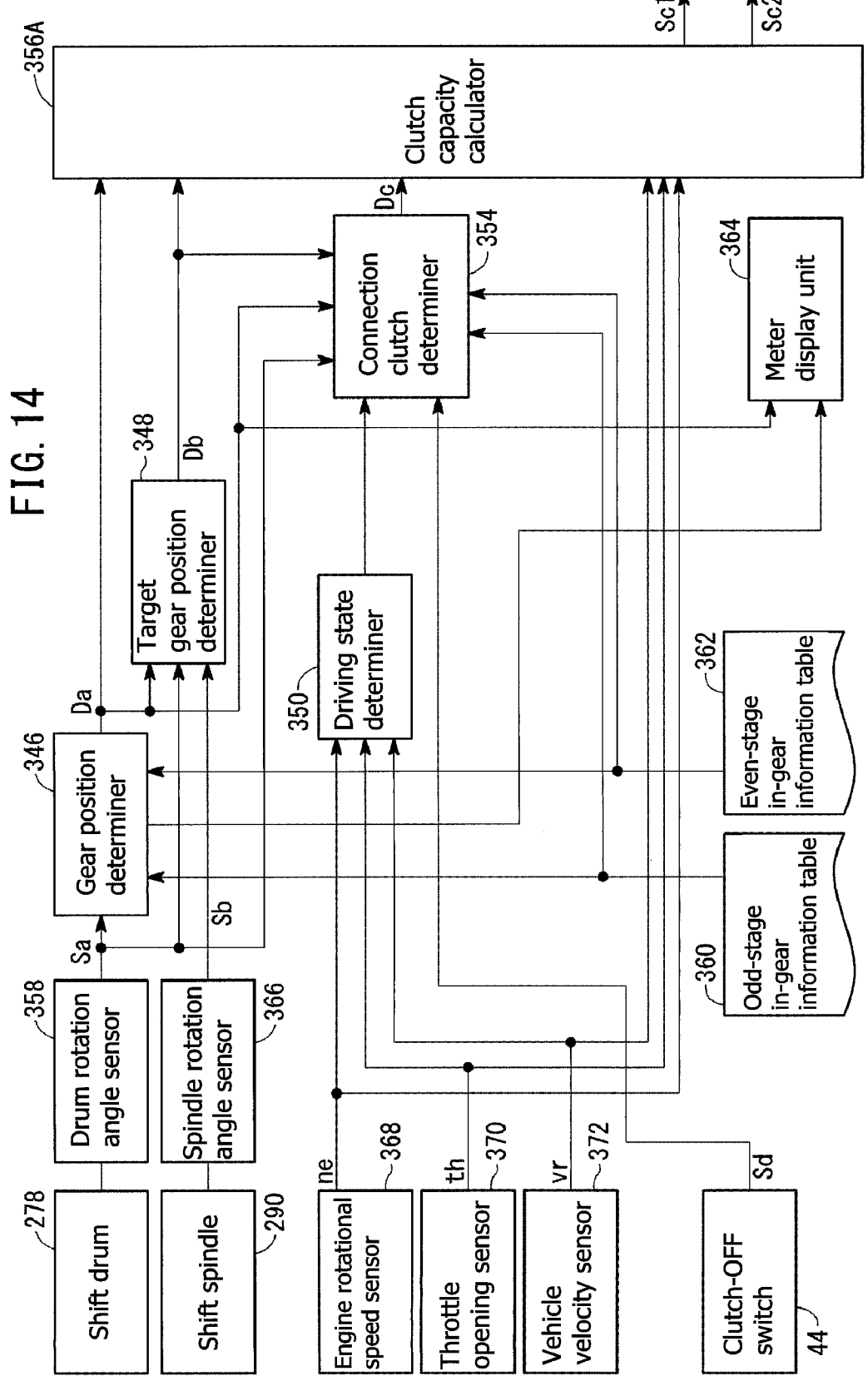
FIG. 14 is a circuit block diagram showing a control system of the first gearbox.

As shown in FIG. 14, the ECU 230 of the first gearbox 200A has a gear position determiner 346, a target gear position determiner 348, a driving state determiner 350, a connection clutch determiner 354, and a first clutch capacity calculator 356A.

The gear position determiner 346 determines the present gear position and outputs it as a gear position determination value Da based on a drum rotation angle signal Sa from a drum rotation angle sensor 358 (gear position sensor) that detects the rotation angle of the shift drum 278, an odd-stage in-gear information table 360, and an even-stage in-gear information table 362. The gear position determination value Da includes "N–N," "1–N," "1–2," "N–2," "3–2," "3–N," "3–4," and so forth. The element in front of "–" denotes the state of the odd stage and the element behind "–" denotes the state of the even stage.

Figure 15:
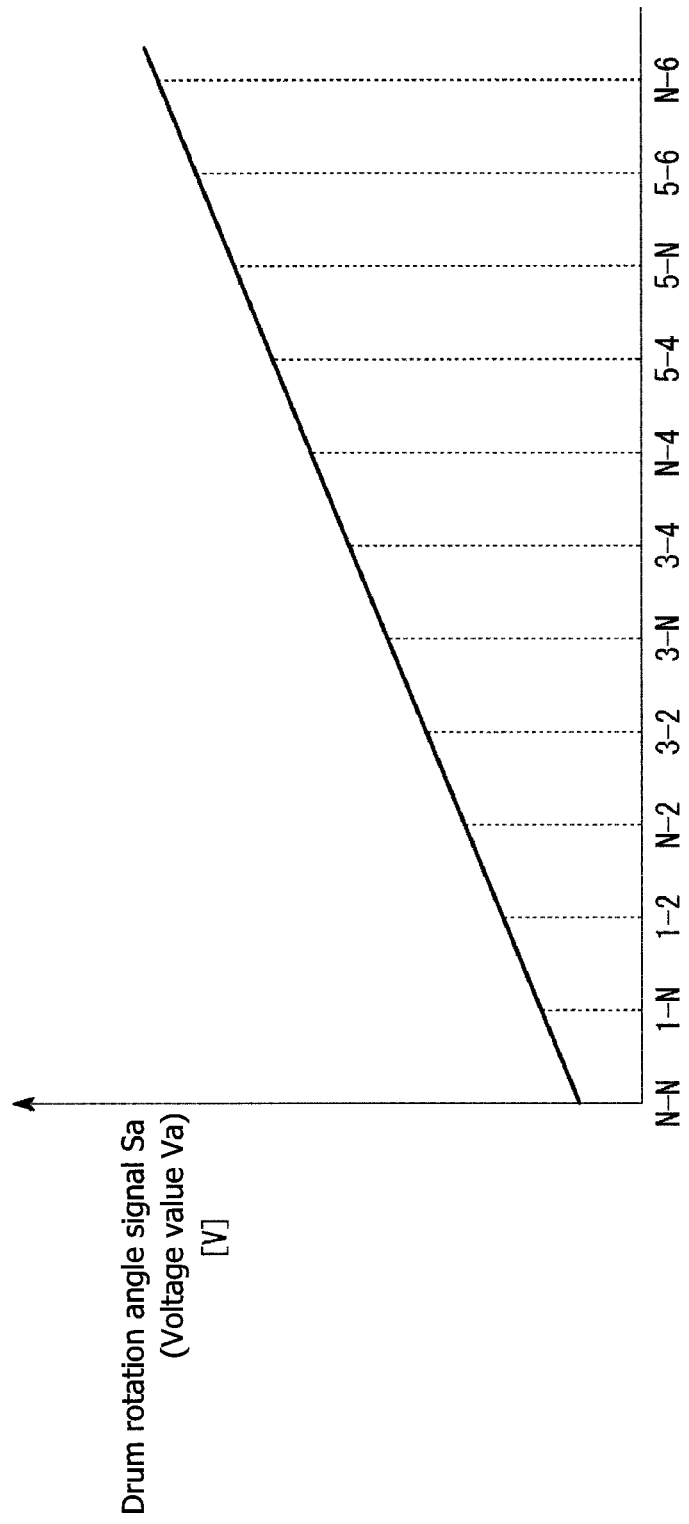
FIG. 15 is a graph showing the relationship between a gear position and a drum rotation angle signal (voltage value).
Figure 16:
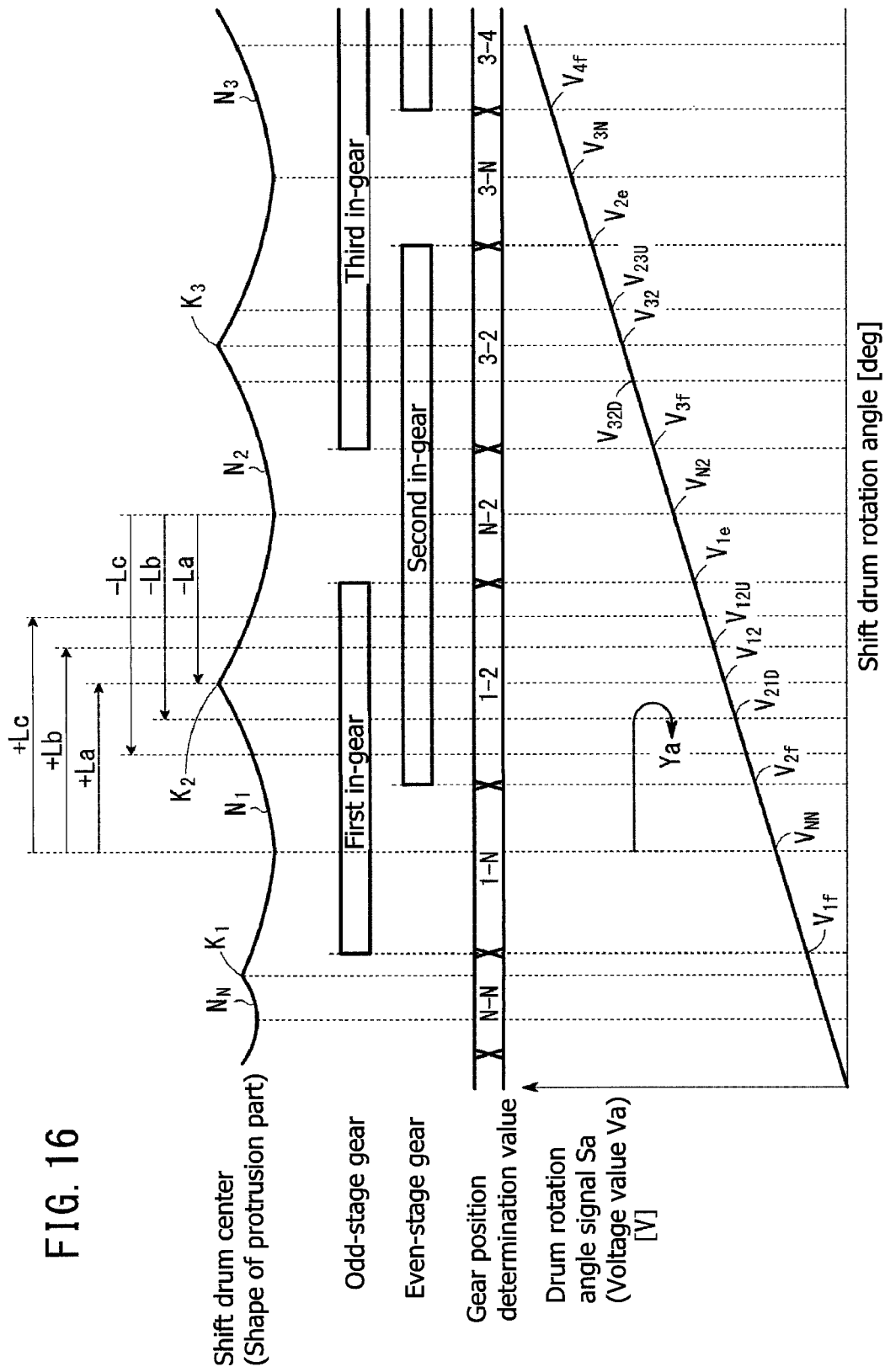
FIG. 16 is an explanatory diagram showing changes in the shape of a protrusion part of the shift drum center (petal shape), the in-gear state of odd-stage gears, the in-gear state of even-stage gears, a gear position determination value, and the drum rotation angle signal (voltage value), which are according to the rotation angle of the shift drum.

The relationship between the present gear position and the drum rotation angle signal Sa (voltage value Va) is as shown in FIGS. 15 and 16 for example.

Specifically, the drum rotation angle signal Sa (voltage value Va) proportionally rises in association with shift-up of the gear position determination value Da. FIG. 16 is an explanatory diagram showing changes in the shape of the protrusion part 304 of the shift drum center 298 (petal shape), the in-gear state of the odd-stage gears, the in-gear state of the even-stage gears, the gear position determination value Da, and the drum rotation angle signal Sa (voltage value Va), which are according to the rotation angle of the shift drum 278.

In FIG. 16, La represents a movement amount (angle) of the shift drum 278 from the bottom of the notch to the top of the convex part adjacent in a gear shift direction. Lb represents the movement amount (angle) of the shift drum 278 from the bottom of the notch via the convex part adjacent in the gear shift direction to a point at which gear shift to the next stage is permitted (shift permission threshold). Lc represents the movement amount (angle) of the shift drum 278 from the bottom of the notch via the convex part adjacent in the gear shift direction to the arrival of the shift pedal 48 at a stopper position of the shift-up side due to abutting of the pin 342 against an edge of the elongate hole 340 of the arm 338. As signs "+" and "–" added to La, Lb, and Lc, "+" represents shift-up and "–" represents shift-down.

Figure 17A:
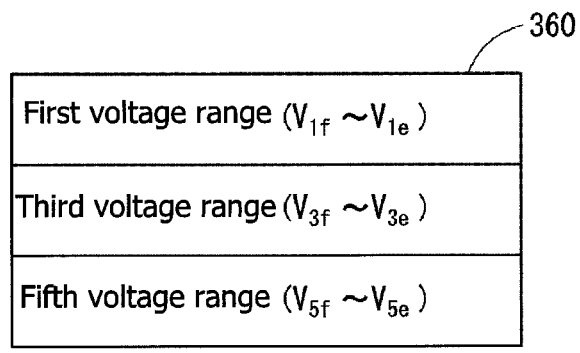
FIG. 17A is an explanatory diagram showing the breakdown of an odd-stage in-gear information table and FIG. 17B is an explanatory diagram showing the breakdown of an even-stage in-gear information table.

As shown in FIG. 17A, in the odd-stage in-gear information table 360, a first voltage range $V_{1f}$ to $V_{1e}$ of the drum rotation angle signal Sa (voltage value Va) in which the first gear is in the in-gear state, a third voltage range $V_{3f}$ to $V_{1e}$ in which the third gear is in the in-gear state, and a fifth voltage range $V_{5f}$ to $V_{5e}$ in which the fifth gear is in the in-gear state are registered.

Figure 17B:
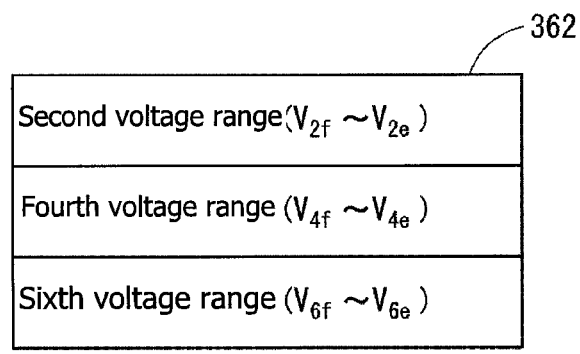

Similarly, as shown in FIG. 17B, in the even-stage in-gear information table 362, a second voltage range $V_{2f}$ to $V_{2e}$ in which the second gear is in the in-gear state, a fourth voltage range $V_{4f}$ to $V_{4e}$ in which the fourth gear is in the in-gear state, and a sixth voltage range $V_{6f}$ to $V_{6e}$ in which the sixth gear is in the in-gear state are registered.

The gear position determiner 346 determines the gear position determination value Da as "N–N" if the drum rotation angle signal Sa (voltage value Va) falls within none of the voltage ranges of the odd-stage in-gear information table 360 and the even-stage in-gear information table 362. The gear position determiner 346 determines the gear position determination value Da as "1–N" if the drum rotation angle signal Sa (voltage value Va) falls within the first voltage range $V_{1f}$ to $V_{1e}$ and does not fall within the second voltage range $V_{2f}$ to $V_{2e}$, and as "1–2" if the drum rotation angle signal Sa (voltage value Va) falls within the first voltage range $V_{1f}$ to $V_{1e}$ and the second voltage range $V_{2f}$ to $V_{2e}$.

This gear position determination value Da is supplied to a meter display unit 364 set between the handles 42 of the saddle-ridden vehicle 10 and a character or numeral corresponding to the gear position determination value Da is displayed in a predetermined display area of this meter display unit 364. If the gear position determination value Da is "N–N," representing neutral is displayed. If the gear position determination value Da is "1–N" or "1–2," the present shift stage is displayed according to the shift stage on a connected clutch side of two clutches. This applies also to the other gear position determination values Da.

The target gear position determiner 348 determines a target gear position as the next gear position and outputs it as a target gear position value Db based on the drum rotation angle signal Sa from the drum rotation angle sensor 358, the gear position determination value Da from the gear position determiner 346, and a spindle rotation angle signal Sb from a spindle rotation angle sensor 366 (see also FIG. 4) that detects the rotation angle of the shift spindle 290. As the spindle rotation angle signal Sb, e.g. a positive/negative voltage value according to the operation direction and operation amount of the shift pedal 48 can be employed. For example, a positive voltage value is output from the spindle rotation angle sensor 366 if the shift pedal 48 is operated in a shift-up direction, and a negative voltage value is output from the spindle rotation angle sensor 366 if the shift pedal 48 is operated in a shift-down direction. As the target gear position value Db, the initial value (neutral state) is "0" and the values corresponding to the first, second, third, fourth, fifth, and sixth are "1," "2," "3," "4," "5," and "6," respectively.

The driving state determiner 350 determines the driving state of the saddle-ridden vehicle 10, i.e. whether the saddle-ridden vehicle 10 is in the stop state or is about to start moving, based on an engine rotational speed signal ne from an engine rotational speed sensor 368 that detects the rotational speed of the engine 36, a throttle opening signal th from a throttle opening sensor 370 that detects the opening degree of a throttle valve, and a vehicle velocity signal vr from a vehicle velocity sensor 372 that detects the vehicle velocity of the saddle-ridden vehicle 10. From this driving state determiner 350, a signal indicating a request for clutch disconnection in the stop state (stop-state clutch disconnection request signal Sc) is output.

The gear position determiner 346 determines whether the gear position determination value Da indicates neutral (N–N). If it indicates neutral, display indicating the neutral state is output on the meter display unit 364.

The connection clutch determiner 354 determines the clutch that should be connected next, of the first clutch 264a and the second clutch 264b, and outputs it as a connection clutch determination value Dc based on the drum rotation angle signal Sa (voltage value Va) from the drum rotation angle sensor 358, the above-described odd-stage in-gear information table 360, the even-stage in-gear information table 362, the gear position determination value Da from the gear position determiner 346, the target gear position value Db from the target gear position determiner 348, the stop-state clutch disconnection request signal Sc from the driving state determiner 350, and an operation signal Sd from the clutch-OFF switch 44. Of course, the connection clutch determiner 354 also determines disconnection of both the first clutch 264a and the second clutch 264b.

As the connection clutch determination value Dc, for example "1" is used in the case of connecting the first clutch 264a, "2" is used in the case of connecting the second clutch 264b, and "0" is used in the case of disconnecting both the first clutch 264a and the second clutch 264b.

The first clutch capacity calculator 356A calculates capacity for connecting/disconnecting the first clutch 264a (first clutch capacity C1) and capacity for connecting/disconnecting the second clutch 264b (second clutch capacity C2) based on the gear position determination value Da from the gear position determiner 346, the target gear position value Db from the target gear position determiner 348, the connection clutch determination value Dc from the connection clutch determiner 354, and information necessary for automatic start and gear shift control (the engine rotational speed signal ne from the engine rotational speed sensor 368, the throttle opening signal th from the throttle opening sensor 370, the vehicle velocity signal vr from the vehicle velocity sensor 372, an engine torque determination value, and so forth). The first clutch capacity C1 is supplied to the first electromagnetically-controlled valve 274a as the first clutch capacity output value Sc1, and the second clutch capacity C2 is supplied to the second electromagnetically-controlled valve 274b as the second clutch capacity output value Sc2.

Processing operation of the first gearbox 200A will be described below with reference to flowcharts of FIGS. 18 to 20 and a timing chart of FIG. 16.

Figure 18:
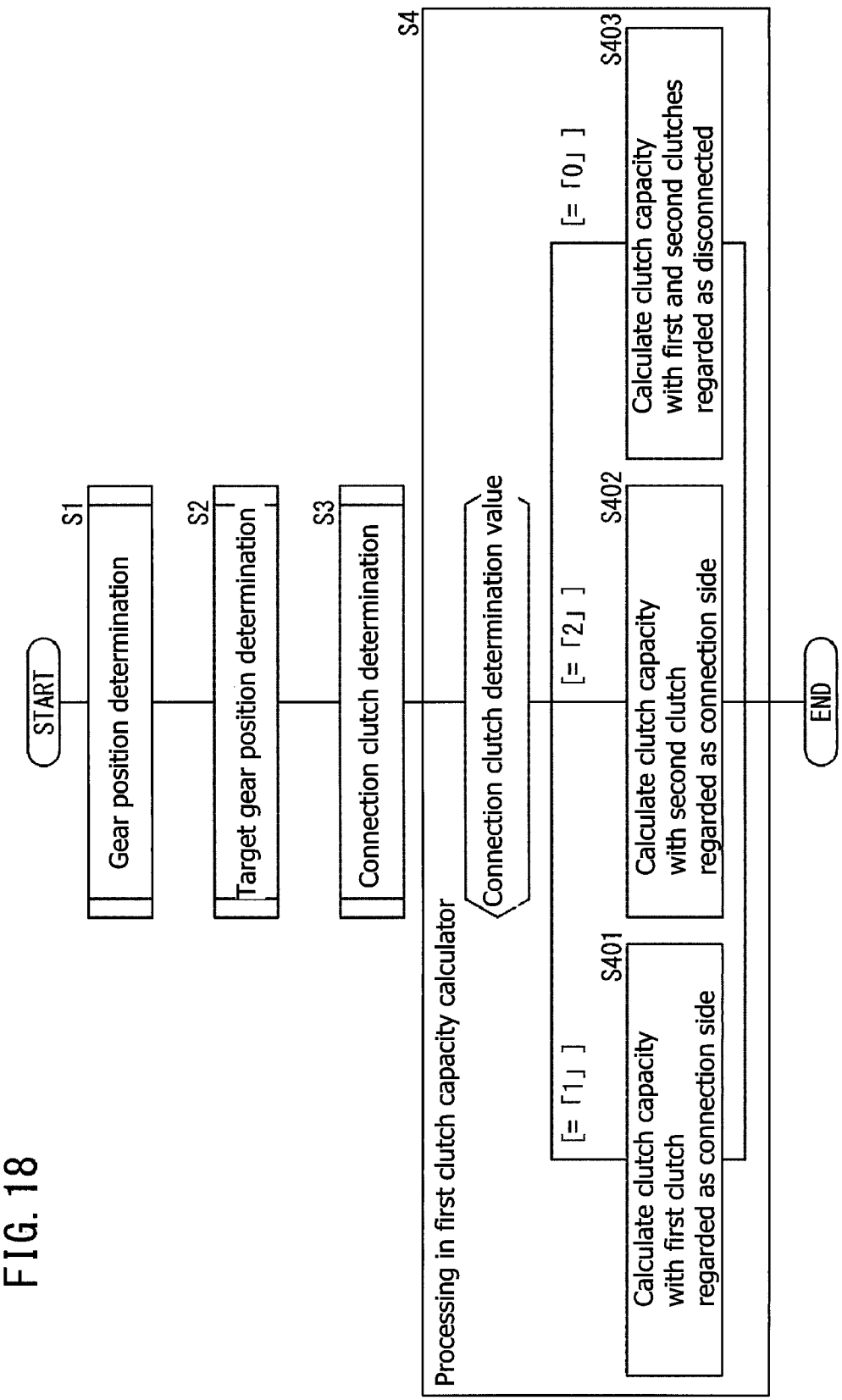
FIG. 18 is a flowchart showing processing operation of the first gearbox.

First, in a step S1 of FIG. 18, the gear position determiner 346 determines the present gear position and outputs it as the gear position determination value Da based on the drum rotation angle signal Sa (voltage value Va) from the drum rotation angle sensor 358. Because this step has been described in detail, description of specific processing is omitted.

Next, in a step S2, the processing enters target gear position determination by the target gear position determiner 348.

Figure 19:
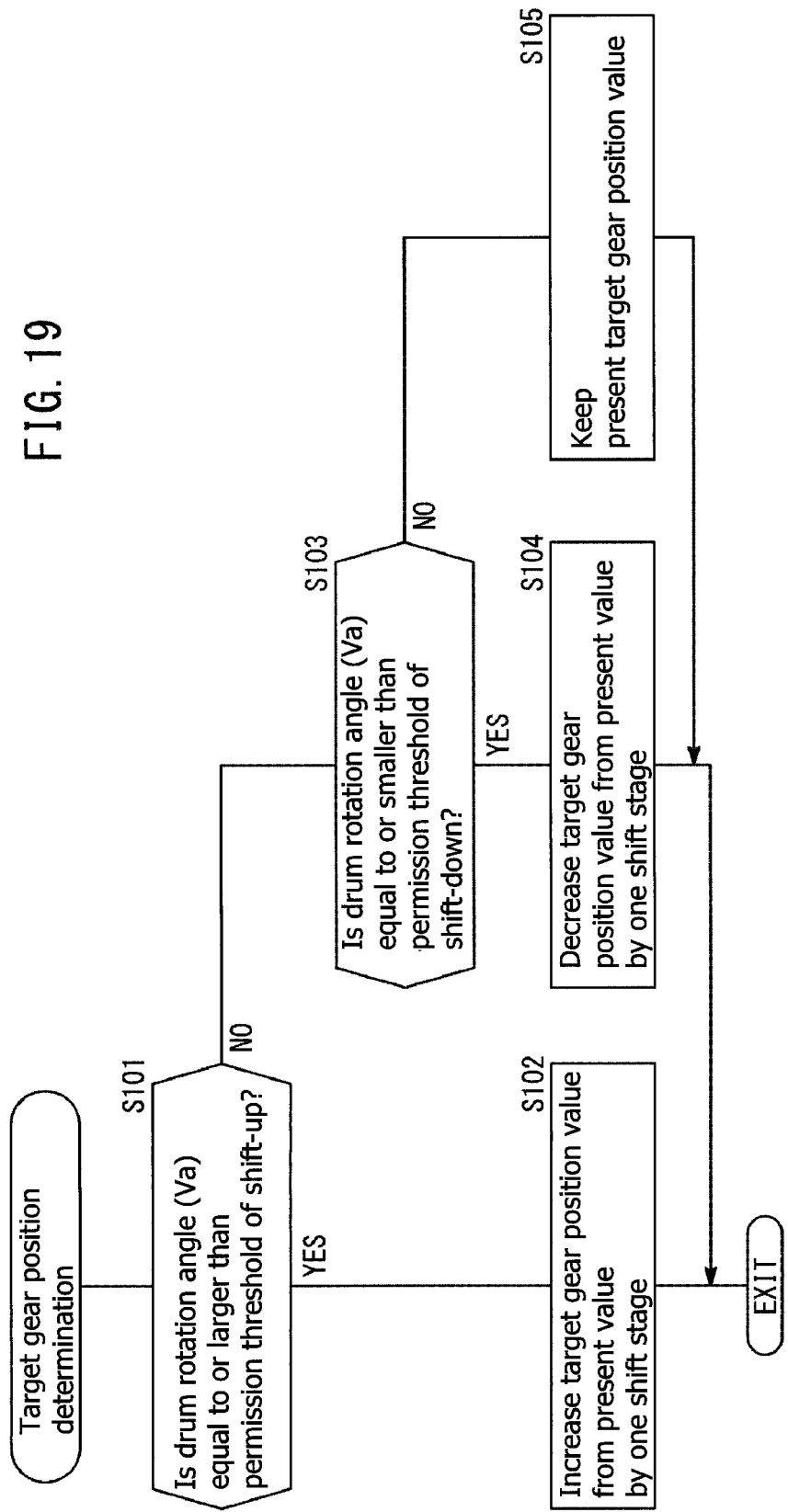
FIG. 19 is a flowchart showing determination processing in a target gear position determiner of the first gearbox.

In this target gear position determination, first, in a step S101 in FIG. 19, it is determined whether or not the drum rotation angle signal Sa (voltage value Va) from the drum rotation angle sensor 358 is equal to or larger than a permission threshold of shift-up gear change. This determination is made based on whether change in the drum rotation angle signal Sa (voltage value Va) shows an increase direction (shift-up operation direction) and the drum rotation angle signal Sa (voltage value Va) has become equal to or larger than a value corresponding to the rotation angle of the shift drum 278 (voltage value) at the timing when the drum shifter 318 of the ratchet mechanism 288 returns to the original position and the ratchet mechanism 288 is reset after the shift drum 278 rotates in association with shift-up operation of the shift pedal 48 and the roller 314 of the stopper arm 308 moves beyond the top of the convex part of the shift drum center 298. For example, as shown in FIG. 16, in the case of shift-up from the first to the second, the determination is made based on whether the drum rotation angle signal Sa (voltage value Va) has become equal to or larger than the value corresponding to the rotation angle of the shift drum 278 (voltage value $V_{12U}$) at the timing when the ratchet mechanism 288 is reset after the shift drum 278 rotates in association with shift-up operation of the shift pedal 48 and the roller 314 of the stopper arm 308 moves beyond the top of the second convex part $K_2$ of the shift drum center 298. Similarly, in the case of shift-up from the second to the third, the determination is made based on whether the drum rotation angle signal Sa (voltage value Va) has become equal to or larger than the value corresponding to the rotation angle of the shift drum 278 (voltage value $V_{23U}$) at the timing when the ratchet mechanism 288 is reset after the roller 314 of the stopper arm 308 moves beyond the top of the third convex part $K_3$ of the shift drum center 298.

If it is determined in the above-described step S101 that the drum rotation angle signal Sa (voltage value Va) is equal to or larger than the permission threshold of shift-up gear change, the processing proceeds to the next step S102 and the target gear position value Db is increased from the present target gear position value Db by one shift stage. That is, the present target gear position value Db+1 is employed this time as the target gear position value Db.

On the other hand, if it is determined in the above-described step S101 that the drum rotation angle signal Sa (voltage value Va) is not equal to or larger than the permission threshold of shift-up gear change, the processing proceeds to the next step S103 and it is determined whether or not the drum rotation angle signal Sa (voltage value Va) is equal to or smaller than a permission threshold of shift-down gear change. This determination is made based on whether change in the drum rotation angle signal Sa (voltage value Va) shows a decrease direction (shift-down operation direction) and the drum rotation angle signal Sa (voltage value Va) has become equal to or smaller than a value corresponding to the rotation angle of the shift drum 278 (voltage value) at the timing when the drum shifter 318 of the ratchet mechanism 288 returns to the original position and the ratchet mechanism 288 is reset after the shift drum 278 rotates in association with shift-down operation of the shift pedal 48 and the roller 314 of the stopper arm 308 moves beyond the top of the convex part of the shift drum center 298. For example, as shown in FIG. 16, in the case of shift-down from the second to the first, the determination is made based on whether the drum rotation angle signal Sa (voltage value Va) has become equal to or smaller than the value corresponding to the rotation angle of the shift drum 278 (voltage value $V_{21D}$) at the timing when the ratchet mechanism 288 is reset after the shift drum 278 rotates in the reverse direction in association with shift-down operation of the shift pedal 48 and the roller 314 of the stopper arm 308 moves beyond the top of the second convex part $K_2$ of the shift drum center 298.

If it is determined in the above-described step S103 that the drum rotation angle signal Sa (voltage value Va) is equal to or smaller than the permission threshold of shift-down gear change, the processing proceeds to the next step S104 and the target gear position value Db is decreased from the present target gear position value Db by one shift stage. That is, the present target gear position value Db−1 is employed this time as the target gear position value Db.

If it is determined in the above-described step S103 that the drum rotation angle signal Sa (voltage value Va) is not equal to or smaller than the permission threshold of shift-down gear change, the processing proceeds to the next step S105 and the target gear position value Db is kept at the present target gear position value Db.

Although the determination is made based on the drum rotation angle signal Sa from the drum rotation angle sensor 358 in the above-described step S101 and step S103, the determination may be made based on the spindle rotation angle signal Sb from the spindle rotation angle sensor 366. In this case, an operation amount of the shift pedal 48 in shift from a certain shift stage to the next shift stage, particularly an operation amount (voltage value) until the timing when the drum shifter 318 of the ratchet mechanism 288 returns to the original position and the ratchet mechanism 288 is reset after the roller 314 of the stopper arm 308 moves beyond the top of the convex part of the shift drum center 298, is obtained in advance. At the timing when the spindle rotation angle signal Sb (voltage value) becomes the voltage value obtained in advance, it may be determined that the spindle rotation angle signal Sb is equal to or larger than the permission threshold of shift-up gear change or is equal to or smaller than the permission threshold of shift-down gear change. The present shift stage cannot be detected with the spindle rotation angle signal Sb alone. Therefore, a counter is additionally set and a counter value is increased every shift-up operation and decreased every shift-down operation. This allows detection of the shift stage from the counter value.

Of course, the determination may be made by using the drum rotation angle signal Sa and the spindle rotation angle signal Sb in combination. In this case, the calculation speed can be increased by determining the shift-down operation direction by the spindle rotation angle signal Sb.

Upon the end of the processing in the above-described step S102, step S104, or step S105, the processing proceeds to a step S3 in FIG. 18 to enter connection clutch determination by the connection clutch determiner 354.

Figure 20:
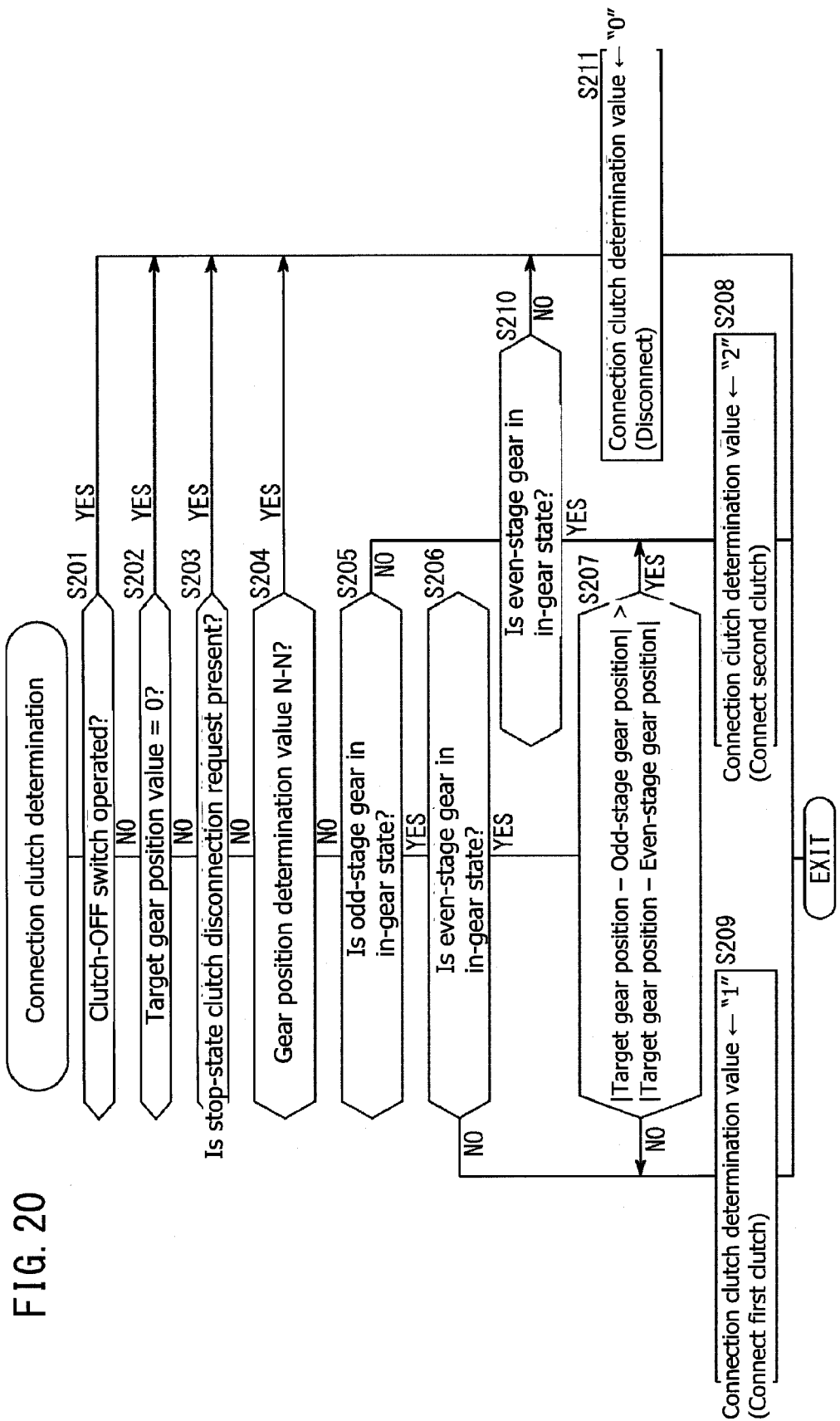
FIG. 20 is a flowchart showing determination processing in a connection clutch determiner of the first gearbox.

In this connection clutch determination, first, in a step S201 in FIG. 20, whether or not the clutch-OFF switch 44 is operated is determined. If the clutch-OFF switch 44 is not operated, the processing proceeds to the next step S202 and whether or not the target gear position value Db is "0" is determined. If the target gear position value Db is not "0," the processing proceeds to a step S203 and it is determined whether or not the present state is the stop-state clutch disconnection state of the saddle-ridden vehicle 10. This determination is made based on whether a stop-state clutch disconnection request is present. If the present state is not the stop-state clutch disconnection state of the saddle-ridden vehicle 10, the processing proceeds to the next step S204 and whether or not the gear position determination value Da is "N–N" is determined. If the gear position determination value Da is not "N–N," the processing proceeds to the next step S205 and whether or not the gear of the odd stage side is in the in-gear state is determined with reference to the drum rotation angle signal Sa (voltage value Va) and the voltage ranges registered in the odd-stage in-gear information table 360. If the drum rotation angle signal Sa (voltage value Va) falls within the voltage range registered in the odd-stage in-gear information table 360, it is determined that the odd-stage gear is in the in-gear state and the processing proceeds to the next step S206. In turn, whether or not the gear of the even stage side is in the in-gear state is determined with reference to the drum rotation angle signal Sa (voltage value Va) and the voltage ranges registered in the even-stage in-gear information table 362. If the drum rotation angle signal Sa (voltage value Va) falls within the voltage range registered in the even-stage in-gear information table 362, it is determined that the even-stage gear is in the in-gear state and the processing proceeds to the next step S207.

In the step S207, the value of the odd stage of the gear position determination value Da is stored in an odd register and the value of the even stage of the gear position determination value Da is stored in an even register. Then, if |target gear position value−value of odd register|>|target gear position value−value of even register| is satisfied, the processing proceeds to a step S208 and the connection clutch determination value Dc is set to "2" indicating to connect the second clutch 264b. Conversely, if |target gear position value−value of odd register|>|target gear position value−value of even register| is not satisfied, the processing proceeds to a step S209 and the connection clutch determination value Dc is set to "1" indicating to connect the first clutch 264a.

If it is determined in the above-described step S206 that the even-stage gear is not in the in-gear state, the processing proceeds to the step S209 and the connection clutch determination value Dc is set to "1" indicating to connect the first clutch 264a.

If it is determined in the above-described step S205 that the odd-stage gear is not in the in-gear state, the processing proceeds to a step S210 and whether or not the even-stage gear is in the in-gear state is determined. If the even-stage gear is in the in-gear state, the processing proceeds to the above-described step S208 and the connection clutch determination value Dc is set to "2" indicating to connect the second clutch 264b.

On the other hand, if it is determined in the above-described step S201 that the clutch-OFF switch 44 is operated, or if it is determined in the step S202 that the target gear position value Db is "0," or if it is determined in the step S203 that the present state is the stop-state clutch disconnection state of the saddle-ridden vehicle 10, or if it is determined in the step S204 that the gear position determination value Da is "N–N," or if it is determined in the step S210 that the even-stage gear is not in the in-gear state, i.e. neither the odd-stage gear nor the even-stage gear is in the in-gear state, the processing proceeds to a step S211 and the connection clutch determination value Dc is set to "0" indicating to disconnect both the first clutch 264a and the second clutch 264b.

Upon the end of the processing in the above-described step S208, step S209, or step S211, the processing proceeds to a step S4 in FIG. 18 to enter processing in the first clutch capacity calculator 356A.

In this processing in the first clutch capacity calculator 356A, calculation processing according to the connection clutch determination value Dc from the connection clutch determiner 354 is executed. Specifically, if the connection clutch determination value Dc is "1," the processing proceeds to a step S401 and clutch capacity (first clutch capacity C1 and second clutch capacity C2) for connecting the first clutch 264a or for keeping the connected state of the first clutch 264a is calculated. The first clutch capacity C1 and the second clutch capacity C2 are figured out by using various kinds of parameters (engine rotational speed, throttle opening, vehicle velocity, gear position, clutch input torque value, gear ratio, etc.) so that the optimum riding feeling may be obtained in every situation such as start, stop, and driving of the saddle-ridden vehicle 10.

As shown in FIG. 5, the obtained first clutch capacity C1 is supplied to the first electromagnetically-controlled valve 274a of the hydraulic supply system 268 as the first clutch capacity output value Sc1. The first electromagnetically-controlled valve 274a controls the hydraulic pressure supplied to the first clutch 264a in such a direction as to connect the first clutch 264a or in order to keep the connected state of the first clutch 264a based on the supplied first clutch capacity output value Sc1. The second clutch capacity C2 is supplied to the second electromagnetically-controlled valve 274b of the hydraulic supply system 268 as the second clutch capacity output value Sc2. The second electromagnetically-controlled valve 274b controls the hydraulic pressure supplied to the second clutch 264b in such a direction as to disconnect the second clutch 264b or in order to keep the disconnected state of the second clutch 264b based on the supplied second clutch capacity output value Sc2. In particular, when the state is switched from the connected state of the second clutch 264b to the connected state of the first clutch 264a, shift of the clutch is started.

If the connection clutch determination value Dc is "2," the processing proceeds to a step S402 in FIG. 18 and clutch capacity (first clutch capacity C1 and second clutch capacity C2) for connecting the second clutch 264b or for keeping the connected state of the second clutch 264b is calculated. The first clutch capacity C1 and the second clutch capacity C2 are output to the first electromagnetically-controlled valve 274a and the second electromagnetically-controlled valve 274b as the first clutch capacity output value Sc1 and the second clutch capacity output value Sc2.

The first electromagnetically-controlled valve 274a controls the hydraulic pressure supplied to the first clutch 264a in such a direction as to disconnect the first clutch 264a or in order to keep the disconnected state of the first clutch 264a based on the supplied first clutch capacity output value Sc1. The second electromagnetically-controlled valve 274b controls the hydraulic pressure supplied to the second clutch 264b in such a direction as to connect the second clutch 264b or in order to keep the connected state of the second clutch 264b based on the supplied second clutch capacity output value Sc2. In particular, when the state is switched from the connected state of the first clutch 264a to the connected state of the second clutch 264b, shift of the clutch is started.

If the connection clutch determination value Dc is "0," the processing proceeds to a step S403 in FIG. 18 and clutch capacity (first clutch capacity C1 and second clutch capacity C2) for disconnecting both the first clutch 264a and the second clutch 264b or for keeping the disconnected state of the first clutch 264a and the second clutch 264b is calculated. The first clutch capacity C1 and the second clutch capacity C2 are output to the first electromagnetically-controlled valve 274a and the second electromagnetically-controlled valve 274b as the first clutch capacity output value Sc1 and the second clutch capacity output value Sc2.

Figure 21:
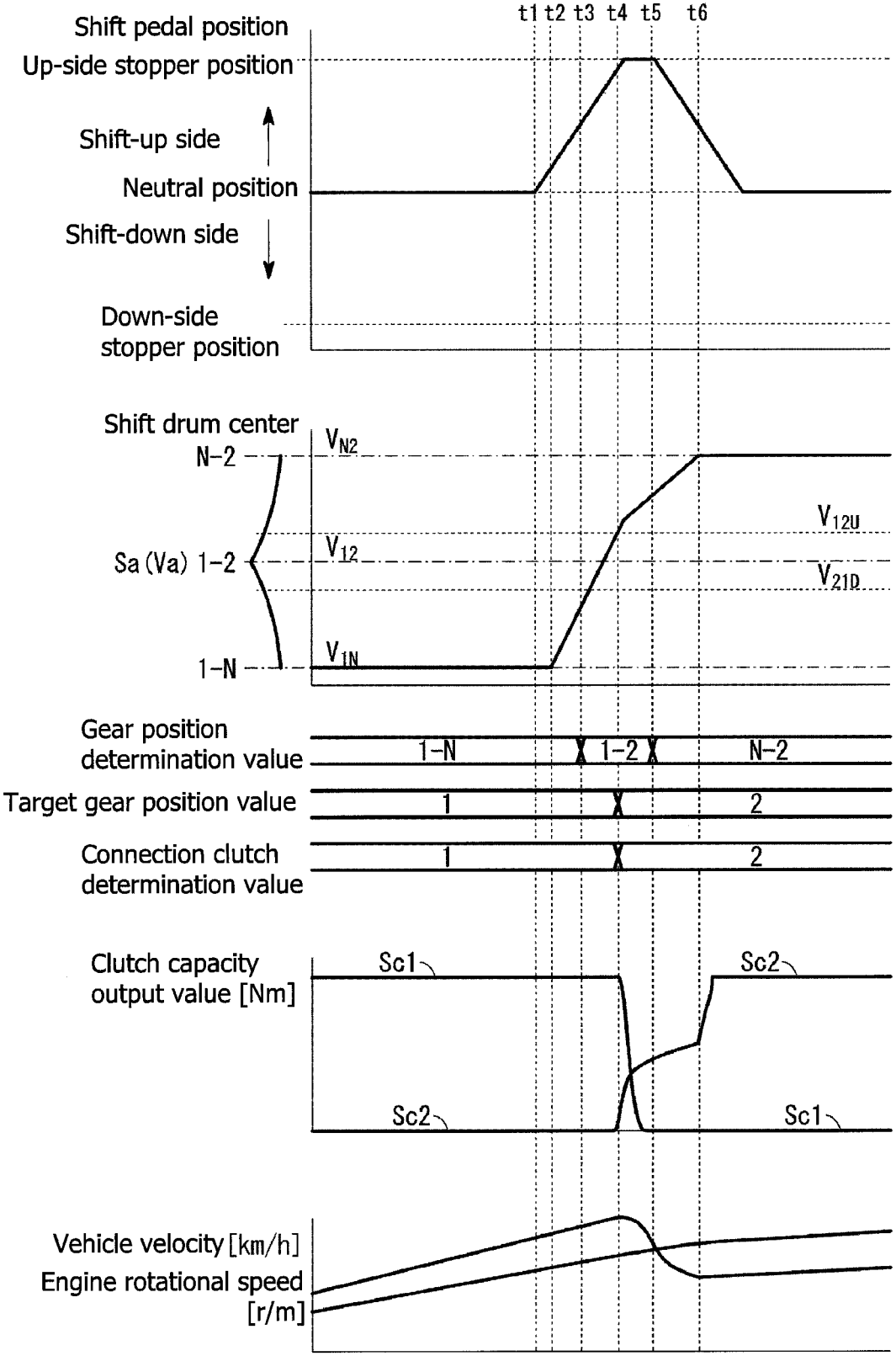
FIG. 21 is a timing chart (of the case in which clutch shift is performed) showing changes in the drum rotation angle signal (voltage value) associated with the operation position (operation amount) of a shift pedal, the gear position determination value, a target gear position value, a connection clutch determination value, a first clutch capacity output value, a second clutch capacity output value, the vehicle velocity, and the engine rotational speed.
Figure 22:
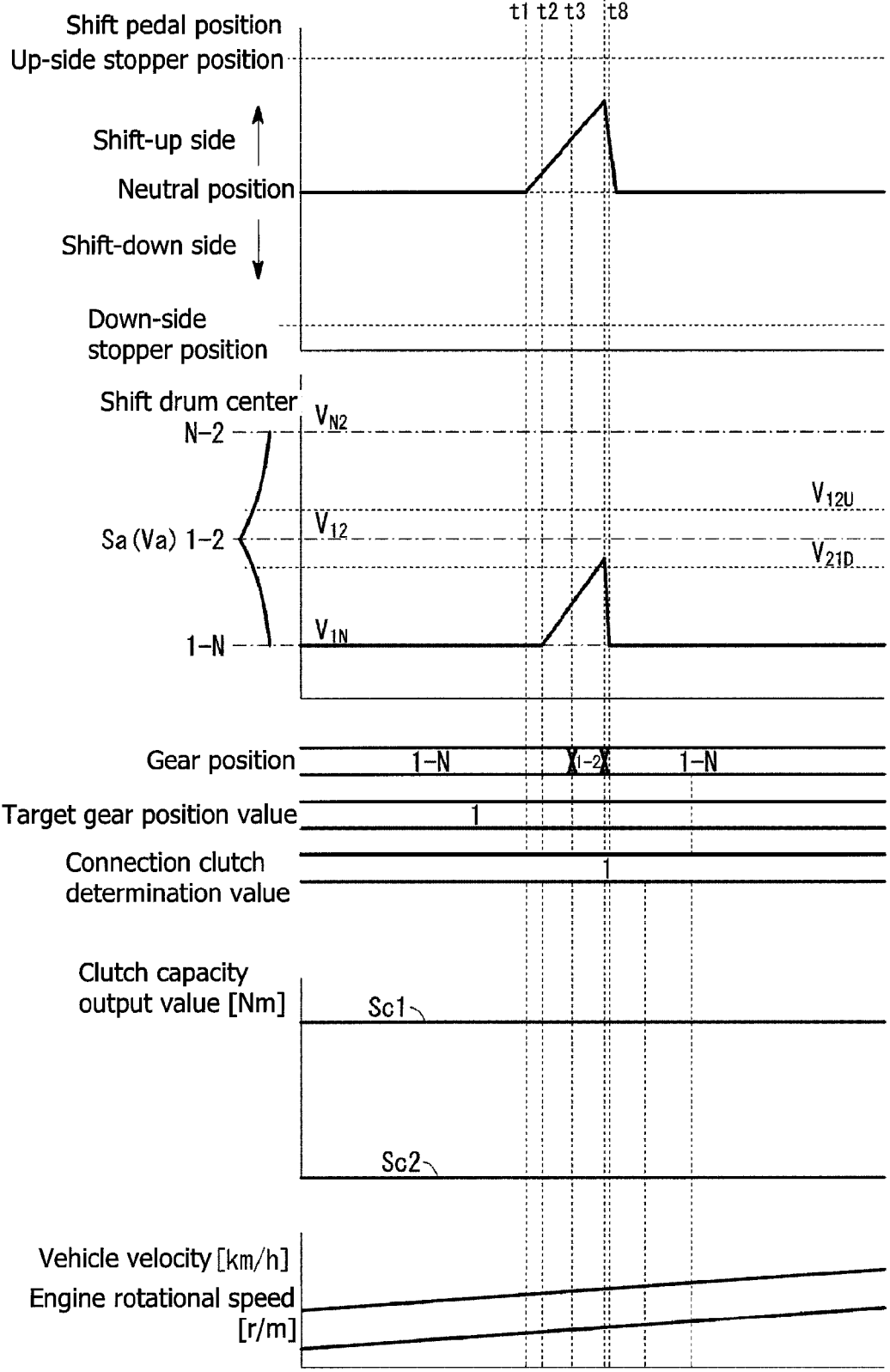
FIG. 22 is a timing chart (of the case in which clutch shift is not performed) showing changes in the drum rotation angle signal (voltage value) associated with the operation position (operation amount) of the shift pedal, the gear position determination value, the target gear position value, the connection clutch determination value, the first clutch capacity output value, the second clutch capacity output value, the vehicle velocity, and the engine rotational speed.

Here, operation of shift-up from the first to the second will be described with reference also to timing charts of FIGS. 21 and 22. FIGS. 21 and 22 are timing charts showing changes in the drum rotation angle signal Sa (voltage value Va) associated with the operation position (operation amount) of the shift pedal 48, the gear position determination value Da, the target gear position value Db, the connection clutch determination value Dc, the first clutch capacity output value (Nm), the second clutch capacity output value (Nm), the vehicle velocity (km/h), and the engine rotational speed (r/m).

In FIG. 21, "1–N" of the drum rotation angle signal Sa (voltage value Va) indicates the state in which the roller 314 of the stopper arm 308 is located at the bottom of the first notch $N_1$ of the shift drum center 298. "1–2" indicates the state in which the roller 314 of the stopper arm 308 is located at the top of the second convex part $K_2$. "N–2" indicates the state in which the roller 314 of the stopper arm 308 is located at the bottom of the second notch $N_2$ of the shift drum center 298.

First, at timing t1, operation of the shift pedal 48 to the shift-up side is started by the driver in driving in the first gear.

At timing t2, the shift drum 278 located at "1–N" starts to move toward "N–2" due to the operation of the shift pedal 48 to the shift-up side.

At timing t3, the gear position determination value Da derived from the drum rotation angle signal Sa (voltage value Va) becomes "1–2." At this timing, gear shift to the second is not performed because it is unclear whether the shift drum 278 will be settled to the position of "N–2" later. As shown by an arrow Ya in FIG. 16, the shift pedal 48 is returned before the roller 314 of the stopper arm 308 moves beyond the top of the second convex part $K_2$ in some cases. Thus, shift of the clutch is not started.

Next, at timing t4, specifically at the timing when the drum shifter 318 of the ratchet mechanism 288 returns to the original position and the ratchet mechanism 288 is reset after the roller 314 of the stopper arm 308 moves beyond the second convex part $K_2$, i.e. at the timing when the drum rotation angle signal Sa (voltage value Va) has become equal to or larger than the permission threshold $V_{12U}$ of shift-up gear change, the target gear position value Db is updated from "1" to "2."

Due to this, the connection clutch determination value Dc is switched to "2," which is the value causing connection of the second clutch 264b, so that gear shift (clutch shift) is started.

At the above-described timing t4, when the target gear position value Db becomes "2," the gear position determination value Da is "1–2" and therefore the connection clutch determination value Dc becomes "2."Thus, the first clutch capacity output value Sc1 at an upper limit value thus far changes in the decrease direction. Instead, the second clutch capacity output value Sc2 at a lower limit value thus far changes in the increase direction, so that shift of the clutch is carried out.

From the stage at which the shift pedal 48 reaches the stopper position of the shift-up operation, the shift drum 278 continues to rotate due to inertia and the roller 314 of the stopper arm 308 relatively moves toward the bottom of the second notch $N_2$. At timing t5 in the process of this movement, the gear position determination value Da changes to "N–2" and the first clutch capacity output value Sc1 becomes the lower limit value.

Thereafter, at timing t6 when the roller 314 of the stopper arm 308 is positioned at the bottom of the second notch $N_2$, gear shift operation to the second is completed, and driving in the second gear is started.

If the shift pedal 48 starts to return to the neutral position after the above-described timing t3 as shown at timing t7 in FIG. 22, the drum rotation angle signal Sa (voltage value Va) also starts to return toward "1–N."

When the shift pedal 48 returns to the neutral position at subsequent timing t8, the drum rotation angle signal Sa (voltage value Va) becomes a voltage value $V_1N$ corresponding to "1–N" and gear shift operation to the second is not carried out.

The above-described operation is the same also in shift-up from the second to the third, from the third to the fourth, from the fourth to the fifth, and from the fifth to the sixth. Furthermore, the operation is the same also in shift-down from the sixth to the fifth, from the fifth to the fourth, from the fourth to the third, from the third to the second, and from the second to the first.

Figure 23:
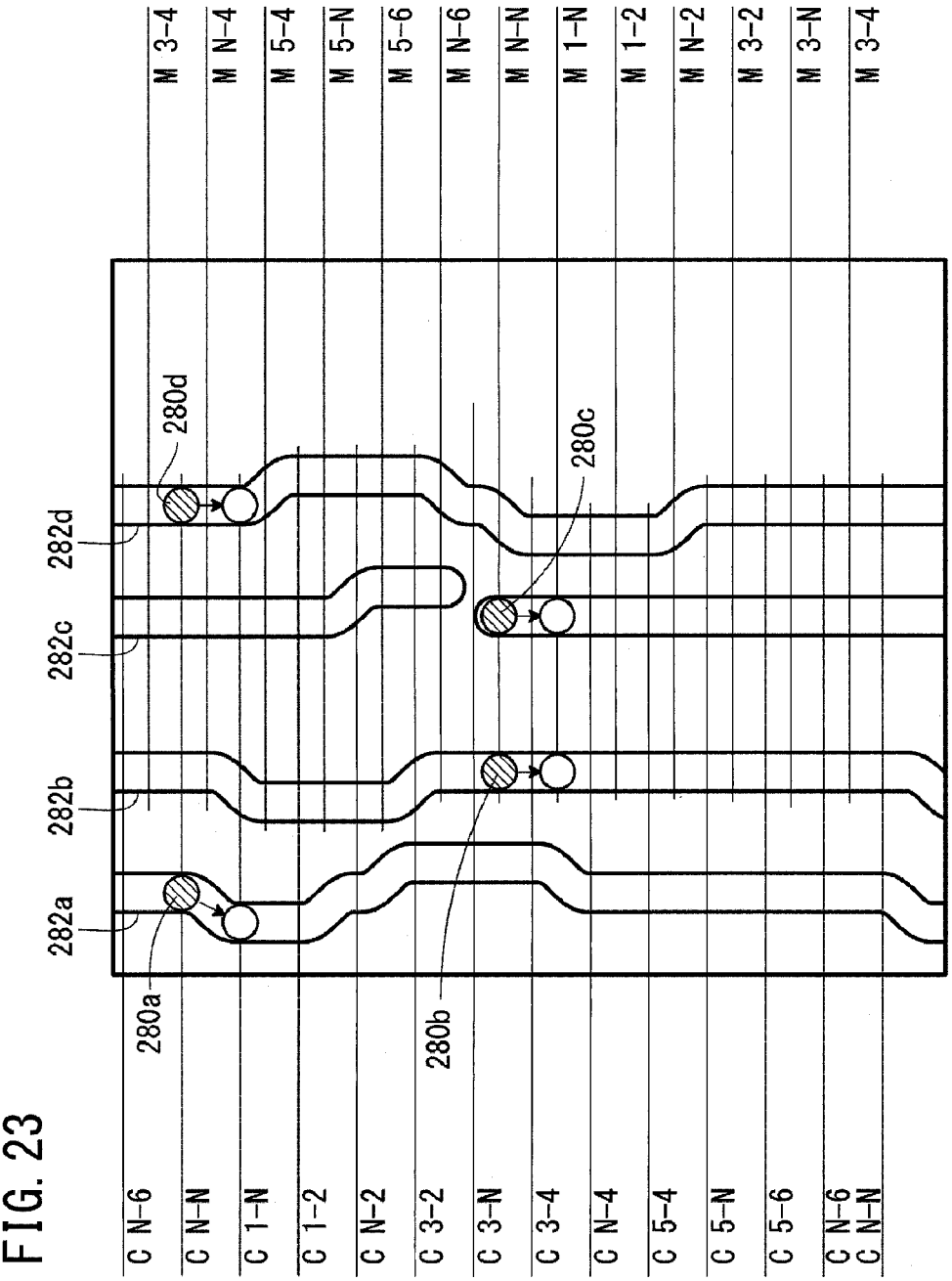
FIG. 23 is a development view of cam grooves of the shift drum.

Here, gear shift operation by the shift pedal 48, mainly gear shift operation of sequential shift-up from the neutral state to the first, second, . . . and sixth, will be described with focus on the shift forks (first shift fork 280a to fourth shift fork 280d) and the cam grooves (first cam groove 282a to fourth cam groove 282d) with reference to FIGS. 4 and 23. FIG. 23 is a development view of the cam grooves.

First, at the start of the engine 36, the first shift fork 280a to the fourth shift fork 280d exist at shift positions in FIG. 23, i.e. positions of C/N–N and M/N–N, in the corresponding first cam groove 282a to fourth cam groove 282d. Here, C denotes the countershaft 214 and M denotes the main shaft 212. The element in front of "–" denotes the state of the odd stage and the element behind "–" denotes the state of the even stage. N indicates the neutral state, in which the respective dogs of the shift stages are uncoupled from the corresponding dog holes. Therefore, C/N–N represents the shift position at which the dogs are uncoupled at both the odd stages and the even stages in the countershaft 214, and M/N–N represents the shift position at which the dogs are uncoupled at both the odd stages and the even stages in the main shaft 212.

In the first cam groove 282a to the fourth cam groove 282d, step parts by displacement to the left and right by each one stage are continuously formed on the basis of the position of N corresponding to the neutral state. The respective sliding protrusions 286 are located to any of the left stage, the center stage, and the right stage in the first cam groove 282a to the fourth cam groove 282d. Thereby, the corresponding slide gears are selectively moved to three places in the axial direction.

When the engine 36 of the saddle-ridden vehicle is in the operating state and the saddle-ridden vehicle 10 is in the stop state, both the first clutch 264a and the second clutch 264b are kept at the disconnected state. Then, the driver operates the shift pedal 48, which causes the first gearbox 200A to perform gear shift of the transmission 232 from the neutral state to the first. From this state, the clutch system 204 is controlled to the connected state in association with the rise of the engine rotational speed of the engine 36. Thereby, the saddle-ridden vehicle 10 is started.

Specifically, the driver operates the shift pedal 48 and thereby the shift drum 278 rotates. Thereby, the first shift fork 280a and the fourth shift fork 280d move in the arrow direction along the first cam groove 282a and the fourth cam groove 282d corresponding to the countershaft 214 side to reach C/1–N from C/N–N. The second shift fork 280b and the third shift fork 280c move in the arrow direction along the second cam groove 282b and the third cam groove 282c corresponding to the main shaft 212 side to reach M/1–N.

Specifically, at C/1–N, the first shift fork 280a is moved by one stage from the neutral position to the left end side of the shift drum 278, which moves the slide gear n5 to the side of the free gear n1. Meanwhile, the fourth shift fork 280d remains at the neutral position. At M/1–N, both the second shift fork 280b and the third shift fork 280c remain at the neutral position. Thereby, at C/1–N, the state in which power transmission by the first is possible is obtained. Specifically, on the odd stage side of the countershaft 214, the state in which the dog of the slide gear n5 is coupled to the dog hole of the free gear n1 (gear n1 is in the in-gear state) is obtained. The even stage side is in the dog-uncoupled state. That is, at C/1–N, the free gear n1 is fixed to the countershaft 214 by the slide gear n5. Furthermore, only the first clutch 264a provided for the inner shaft 212m is connected and the output from the crankshaft 54 is transmitted to the countershaft 214 via the first gear by the inner shaft 212m. Here, the in-gear state refers to the state in which the corresponding gear and the gear making a pair with the corresponding gear can be driven by the corresponding gear, and the dog-uncoupled state refers to the state in which coupling by the dog is absent and power is not transmitted between the gears making a pair.

When the driver operates the shift pedal 48 to rotate the shift drum 278 in order to make shift-up to the second, at midway gear positions C/1–2 and M/1–2, only the fourth shift fork 280d moves by one stage to the right end side of the shift drum 278 along the fourth cam groove 282d. Thereby, the slide gear n6 moves to the side of the free gear n2, which provides the state in which the dog of the slide gear n6 is coupled to the dog hole of the free gear n2 (gear n2 is in the in-gear state) on the even stage side of the countershaft 214. That is, at C/1–2 and M/1–2, the state is obtained in which the gear n1 is in the in-gear state on the odd stage side of the countershaft 214 and the gear n2 is in the in-gear state on the even stage side. This stage is a preliminary shift stage. Only the first clutch 264a is connected whereas connection of the second clutch 264b is broken.

When the driver further operates the shift pedal 48 to rotate the shift drum 278, in the process of movement toward gear positions C/N–2 and M/N–2, the first shift fork 280a moves to the neutral position and transition to connection of the second clutch 264b is made while the connection of the first clutch 264a is broken. Then, at the stage where the gear positions have become C/N–2 and M/N–2, the dog is uncoupled on the odd stage side of the countershaft 214 and the gear n2 is in the in-gear state on the even stage side. That is, at C/N–2, the free gear n2 is fixed to the countershaft 214 by the slide gear n6. Furthermore, only the second clutch 264b provided for the outer shaft 212n is connected and the output from the crankshaft 54 is transmitted to the countershaft 214 via the second gear by the outer shaft 212n.

Similarly, at gear positions C/3–2 and M/3–2, the gear n3 is in the in-gear state on the odd stage side of the countershaft 214 and the gear n2 is in the in-gear state on the even stage side. This stage is a preliminary shift stage. Only the second clutch 264b is connected whereas connection of the first clutch 264a is broken.

At gear positions C/3–N and M/3–N, the dog is uncoupled on the even stage side of the countershaft 214 and the gear n3 is in the in-gear state on the odd stage side. That is, the free gear n3 is fixed to the countershaft 214 by the slide gear n5. Furthermore, only the first clutch 264a provided for the inner shaft 212m is connected and the output from the crankshaft 54 is transmitted to the countershaft 214 via the third gear by the inner shaft 212m.

At gear positions C/3–4 and M/3–4, the gear n3 is in the in-gear state on the odd stage side of the countershaft 214 and the gear n4 is in the in-gear state on the even stage side. This stage is a preliminary shift stage. Only the first clutch 264a is connected whereas connection of the second clutch 264b is broken.

At gear positions C/N–4 and M/N–4, the dog is uncoupled on the odd stage side of the countershaft 214 and the gear n4 is in the in-gear state on the even stage side. That is, the free gear n4 is fixed to the countershaft 214 by the slide gear n6. Furthermore, only the second clutch 264b provided for the outer shaft 212n is connected and the output from the crankshaft 54 is transmitted to the countershaft 214 via the fourth gear by the outer shaft 212n.

At a gear position C/5–4, the dog is uncoupled on the odd stage side of the countershaft 214 and the gear n4 is in the in-gear state on the even stage side. At a gear position M/5–4, the gear m5 is in the in-gear state on the odd stage side of the main shaft 212 and the dog is uncoupled on the even stage side. This stage is a preliminary shift stage. Only the second clutch 264b is connected whereas connection of the first clutch 264a is broken.

At a gear position C/5–N, the dog is uncoupled on both the odd stage side and the even stage side of the countershaft 214. At a gear position M/5–N, the gear m5 is in the in-gear state on the odd stage side of the main shaft 212 and the dog is uncoupled on the even stage side. That is, the free gear m5 engaged with the slide gear n5 of the countershaft 214 is fixed to the inner shaft 212m of the main shaft 212 by the slide gear m3. Furthermore, only the first clutch 264a provided for the inner shaft 212m is connected and the output from the crankshaft 54 is transmitted to the countershaft 214 via the fifth gear by the inner shaft 212m.

At gear positions C/5–6 and M/5–6, the gear m5 is in the in-gear state on the odd stage side of the main shaft 212 and the gear m6 is in the in-gear state on the even stage side. This stage is a preliminary shift stage. Only the first clutch 264a is connected whereas connection of the second clutch 264b is broken.

At gear positions C/N–6 and M/N–6, the dog is uncoupled on the odd stage side of the main shaft 212 and the gear m6 is in the in-gear state on the even stage side. That is, the free gear m6 engaged with the slide gear n6 of the countershaft 214 is fixed to the outer shaft 212n of the main shaft 212 by the slide gear m4. Furthermore, only the second clutch 264b provided for the outer shaft 212n is connected and the output from the crankshaft 54 is transmitted to the countershaft 214 via the sixth gear by the outer shaft 212n.

As above, in the first gearbox 200A, the gearshift system 208 configuring the first gearbox 200A of the saddle-ridden vehicle 10 is provided as a system driven by only manual operation (foot operation) based on shift pedal operation of the driver. Furthermore, the clutch system 204 is configured by the first clutch 264a and the second clutch 264b assigned to the transmission gears of the odd stages and the even stages and connection/disconnection of them is electronically controlled according to the shift position of the gearshift system 208. Thus, while interruption of driving force in the clutch system 204 can be eliminated, gear shift of the gearshift system 208 is made to depend on only the manual operation of the driver and thereby the driver is kept from feeling delay in the time until gear shift completion. In addition, an electronic drive system (motor and so forth) of the gearshift system 208 can be reduced and size reduction and weight reduction of the first gearbox 200A can be achieved. That is, it becomes possible to perform shift of the clutch (gear shift) in conjunction with gear interchange directly performed based on the shift-pedal operation of the driver without adding sensors and actuators to a conventional DCT (Dual-Clutch Transmission) vehicle. Thus, gear shift without delay against gear shift intention of the driver can be performed. In addition, disconnection of the driving force at the time of the gear shift can be decreased and the shock can be rapidly reduced. Furthermore, switches necessary for a shift actuator and a full-automatic vehicle can also be abandoned, which is advantageous also in reduction of the weight and cost.

A gear shift instruction by the driver is detected to carry out connection/disconnection control of the first clutch 264a and the second clutch 264b based on a detection result of the drum rotation angle sensor 358 that detects the rotation angle of the shift drum 278 of the gearshift system 208. Therefore, the connection/disconnection timing of the first clutch 264a and the second clutch 264b can be detected by utilizing the drum rotation angle sensor 358. As a result, without adding another sensor to detect a gear shift instruction by the driver, suppression of increase in the number of sensors and simplification of the circuit configuration and algorithm of the ECU 230 can be achieved.

The spindle rotation angle sensor 366 that detects the rotation angle of the shift spindle 290 is provided and a gear shift instruction by the driver is detected to control the clutch system 204 based on a detection result of this spindle rotation angle sensor 366. Due to this feature, a gear shift intention of the driver can be surely detected and enhancement of the gear shift accuracy can be achieved.

Connection/disconnection control of the clutch system 204 is started if the angle detected by the drum rotation angle sensor 358 surpasses the angle from a concave part of the notch to the next convex part and surpasses a predetermined angle. Thus, it is recognized that gear shift operation is carried out and the clutch system 204 is controlled at the completion timing of the gear shift operation by the driver. Therefore, sure clutch control based on the gear shift operation can be carried out with high accuracy.

The predetermined angle at which connection/disconnection control of the clutch system 204 is started is set between the angle at which the ratchet mechanism 288 is reset and the angle at which the shift pedal 48 reaches the stopper position. Thereby, connection/disconnection control of the clutch system 204 is carried out in the state in which sure gear shift operation of the gearbox has been carried out. Thus, sure clutch control can be carried out in association with gear shift operation.

Irrespective of whether the rotation of the shift drum 278 is forward rotation or reverse rotation, the predetermined angle surpassing the angle to the next convex part is detected and connection/disconnection control of the clutch system 204 is started. Due to this feature, sure clutch control based on gear shift operation can be carried out with high accuracy in both shift-up and shift-down.

The predetermined angle is set to the same angle irrespective of whether the rotation of the shift drum 278 is forward rotation or reverse rotation. Due to this feature, there is no difference in the start timing of connection/disconnection of the clutch system 204 and the driver is not given an uncomfortable feeling of connection/disconnection of the clutch system 204 in shift-up or shift-down.

In general, if the transmission remains at gear positions in the in-gear state at both the odd stage and the even stage, problems of friction increase, gear rattle at the time of the next gear shift, shock increase, etc. occur. However, in the first gearbox 200A, even in manual operation of the shift pedal 48, the position is restricted by the shift drum center 298 so that the transmission may be prevented from remaining at gear positions in the in-gear state at both the odd stage and the even stage. Thus, the above-described problems do not occur.

If the previous-stage gear gets uncoupled when the shift pedal 48 is operated to the stopper position, possibly the previous-stage gear gets uncoupled before shift of the clutch. However, in the first gearbox 200A, even when the shift pedal 48 is operated to the stopper position at the time of manual gear shift by operation of the shift pedal 48, the in-gear position can be kept at both the odd stage and the even stage and shift of the clutch can be surely performed.

If operation of the shift pedal 48 is uncertain (e.g. the roller 314 of the stopper arm 308 does not move beyond the convex part between plural notches and the shift pedal 48 is returned to the original position), gear shift (shift of the clutch) is not performed. This allows surer gear shift (shift of the clutch).

By using the spindle rotation angle sensor 366 in combination with the drum rotation angle sensor 358, the accuracy of sensing of gear feed by the shift pedal is enhanced, which allows further surer gear shift (shift of the clutch).

Next, a gearbox according to a second embodiment (hereinafter, referred to as second gearbox 200B) will be described with reference to FIGS. 24 to 33.

Figure 24:
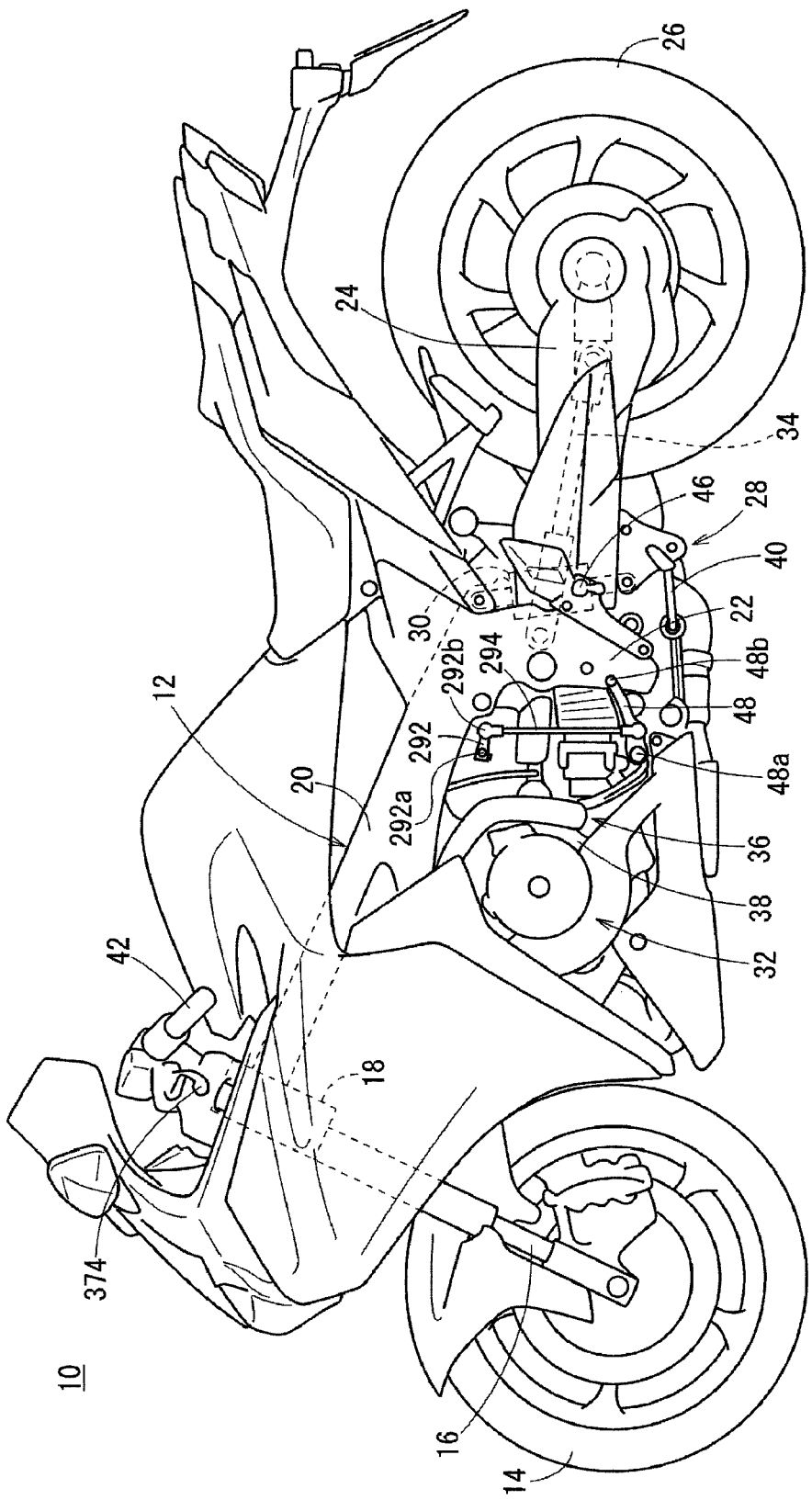
FIG. 24 is a side view showing one example of a saddle-ridden vehicle on which a gearbox according to a second embodiment (second gearbox) is mounted.

As shown in FIG. 24, this second gearbox 200B has almost the same configuration as that of the above-described first gearbox 200A but differs in the following points.

Figure 25:
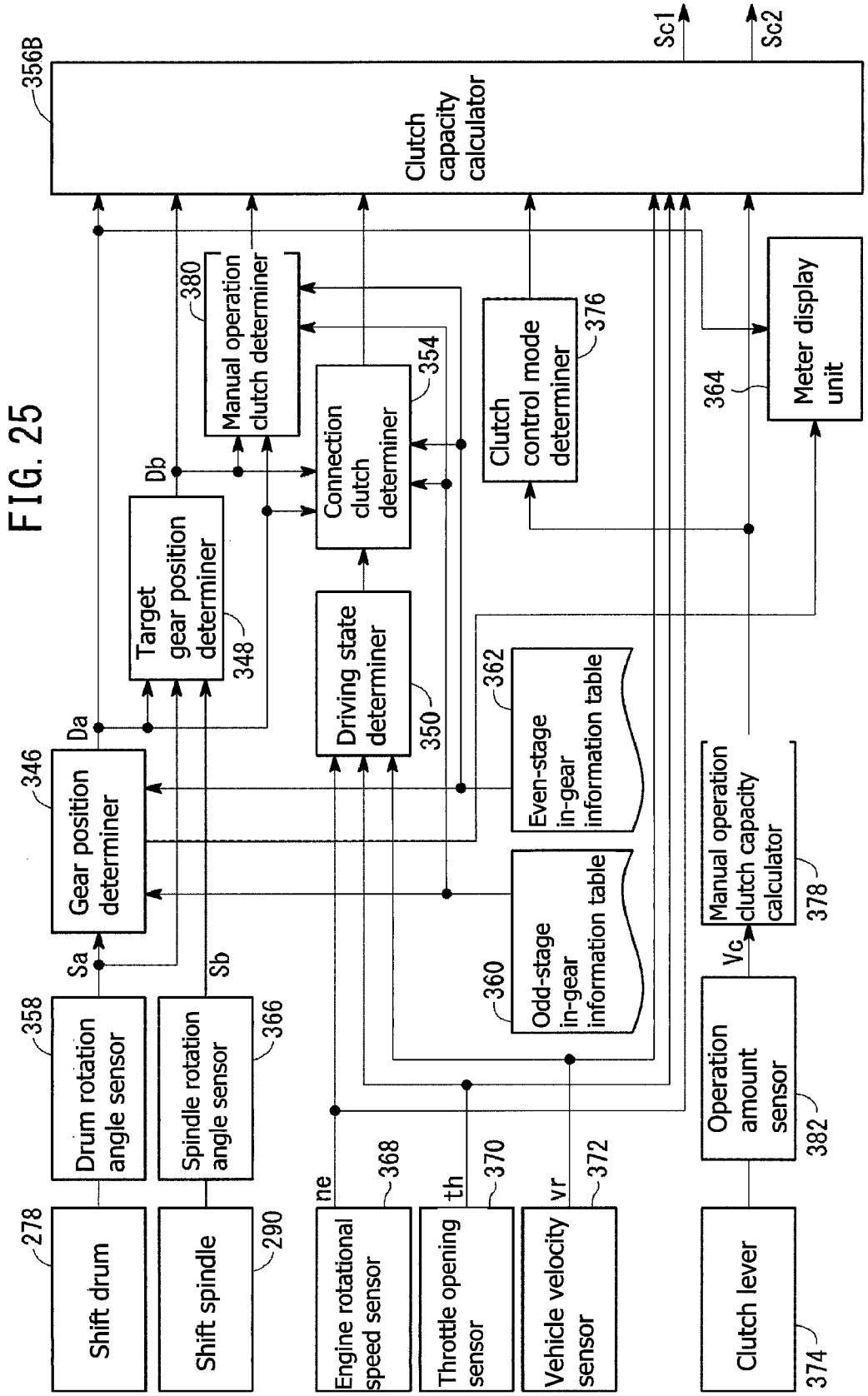
FIG. 25 is a circuit block diagram showing a control system of the second gearbox.

Specifically, as shown in FIG. 24, the second gearbox 200B has a clutch lever 374 (including operation amount sensor: clutch operation element) instead of the clutch-OFF switch 44. As shown in FIG. 25, the ECU 230 of the second gearbox 200B has a clutch control mode determiner 376, a manual operation clutch capacity calculator 378, a manual operation clutch determiner 380, and a second clutch capacity calculator 356B in addition to the gear position determiner 346, the target gear position determiner 348, the driving state determiner 350, and the connection clutch determiner 354 that are the same as those of the first gearbox 200A.

The clutch control mode determiner 376 monitors the operation amount of the clutch lever 374. The clutch control mode determiner 376 determines clutch operation as manual clutch operation at the timing when the operation amount becomes equal to or larger than a predetermined amount and determines clutch operation as automatic clutch operation in other cases.

Figure 26:
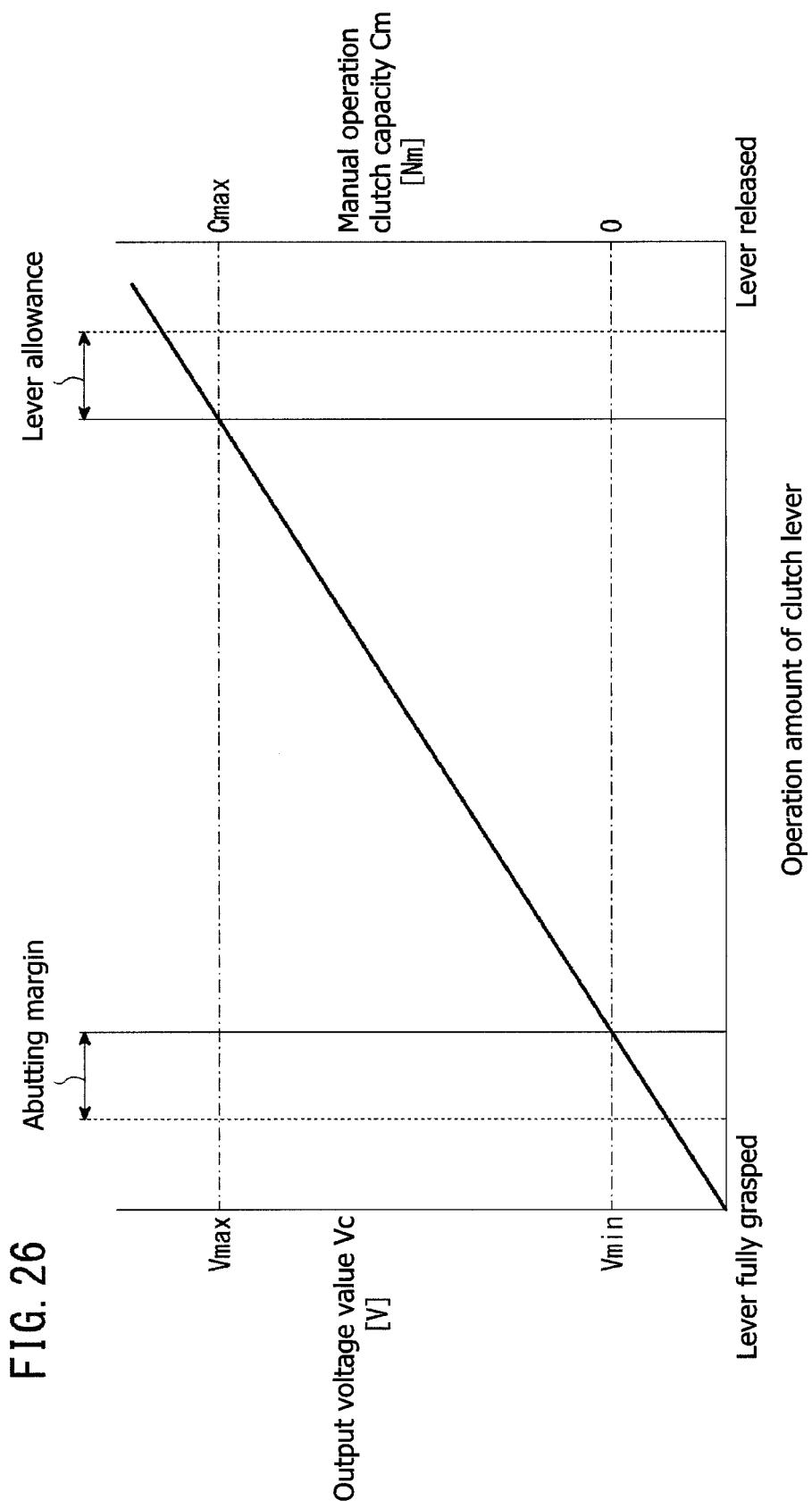
FIG. 26 is a graph showing the relationship among the operation amount of a clutch lever, an output voltage value of an operation amount sensor, and manual operation clutch capacity.

Specifically, an operation amount sensor 382 is connected to the clutch lever 374 and outputs a voltage value Vc according to the operation amount of the clutch lever 374. Specifically, as shown in FIG. 26, the output voltage value Vc of the operation amount sensor 382 proportionally increases from the fully-grasped state of the clutch lever 374 toward the released state. An effective range of the output voltage value Vc is a range from an effective upper limit voltage value Vmax to an effective lower limit voltage value Vmin, defined by excluding, from a dynamic range of the output voltage value Vc, a voltage range corresponding to a lever allowance and a voltage range defined in consideration of an abutting margin. Therefore, the clutch control mode determiner 376 determines that manual clutch operation is started at the timing when the output voltage value Vc becomes equal to or smaller than the effective upper limit voltage value Vmax.

The manual operation clutch capacity calculator 378 calculates a manual operation clutch capacity Cm based on the output voltage value Vc of the operation amount sensor 382 (output voltage value in the effective range). Specifically, as shown in FIG. 26, the relationship between the output voltage value Vc of the operation amount sensor 382 and the manual operation clutch capacity Cm is as follows. Specifically, a capacity value corresponding to the effective lower limit voltage value Vmin is defined as 0 and a capacity value corresponding to the effective upper limit voltage value Vmax is defined as a maximum value Cmax, and the capacity value Cm proportionally increases as the output voltage value Vc increases. That is, the manual operation clutch capacity calculator 378 calculates the manual operation clutch capacity Cm based on the output voltage value Vc of the operation amount sensor 382 and the proportional relationship shown in FIG. 26.

The manual operation clutch determiner 380 determines the clutch that should be treated as the target of manual operation next, of the first clutch 264a and the second clutch 264b, and outputs it as a manual operation clutch determination value Dd based on the drum rotation angle signal Sa (voltage value Va) from the drum rotation angle sensor 358, the above-described odd-stage in-gear information table 360, the even-stage in-gear information table 362, the gear position determination value Da from the gear position determiner 346, the target gear position value Db from the target gear position determiner 348, and the manual operation clutch capacity Cm from the manual operation clutch capacity calculator 378. Also in this case, as the manual operation clutch determination value Dd, for example "1" is used in the case of connecting the first clutch 264a and "2" is used in the case of connecting the second clutch 264b.

If the determination result from the clutch control mode determiner 376 indicates automatic clutch operation, the second clutch capacity calculator 356B calculates the first clutch capacity C1 and the second clutch capacity C2 by executing processing similar to that of the first clutch capacity calculator 356A of the first gearbox 200A. That is, it calculates clutch capacity under automatic control. If the determination result from the clutch control mode determiner 376 indicates manual clutch operation, the second clutch capacity calculator 356B calculates a first clutch capacity C1m and a second clutch capacity C2m under manual operation based on the first clutch capacity C1 and the second clutch capacity C2 under automatic control and the manual operation clutch capacity Cm. The first clutch capacity C1 or C1m is supplied to the first electromagnetically-controlled valve 274a as the first clutch capacity output value Sc1 and the second clutch capacity C2 or C2m is supplied to the second electromagnetically-controlled valve 274b as the second clutch capacity output value Sc2.

Figure 33:
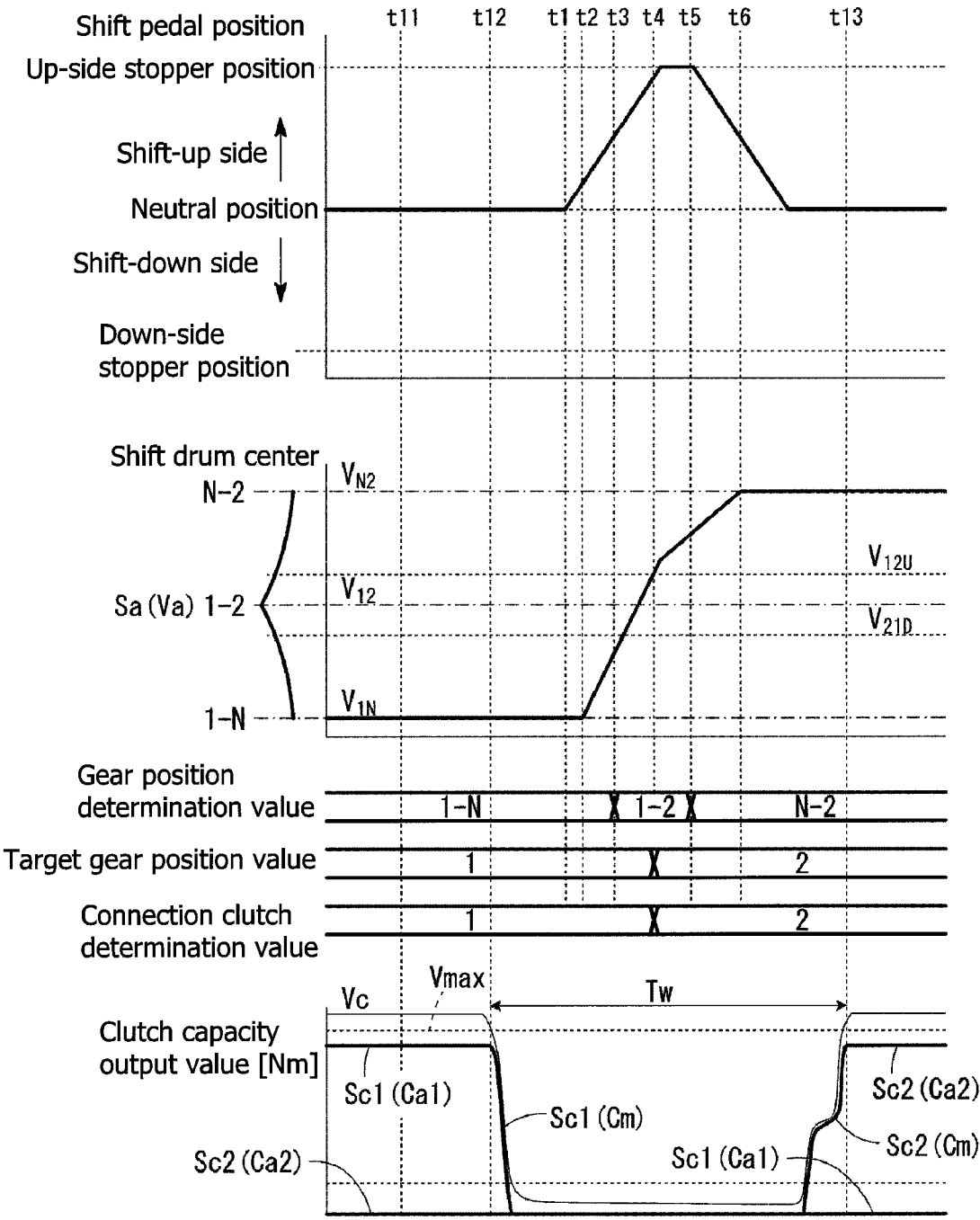
FIG. 33 is a timing chart (of the case in which clutch shift is performed) showing changes in the drum rotation angle signal (voltage value) associated with the operation position (operation amount) of the shift pedal, the gear position determination value, the target gear position value, the connection clutch determination value, the first clutch capacity output value, and the second clutch capacity output value.

Processing operation of the second gearbox 200B will be described below with reference to flowcharts of FIGS. 27 to 32 and a timing chart of FIG. 33. FIG. 33 is a timing chart showing how the in-gear state of the odd-stage gears and the even-stage gears (to be described later), the gear position determination value Da, and the drum rotation angle signal Sa (voltage value Va) from the drum rotation angle sensor 358 change in association with the rotation of the shift drum center 298.

Figure 27:
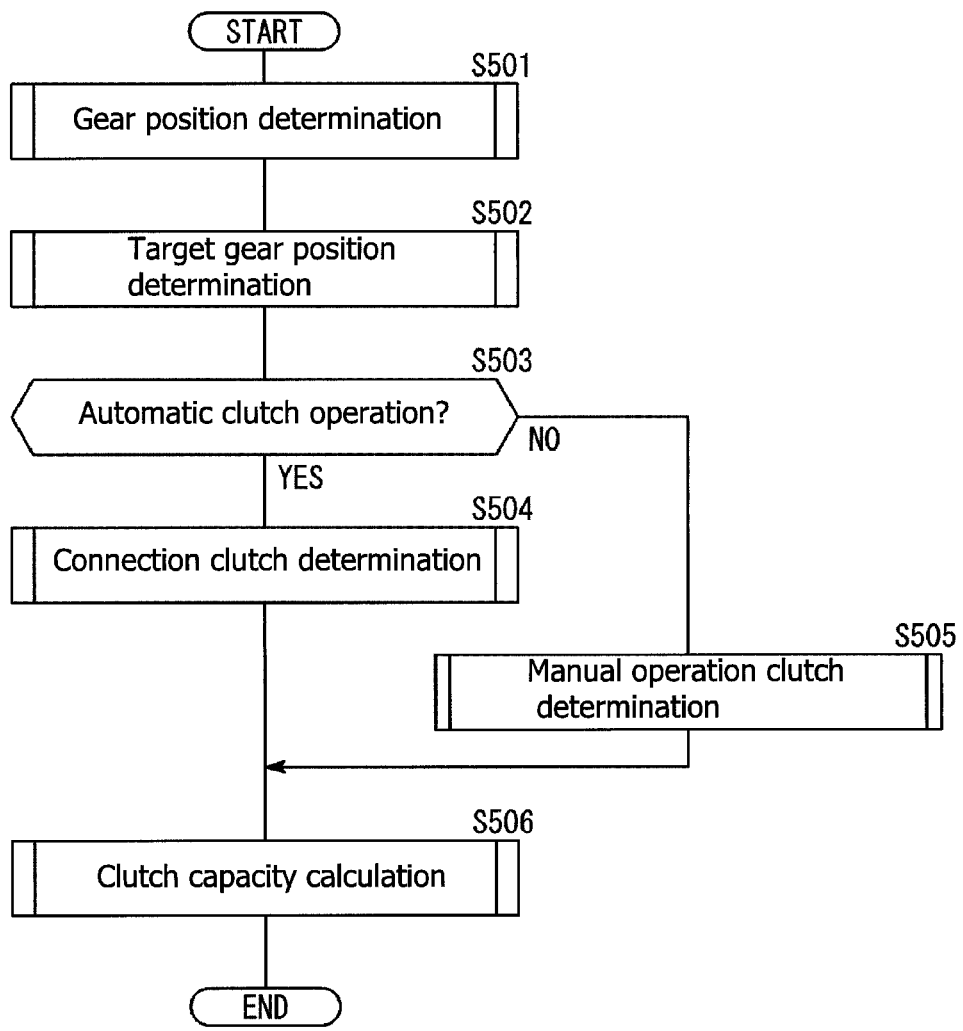
FIG. 27 is a flowchart showing processing operation of the second gearbox.

First, in a step S501 in FIG. 27, the gear position determiner 346 determines the present gear position based on the drum rotation angle signal Sa (voltage value Va) from the drum rotation angle sensor 358 and outputs it as the gear position determination value Da. This is based on the same operation as that of the gear position determiner 346 of the above-described first gearbox 200A and therefore description of specific processing is omitted.

Next, in a step S502, the processing enters target gear position determination by the target gear position determiner 348.

In this target gear position determination, the target gear position determiner 348 determines a target gear position as the next gear position and outputs it as the target gear position value Db based on the drum rotation angle signal Sa (voltage value Va), the gear position determination value Da from the gear position determiner 346, and the spindle rotation angle signal Sb from the spindle rotation angle sensor 366 that detects the rotation angle of the shift spindle 290. This target gear position determination is also based on the same operation as that of the target gear position determiner 348 of the above-described first gearbox 200A and therefore description of specific processing is omitted.

Next, in a step S503, it is determined whether clutch operation is automatic clutch operation or manual clutch operation based on a determination value from the clutch control mode determiner 376. Then, if the determination value is "0" indicating automatic clutch operation, the processing proceeds to the next step S504 to enter connection clutch determination by the connection clutch determiner 354.

Figure 28:
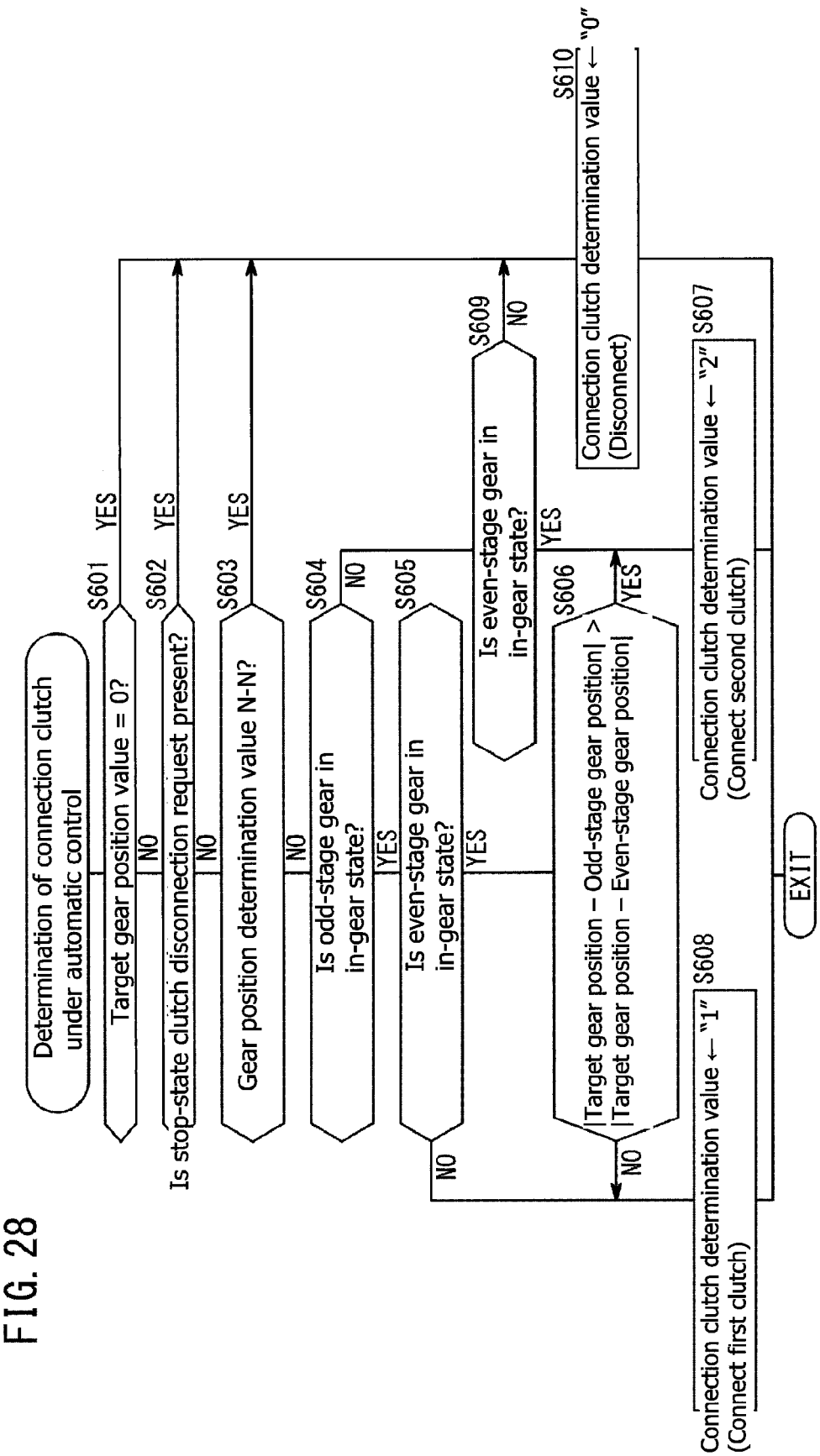
FIG. 28 is a flowchart showing determination processing in the connection clutch determiner of the second gearbox.

In this connection clutch determination, first, in a step S601 in FIG. 28, whether or not the target gear position value Db is "0" is determined. If the target gear position value Db is not "0," the processing proceeds to a step S602 and it is determined whether or not the present state is the stop-state clutch disconnection state of the saddle-ridden vehicle 10. This determination is made based on whether a stop-state clutch disconnection request is present. If the present state is not the stop-state clutch disconnection state of the saddle-ridden vehicle 10, the processing proceeds to the next step S603 and whether or not the gear position determination value Da is "N–N" is determined. If the gear position determination value Da is not "N–N," the processing proceeds to the next step S604 and whether or not the gear of the odd stage side is in the in-gear state is determined with reference to the drum rotation angle signal Sa (voltage value Va) and the voltage ranges registered in the odd-stage in-gear information table 360. If the drum rotation angle signal Sa (voltage value Va) falls within the voltage range registered in the odd-stage in-gear information table 360, it is determined that the odd-stage gear is in the in-gear state and the processing proceeds to the next step S605. In turn, whether or not the gear of the even stage side is in the in-gear state is determined with reference to the drum rotation angle signal Sa (voltage value Va) and the voltage ranges registered in the even-stage in-gear information table 362. If the drum rotation angle signal Sa (voltage value Va) falls within the voltage range registered in the even-stage in-gear information table 362, it is determined that the even-stage gear is in the in-gear state and the processing proceeds to the next step S606.

In the step S606, the value of the odd stage of the gear position determination value Da is stored in an odd register and the value of the even stage of the gear position determination value Da is stored in an even register. Then, if |target gear position value–value of odd register|>|target gear position value–value of even register| is satisfied, the processing proceeds to a step S607 and the connection clutch determination value Dc is set to "2" indicating to connect the second clutch 264b. Conversely, if |target gear position value–value of odd register|>|target gear position value–value of even register| is not satisfied, the processing proceeds to a step S608 and the connection clutch determination value Dc is set to "1" indicating to connect the first clutch 264a.

If it is determined in the step S605 that the even-stage gear is not in the in-gear state, the processing proceeds to the step S608 and the connection clutch determination value Dc is set to "1" indicating to connect the first clutch 264a.

If it is determined in the above-described step S604 that the odd-stage gear is not in the in-gear state, the processing proceeds to a step S609 and whether or not the even-stage gear is in the in-gear state is determined. If the even-stage gear is in the in-gear state, the processing proceeds to the above-described step S607 and the connection clutch determination value Dc is set to "2" indicating to connect the second clutch 264b.

On the other hand, if it is determined in the step S601 that the target gear position value Db is "0," or if it is determined in the step S602 that the present state is the stop-state clutch disconnection state of the saddle-ridden vehicle 10, or if it is determined in the step S603 that the gear position determination value Da is "N–N," or if it is determined in the step S609 that the even-stage gear is not in the in-gear state, i.e. neither the odd-stage gear nor the even-stage gear is in the in-gear state, the processing proceeds to a step S610 and the connection clutch determination value Dc is set to "0" indicating to disconnect both the first clutch 264a and the second clutch 264b.

If it is determined in the step S503 in FIG. 27 that clutch operation is manual clutch operation, the processing proceeds to a step S505 to enter determination of the clutch as the manual operation target under manual operation by the manual operation clutch determiner 380.

Figure 29:
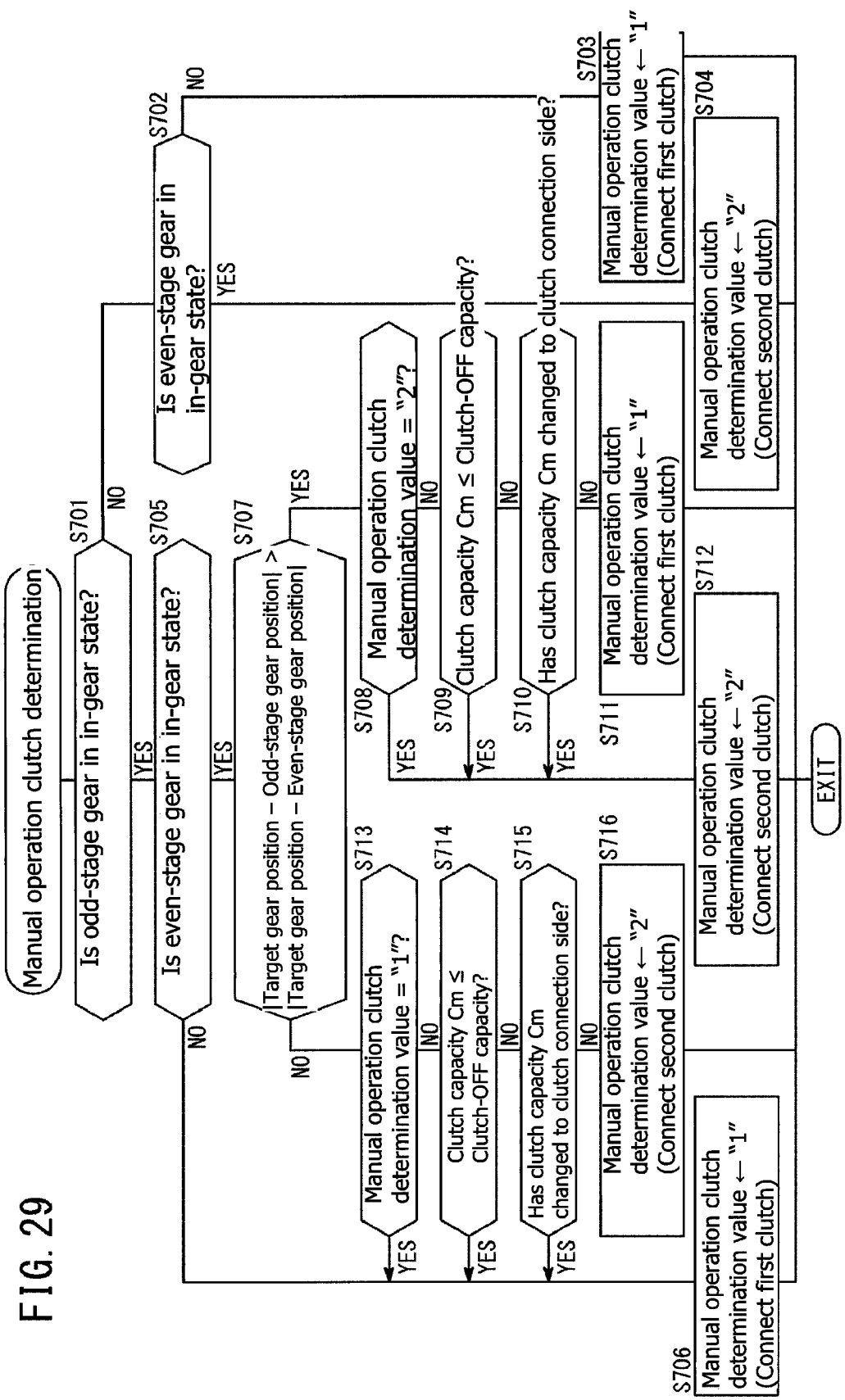
FIG. 29 is a flowchart showing determination processing in a manual operation clutch determiner of the second gearbox.

In this manual operation clutch determination, first, in a step S701 in FIG. 29, whether or not the odd-stage gear is in the in-gear state is determined. Because this determination method is described above, description thereof is omitted. If the odd-stage gear is not in the in-gear state, the processing proceeds to a step S702. In turn, whether or not the even-stage gear is in the in-gear state is determined. Because this determination method is also described above, description thereof is omitted. If it is determined that the even-stage gear is not in the in-gear state, i.e. neither the odd-stage gear nor the even-stage gear is in the in-gear state, the processing proceeds to the next step S703 and the manual operation clutch determination value Dd is set to "1" indicating to treat the first clutch 264a as the main target of manual operation.

If the even-stage gear is in the in-gear state in the above-described step S702, the processing proceeds to a step S704 and the manual operation clutch determination value Dd is set to "2" indicating to treat the second clutch 264b as the main target of manual operation.

If the odd-stage gear is in the in-gear state in the above-described step S701, the processing proceeds to a step S705 and, in turn, whether or not the even-stage gear is in the in-gear state is determined. Because this determination method is also described above, description thereof is omitted. If the even-stage gear is not in the in-gear state, the processing proceeds to a step S706 and the manual operation clutch determination value Dd is set to "1" indicating to treat the first clutch 264a as the main target of manual operation.

If it is determined in the above-described step S705 that the even-stage gear is in the in-gear state, the processing proceeds to a step S707. In this step, the value of the odd stage of the gear position determination value Da is stored in an odd register and the value of the even stage of the gear position determination value Da is stored in an even register. Then, if |target gear position value−value of odd register|>|target gear position value−value of even register| is satisfied, the processing proceeds to a step S708 and it is determined whether or not the manual operation clutch determination value Dd indicates the even-stage clutch, i.e. "2." If the even-stage clutch is not indicated, the processing proceeds to a step S709 and it is determined whether or not the manual operation clutch capacity Cm is equal to or lower than the capacity of clutch disconnection (clutch-OFF capacity). If the manual operation clutch capacity Cm surpasses the clutch-OFF capacity, the processing proceeds to a step S710 and it is determined whether or not the manual operation clutch capacity Cm has changed in such a direction as to connect the clutch. If the manual operation clutch capacity Cm has not changed in such a direction as to connect the clutch, the processing proceeds to the next step S711 and the manual operation clutch determination value Dd is set to "1" indicating to treat the first clutch 264a as the main target of manual operation.

If it is determined in the above-described step S708 that the manual operation clutch determination value Dd indicates the even-stage clutch, or if it is determined in the step S709 that the manual operation clutch capacity Cm is equal to or lower than the clutch-OFF capacity, or if it is determined in the step S710 that the manual operation clutch capacity Cm has changed in such a direction as to connect the clutch, the processing proceeds to a step S712 and the manual operation clutch determination value Dd is set to "2" indicating to treat the second clutch 264b as the main target of manual operation.

If it is determined in the above-described step S707 that |target gear position value−value of odd register|>|target gear position value−value of even register| is not satisfied, the processing proceeds to a step S713 and it is determined whether or not the manual operation clutch determination value Dd indicates the odd-stage clutch, i.e. "1." If the odd-stage clutch is not indicated, the processing proceeds to a step S714 and it is determined whether or not the manual operation clutch capacity Cm is equal to or lower than the clutch-OFF capacity. If the manual operation clutch capacity Cm surpasses the clutch-OFF capacity, the processing proceeds to a step S715 and it is determined whether or not the manual operation clutch capacity Cm has changed in such a direction as to connect the clutch. If the manual operation clutch capacity Cm has not changed in such a direction as to connect the clutch, the processing proceeds to the next step S716 and the manual operation clutch determination value Dd is set to "2" indicating to treat the second clutch 264b as the main target of manual operation.

If it is determined in the above-described step S713 that the manual operation clutch determination value Dd indicates the odd-stage clutch, or if it is determined in the step S714 that the manual operation clutch capacity Cm is equal to or lower than the clutch-OFF capacity, or if it is determined in the step S715 that the manual operation clutch capacity Cm has changed in such a direction as to connect the clutch, the processing proceeds to the above-described step S706 and the manual operation clutch determination value Dd is set to "1" indicating to treat the first clutch 264a as the main target of manual operation.

Upon the end of the determination of the connection clutch under automatic control by the connection clutch determiner 354 in the step S504 in FIG. 27 or the determination of the clutch as the manual operation target under manual operation by the manual operation clutch determiner 380 in the step S505, the processing proceeds to the next step S506 to enter processing in the second clutch capacity calculator 356B.

Figure 30:
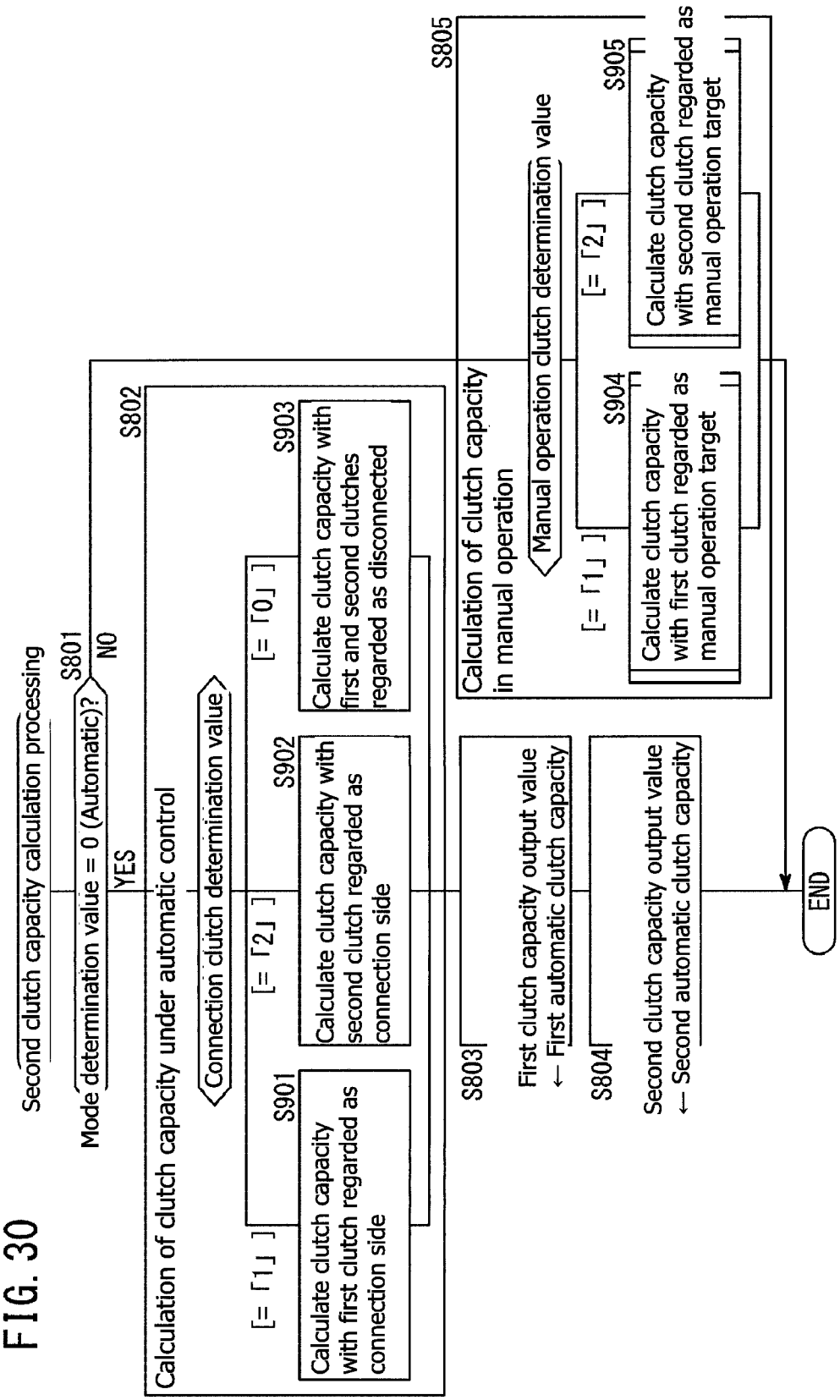
FIG. 30 is a flowchart showing processing in a clutch capacity calculator of the second gearbox.
Figure 31:
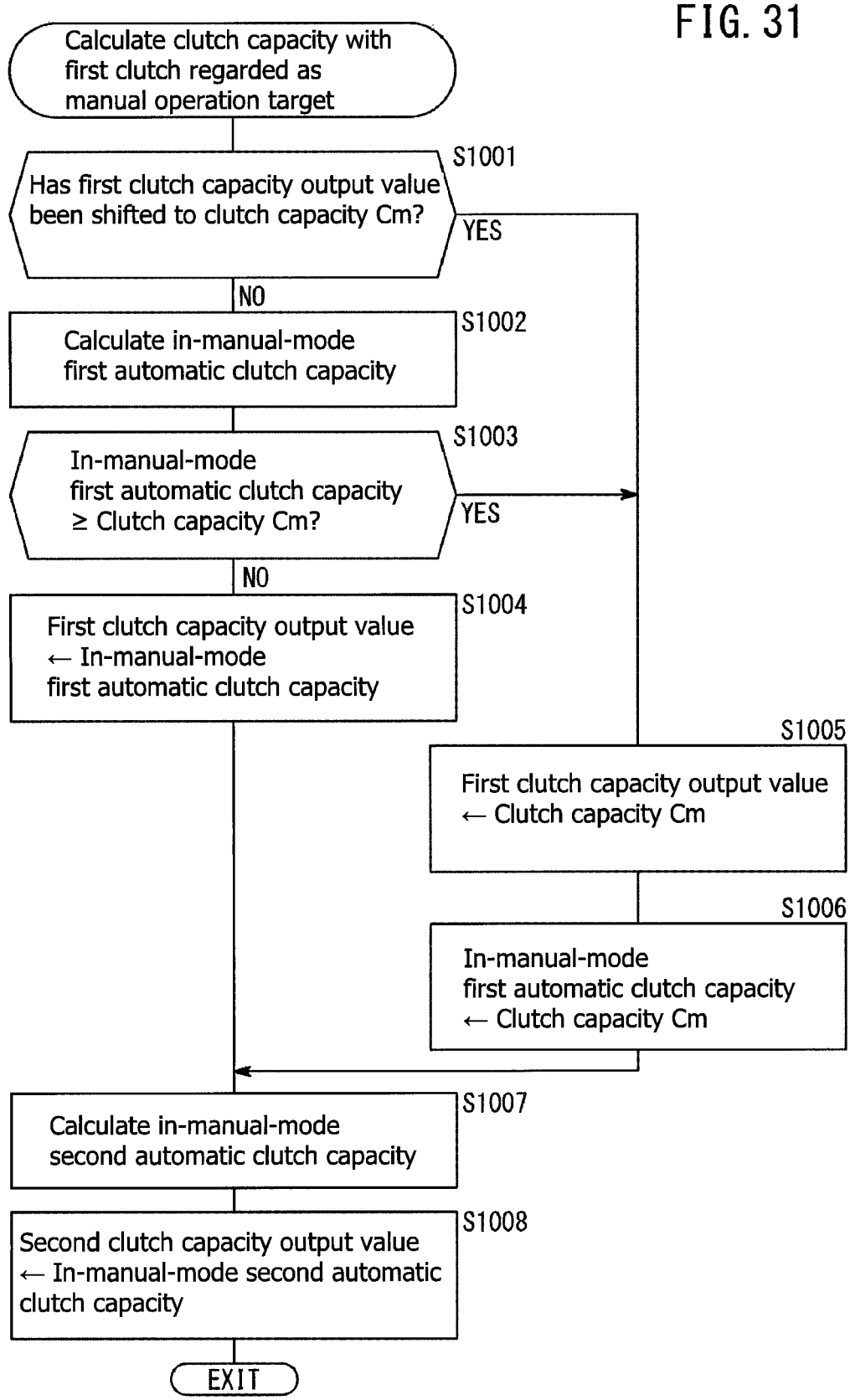
FIG. 31 is a flowchart showing the processing in the clutch capacity calculator when a manual operation clutch determination value indicates a first clutch.
Figure 32:
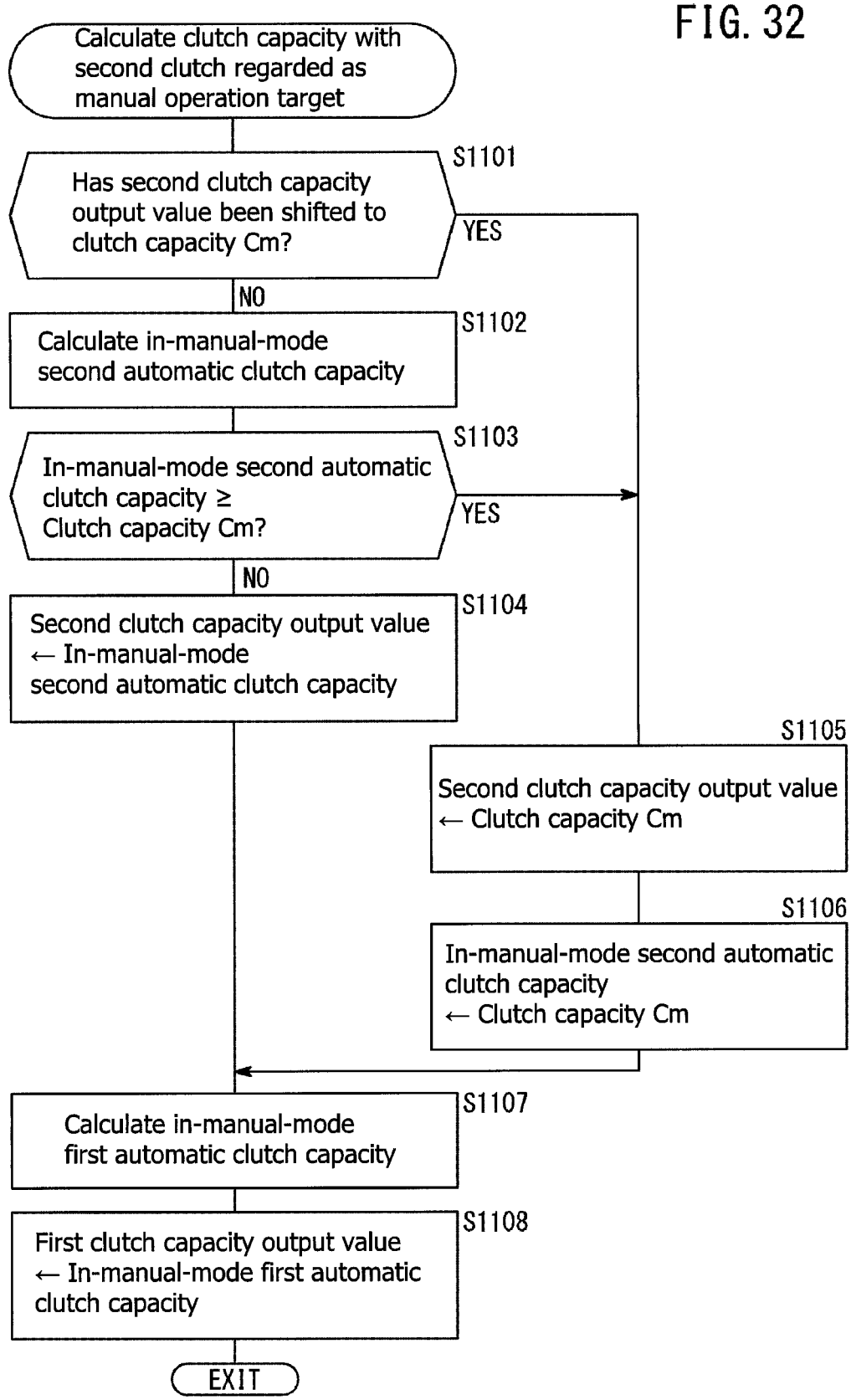
FIG. 32 is a flowchart showing the processing in the clutch capacity calculator when the manual operation clutch determination value indicates a second clutch.

In the processing in the second clutch capacity calculator 356B, first, in a step S801 in FIG. 30, whether or not clutch operation is automatic clutch operation (automatic mode) is determined based on a mode determination value from the clutch control mode determiner 376. If the mode determination value is "0" indicating automatic clutch operation, the processing proceeds to the next step S802 and calculation processing of the clutch capacity according to the connection clutch determination value Dc from the connection clutch determiner 354 is executed as shown in the step S4 in FIG. 18. Specifically, if the connection clutch determination value Dc is "1," the processing proceeds to a step S901 and clutch capacity values for connecting the first clutch 264a or for keeping the connected state of the first clutch 264a are calculated. That is, the clutch capacity of the first clutch 264a under automatic control (hereinafter, referred to as first automatic clutch capacity Ca1) and the clutch capacity of the second clutch 264b under automatic control (hereinafter, referred to as second automatic clutch capacity Ca2) are calculated. If the connection clutch determination value Dc is "2," the processing proceeds to a step S902 and clutch capacity (first automatic clutch capacity Ca1 and second automatic clutch capacity Ca2) for connecting the second clutch 264b or for keeping the connected state of the second clutch 264b is calculated. If the connection clutch determination value Dc is "0," the processing proceeds to a step S903 and clutch capacity for disconnecting both the first clutch 264a and the second clutch 264b or for keeping the disconnected state of the first clutch 264a and the second clutch 264b is calculated.

In a step S803, the first automatic clutch capacity Ca1 obtained by the processing of any of the steps S901 to S903 is set as the first clutch capacity output value Sc1. In a step S804, the second automatic clutch capacity Ca2 is set as the second clutch capacity output value Sc2. The obtained first clutch capacity output value Sc1 and second clutch capacity output value Sc2 are output to the first electromagnetically-controlled valve 274a and the second electromagnetically-controlled valve 274b.

If it is determined in the above-described step S801 that the determination value from the clutch control mode determiner 376 indicates manual clutch operation (manual mode), the processing proceeds to the next step S805 and calculation processing of the clutch capacity according to the manual operation clutch determination value Dd from the manual operation clutch determiner 380 and manual operation is executed.

Specifically, in this calculation processing, if the manual operation clutch determination value Dd is "1," the processing proceeds to a step S904 and the clutch capacity is calculated with the first clutch 264a regarded as the main target of manual operation. Specifically, in a step S1001 in FIG. 31, it is determined whether or not the first clutch capacity output value Sc1 has been shifted to the manual operation clutch capacity Cm. This determination is made based on whether processing in a step S1005 and a step S1006 is executed via a step S1003 to be described later. In this case, the determination may be made by using flag information. For example, the following way is employed. If the processing in the step S1005 and the step S1006 is executed for the first time with the same target gear position value Db, the flag information is set to "1" indicating that the output value Sc1 has been shifted. At the timing when the clutch control mode has changed from the manual mode to the automatic mode or at the timing when the manual operation clutch determination value Dd is switched, the flag information is reset to "0." If the flag information is "1," it is determined that the output value Sc1 has been shifted. If it is "0," it is determined that the output value Sc1 has not been shifted.

If it is determined in the step S1001 that the output value Sc1 has not been shifted, the processing proceeds to a step S1002 and the clutch capacity of the first clutch 264a under automatic control in the manual mode (in-manual-mode first automatic clutch capacity Ca1) is calculated. In this step S1002, the calculation is so performed that the influence on the vehicle body behavior is minimized also in view of the clutch capacity of the second clutch 264b under automatic control in the manual mode (in-manual-mode second automatic clutch capacity Ca2).

Thereafter, in the step S1003, the in-manual-mode first automatic clutch capacity Ca1 is compared with the manual operation clutch capacity Cm. If in-manual-mode first automatic clutch capacity Ca1 ≥manual operation clutch capacity Cm is not satisfied, the processing proceeds to the next step S1004 and the in-manual-mode first automatic clutch capacity Ca1 is set as the first clutch capacity output value Sc1.

If it is determined in the above-described step S1003 that in-manual-mode first automatic clutch capacity Ca1 ≥manual operation clutch capacity Cm is satisfied, the processing proceeds to the step S1005 and the manual operation clutch capacity Cm is set as the first clutch capacity output value Sc1. In the next step S1006, the in-manual-mode first automatic clutch capacity Ca1 is rewritten to the manual operation clutch capacity Cm.

Upon the end of the processing in the step S1004 or the processing in the step S1006, the processing proceeds to a step S1007 and the clutch capacity of the second clutch 264b under automatic control in the manual mode (in-manual-mode second automatic clutch capacity Ca2) is calculated. Also in this step S1007, the calculation is so performed that the influence on the vehicle body behavior is minimized also in view of the in-manual-mode first automatic clutch capacity Ca1. Then, in the next step S1008, the in-manual-mode second automatic clutch capacity Ca2 is set as the second clutch capacity output value Sc2.

On the other hand, if the manual operation clutch determination value Dd is "2," the processing proceeds to a step S905 in FIG. 30 and the clutch capacity is calculated with the second clutch 264b regarded as the main target of manual operation. Specifically, in a step S1101 in FIG. 32, it is determined whether or not the second clutch capacity output value Sc2 has been shifted to the manual operation clutch capacity Cm. This determination is also made based on whether processing in a step S1105 and a step S1106 is executed via a step S1103 to be described later similarly to the above-described step S1001.

If it is determined in the step S1101 that the output value Sc2 has not been shifted, the processing proceeds to a step S1102 and the clutch capacity of the second clutch 264b under automatic control in the manual operation (in-manual-mode second automatic clutch capacity Ca2) is calculated. In this step S1102, the calculation is so performed that the influence on the vehicle body behavior is minimized also in view of the in-manual-mode first automatic clutch capacity Ca1.

Thereafter, in the step S1103, the in-manual-mode second automatic clutch capacity Ca2 is compared with the manual operation clutch capacity Cm. If in-manual-mode second automatic clutch capacity Ca2≥manual operation clutch capacity Cm is not satisfied, the processing proceeds to the next step S1104 and the in-manual-mode second automatic clutch capacity Ca2 is set as the second clutch capacity output value Sc2.

If it is determined in the above-described step S1103 that in-manual-mode second automatic clutch capacity Ca2 ≥manual operation clutch capacity Cm is satisfied, the processing proceeds to the step S1105 and the manual operation clutch capacity Cm is set as the second clutch capacity output value Sc2. In the next step S1106, the in-manual-mode second automatic clutch capacity Ca2 is rewritten to the manual operation clutch capacity Cm.

Upon the end of the processing in the step S1104 or the processing in the step S1106, the processing proceeds to a step S1107 and the in-manual-mode first automatic clutch capacity Ca1 is calculated. Also in this step S1107, the calculation is so performed that the influence on the vehicle body behavior is minimized also in view of the in-manual-mode second automatic clutch capacity Ca2. Then, in the next step S1108, the in-manual-mode first automatic clutch capacity Ca1 is set as the first clutch capacity output value Sc1.

Then, the first clutch capacity output value Sc1 and the second clutch capacity output value Sc2 obtained through the step S1001 to the step S1008 or the step S1101 to the step S1108 are output to the first electromagnetically-controlled valve 274a and the second electromagnetically-controlled valve 274b.

Here, operation of shift-up from the first to the second will be described with reference also to a timing chart of FIG. 33. FIG. 33 is a timing chart showing changes in the drum rotation angle signal Sa (voltage value Va) associated with the operation position (operation amount) of the shift pedal 48, the gear position determination value Da, the target gear position value Db, the connection clutch determination value Dc (manual operation clutch determination value Dd), the output voltage value (Vc) of the operation amount sensor 382 of the clutch lever 374, the first clutch capacity output value Sc1 (first automatic clutch capacity Ca1, manual operation clutch capacity Cm), and the second clutch capacity output value Sc2 (second automatic clutch capacity Ca2, manual operation clutch capacity Cm).

First, at e.g. timing t11 in driving in the first gear, the clutch lever 374 is not operated by the driver. Thus, based on the automatic control mode, the first automatic clutch capacity Ca1 is output as the first clutch capacity output value Sc1 and the second automatic clutch capacity Ca2 is output as the second clutch capacity output value Sc2.

In the driving in the first gear, from timing t12 when the driver operates the clutch lever 374 and the output voltage value Vc of the operation amount sensor 382 becomes the effective upper limit voltage value Vmax, a manual operation mode Tw is started, so that the manual operation clutch capacity Cm is output as the first clutch capacity output value Sc1 and the second automatic clutch capacity Ca2 is output as the second clutch capacity output value Sc2. Thereby, the first clutch 264a is gradually disconnected according to the operation amount of the clutch lever 374. This state continues until the target gear position value Db is changed, i.e. until the timing t4 when the drum shifter 318 of the ratchet mechanism 288 returns to the original position and the ratchet mechanism 288 is reset after the driver operates the shift pedal 48 and the roller 314 of the stopper arm 308 moves beyond the second convex part $K_2$ (timing when the drum rotation angle signal Sa (voltage value Va) becomes equal to or larger than the permission threshold $V_{12U}$ of shift-up gear change).

At the timing t4, the target gear position value Db is changed from "1" to "2." Thus, from the timing t4, the manual operation clutch capacity Cm is output as the second clutch capacity output value Sc2 and the first automatic clutch capacity Ca1 is output as the first clutch capacity output value Sc1. Thereby, the second clutch 264b is gradually connected according to the operation amount of the clutch lever 374.

Then, at timing t13 when the output voltage value Vc of the operation amount sensor 382 becomes the effective upper limit voltage value Vmax, the manual operation mode Tw ends and the automatic control mode is restarted, so that the first automatic clutch capacity Ca1 is output as the first clutch capacity output value Sc1 and the second automatic clutch capacity Ca2 is output as the second clutch capacity output value Sc2.

As above, in the second gearbox 200B, the same effects as those by the above-described first gearbox 200A are achieved. In addition, control reflecting driver's intention more is possible at the time of start/stop for example, and the second gearbox 200B can be applied also to launch start, wheelie, etc.

Transition between automatic clutch control and manual clutch control can be made without an uncomfortable feeling. Due to operation of the clutch lever 374, the clutch capacity is continuously switched at the time of transition from automatic clutch control to manual clutch control. Thus, switching without an uncomfortable feeling is possible. At the time of switching from manual clutch control to automatic clutch control in the in-gear stop-state, unintentional movement of the vehicle can be prevented.

Furthermore, the clutch lever 374 enabling connection/disconnection control of the clutch system 204 in accordance with driver's intention is provided and the control device 230 receives an operation signal of this clutch lever 374 to output a clutch connection/disconnection instruction so that connection/disconnection control of the clutch system 204 can be carried out in accordance with driver's intention instead of automatic control by the control device 230. Therefore, the clutch system 204 allowing clutch operation from automatic clutch operation to manual clutch operation can be configured through addition of the clutch lever 374 and small-scale change in the control device 230. Thus, the saddle-ridden vehicle 10 permitting plural kinds of operation with the single vehicle can be provided at low cost.

An electronic switch measure is employed as the clutch lever 374. Therefore, the operation load can be reduced compared with conventional mechanical switch measures. Thus, operation with a simple switch measure is allowed and reduction of the burden of driving operation can be achieved.

The gearbox of the saddle-ridden vehicle according to the present invention is not limited to the above-described embodiment and various configurations can be employed without departing from the gist of the present invention.

DESCRIPTION OF REFERENCE SYMBOLS

10 . . . Saddle-ridden vehicle
34 . . . Drive shaft
36 . . . Engine
44 . . . Clutch-OFF switch
48 . . . Shift pedal
54 . . . Crankshaft
200A . . . First gearbox
200B . . . Second gearbox
202 . . . Primary reduction mechanism
204 . . . Clutch system
206 . . . Gear transmission mechanism
208 . . . Gearshift system
212 . . . Main shaft
212m . . . Inner shaft
212n . . . Outer shaft
214 . . . Countershaft
230 . . . ECU
264a . . . First clutch
264b . . . Second clutch
268 . . . Hydraulic supply system
270 . . . Clutch control device
274a . . . First electromagnetically-controlled valve
274b . . . Second electromagnetically-controlled valve
278 . . . Shift drum
280a to 280d . . . First shift fork to fourth shift fork
282a to 282d . . . First cam groove to fourth cam groove
288 . . . Ratchet mechanism
290 . . . Shift spindle
292 . . . Shift lever
292b . . . Tip part (change pedal shaft)
294 . . . Shift rod
296 . . . Shift arm
298 . . . Shift drum center
308 . . . Stopper arm
314 . . . Roller
318 . . . Drum shifter
320 . . . Ratchet pawl
322 . . . Spring
334 . . . Engagement hole
336 . . . Engagement pin
338 . . . Arm
340 . . . Elongate hole
342 . . . Pin
344 . . . Clamp spring
344a . . . Clamp arm
346 . . . Gear position determiner
348 . . . Target gear position determiner
350 . . . Driving state determiner
354 . . . Connection clutch determiner
356 . . . Clutch capacity calculator
358 . . . Drum rotation angle sensor
366 . . . Spindle rotation angle sensor
374 . . . Clutch lever
376 . . . Clutch control mode determiner
378 . . . Manual operation clutch capacity calculator
380 . . . Manual operation clutch determiner
382 . . . Operation amount sensor

The invention claimed is:

1. A gearbox, comprising:
a transmission mechanism configured to be mounted on a saddle-ridden vehicle, wherein driving force generated by a power source is configured to be input to the transmission mechanism, the transmission mechanism configured to perform gear shift by a plurality of transmission gears on power train shafts divided for odd stages and even stages and to output the driving force;
a clutch mechanism including a plurality of clutches configured to allow mutually independent connection/disconnection operation and are each assigned to a respective one of the power train shafts;
a gear change mechanism that is interlocked with a change pedal shaft to which rotational force by operation of a shift pedal is configured to be transmitted and to arbitrarily select a transmission gear of the transmission mechanism to perform gear shift; and a control device configured to electronically control connection/disconnection of the clutch mechanism according to a shift position of the gear change mechanism.

2. The gearbox according to claim 1, the gear change mechanism comprising:
   a shift drum configured to be rotated by foot operation of a driver and to exclusively set one of the transmission gears to a dog-in state to link the driving force, and
   a gear position sensor configured to detect a rotation angle of the shift drum to detect a shift stage of the selected transmission gear,
   wherein the control device is configured to receive a gear shift instruction by the driver based on a detection result of the gear position sensor and to carry out control to connect/disconnect the plurality of clutches.

3. The gearbox according to claim 2, the gear change mechanism further comprising:
   an intermittent feed mechanism configured to convert swing motion by the shift pedal to rotational motion of the shift drum, and
   a shift spindle rotation sensor located at a swing center of the intermittent feed mechanism and is configured to detect a rotation angle of an interlocking shaft that interlocks the shift pedal with the shift drum,
   wherein the control device is configured to receive a gear shift instruction by the driver based on a detection result of the gear position sensor and to carry out control to connect/disconnect the plurality of clutches.

4. The gearbox according to claim 3, further comprising:
   a stopper retaining part disposed in the shift drum, the stopper retaining part having a circular disc shape and has concave parts and convex parts alternately disposed at predetermined angles,
   wherein the gear change mechanism includes a stopper portion that is biased against the stopper retaining part and is configured to stop rotation of the shift drum at a position at which the stopper portion gets into one of the concave parts to keep the shift drum at a predetermined shift stage, and
   wherein the control device is configured to start connection/disconnection control of the clutch mechanism if an angle detected by the gear position sensor surpasses an angle from the concave part to a top of a next convex part and further surpasses a predetermined angle.

5. The gearbox according to claim 4, wherein
   the intermittent feed mechanism comprises a ratchet mechanism, and
   the predetermined angle is set to an angle that is equal to or larger than an angle at which the ratchet mechanism is reset and is equal to or smaller than an angle at which the shift pedal reaches a stopper position.

6. The gearbox according to claim 4, wherein
   the control device is further configured to detect a predetermined angle surpassing an angle to a next convex part in both forward rotation and reverse rotation of the shift drum to start connection/disconnection control of the clutch mechanism.

7. The gearbox according to claim 6, wherein
   an angle at which the control device is configured to start connection/disconnection of the clutch mechanism is set to the same predetermined angle in both forward rotation and reverse rotation of the shift drum.

8. The gearbox according to claim 1, wherein
   the saddle-ridden vehicle includes a clutch operation element configured to allow the clutch mechanism to carry out connection/disconnection control in accordance with intention of the driver, and
   the control device is configured to receive an operation signal from the clutch operation element to output a clutch connection/disconnection instruction to the clutch mechanism.

9. The gearbox according to claim 8, wherein
   the clutch operation element comprises an electronic system based on a switch measure operable by a single finger.

10. A gearbox, comprising:
    transmission means for being mounted on a saddle-ridden vehicle, and for having driving force generated by a power source input thereto, the transmission means also for performing gear shift by a plurality of transmission gears on power train shafts divided for odd stages and even stages and for outputting the driving force;
    clutch means for allowing mutually independent connection/disconnection operation, said clutch means comprising a plurality of clutches, each assigned to a respective one of the power train shafts;
    gear change means interlocked with a change pedal shaft to which rotational force by operation of a shift pedal is configured to be transmitted, said gear change means for arbitrarily selecting a transmission gear of the transmission means to perform gear shift; and
    control means for electronically controlling connection/disconnection of the clutch means according to a shift position of the gear change means.

11. The gearbox according to claim 10, the gear change means comprising:
    shift drum means for being rotated by foot operation of a driver and for exclusively setting one of the transmission gears to a dog-in state to link the driving force, and
    gear position sensor means for detecting a rotation angle of the shift drum means and for detecting a shift stage of the selected transmission gear,
    wherein the control means is also for receiving a gear shift instruction by the driver based on a detection result of the gear position sensor means and for carrying out control to connect/disconnect the plurality of clutches.

12. The gearbox according to claim 11, the gear change means further comprising:
    intermittent feed means for converting swing motion by the shift pedal to rotational motion of the shift drum means, and
    shift spindle rotation sensor means located at a swing center of the intermittent feed means, for detecting a rotation angle of an interlocking shaft that interlocks the shift pedal with the shift drum means,
    wherein the control means is also for receiving a gear shift instruction by the driver based on a detection result of the gear position sensor means and for carrying out control to connect/disconnect the plurality of clutches.

13. The gearbox according to claim 12, further comprising:
    stopper retaining means disposed in the shift drum means, the stopper retaining means having a circular disc shape and has concave parts and convex parts alternately disposed at predetermined angles,
    wherein the gear change mechanism includes a stopper means that is biased against the stopper retaining means and is for stopping rotation of the shift drum means at a position at which the stopper means gets into one of the concave parts to keep the shift drum means at a predetermined shift stage, and
    wherein the control means is also for starting connection/disconnection control of the clutch means if an angle detected by the gear position sensor means surpasses an angle from the concave part to a top of a next convex part and further surpasses a predetermined angle.

14. The gearbox according to claim 13, wherein
the intermittent feed means comprises ratchet means, and
the predetermined angle is set to an angle that is equal to or larger than an angle at which the ratchet means is reset and is equal to or smaller than an angle at which the shift pedal reaches a stopper means position.

15. The gearbox according to claim 13, wherein
the control means is also for detecting a predetermined angle surpassing an angle to a next convex part in both forward rotation and reverse rotation of the shift drum means for starting connection/disconnection control of the clutch means.

16. The gearbox according to claim 15, wherein
an angle at which the control means starts connection/disconnection of the clutch means is set to the same predetermined angle in both forward rotation and reverse rotation of the shift drum means.

17. The gearbox according to claim 10, wherein
the saddle-ridden vehicle includes a clutch operation means for allowing the clutch means to carry out connection/disconnection control in accordance with intention of the driver, and
the control means is also for receiving an operation signal from the clutch operation means to output a clutch connection/disconnection instruction to the clutch means.

18. The gearbox according to claim 17, wherein
the clutch operation means comprises an electronic system based on a switch measure operable by a single finger.

\* \* \* \* \*